United States Patent
Uhm

(10) Patent No.: US 10,086,762 B2
(45) Date of Patent: Oct. 2, 2018

(54) VEHICLE DISPLAY DEVICE AND VEHICLE COMPRISING SAME

(71) Applicant: LG ELECTRONICS INC., Seoul (KR)

(72) Inventor: Jinu Uhm, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/534,976

(22) PCT Filed: Dec. 1, 2015

(86) PCT No.: PCT/KR2015/012968
§ 371 (c)(1),
(2) Date: Jun. 9, 2017

(87) PCT Pub. No.: WO2016/093535
PCT Pub. Date: Jun. 16, 2016

(65) Prior Publication Data
US 2017/0349098 A1     Dec. 7, 2017

(30) Foreign Application Priority Data

Sep. 1, 2015 (KR) .......................... 10-2015-0123756

(51) Int. Cl.
*B60R 1/00* (2006.01)
*B60K 35/00* (2006.01)
(Continued)

(52) U.S. Cl.
CPC ................ *B60R 1/00* (2013.01); *B60K 35/00* (2013.01); *G08G 1/0967* (2013.01);
(Continued)

(58) Field of Classification Search
CPC ................ B60R 1/00; B60R 2300/105; B60R 2300/205; B60R 2300/207;
(Continued)

(56) References Cited

U.S. PATENT DOCUMENTS

| 4,494,747 A | 1/1985 | Graef et al. |
| 7,198,393 B2 * | 4/2007 | Tubidis ................. B60K 35/00 313/511 |
| 2012/0268665 A1 | 10/2012 | Yetukuri et al. |

FOREIGN PATENT DOCUMENTS

| JP | 4166518 | 10/2008 |
| KR | 10-2010-0047958 | 5/2010 |

(Continued)

OTHER PUBLICATIONS

International Search Report in International Application No. PCT/KR2015/012968, dated Mar. 30, 2016, 2 pages (with English translation).

*Primary Examiner* — Marthe Y Marc-Coleman
(74) *Attorney, Agent, or Firm* — Fish & Richardson P.C.

(57) ABSTRACT

The present invention relates to a vehicle display device comprising: a display unit comprising a transparent flexible display disposed in a state of being rolled around a certain axis; a driving unit for adjusting the length of a region, of the transparent flexible display, exposed inside the vehicle; and a processor for controlling the driving unit and controlling the display of a picture on the transparent flexible display.

16 Claims, 61 Drawing Sheets

(51) Int. Cl.
*G08G 1/0967* (2006.01)
*G08G 1/0968* (2006.01)
*G08G 1/16* (2006.01)

(52) U.S. Cl.
CPC ....... *G08G 1/096855* (2013.01); *G08G 1/165* (2013.01); *G08G 1/166* (2013.01); *B60K 2350/1072* (2013.01); *B60K 2350/2013* (2013.01); *B60K 2350/2069* (2013.01); *B60K 2350/2095* (2013.01); *B60K 2350/352* (2013.01); *B60K 2350/357* (2013.01); *B60K 2350/922* (2013.01); *B60K 2350/962* (2013.01); *B60K 2350/965* (2013.01); *B60R 2300/105* (2013.01); *B60R 2300/205* (2013.01); *B60R 2300/207* (2013.01); *B60R 2300/301* (2013.01); *B60R 2300/304* (2013.01); *B60R 2300/8066* (2013.01)

(58) Field of Classification Search
CPC ........ B60R 2300/301; B60R 2300/304; B60R 2300/8066; G08G 1/0967; G08G 1/096855; G08G 1/165; G08G 1/166; B60K 2350/1072; B60K 2350/2013; B60K 2350/2069; B60K 2350/2095; B60K 2350/352; B60K 2350/235; B60K 2350/357; B60K 2350/922; B60K 2350/962; B60K 2350/965
USPC .......................................................... 701/49
See application file for complete search history.

(56) References Cited

FOREIGN PATENT DOCUMENTS

| KR | 10-2010-0053312 | | 5/2010 |
| KR | 10-20100047958 A | * | 5/2010 |
| KR | 10-2014-0127474 | | 11/2014 |
| KR | 10-2014-0131760 | | 11/2014 |
| KR | 10-20140127474 A | * | 11/2014 |
| KR | 10-20140131760 A | * | 11/2014 |

* cited by examiner (a)　　　　　　　　　　　(b)

(a)

(b)

(a)

(b)

VEHICLE DISPLAY DEVICE AND VEHICLE COMPRISING SAME

CROSS-REFERENCE TO RELATED APPLICATIONS

This application is a National Stage application under 35 U.S.C. § 371 of International Application No. PCT/KR2015/012968, filed Dec. 1, 2015, which claims the benefit of Korean Application No. 10-2015-0123756, filed on Sep. 1, 2015 and Korean Application No. 10-2014-0177581, filed on Dec. 10, 2014. The disclosures of the prior applications are incorporated by reference in their entirety.

TECHNICAL FIELD

The present invention relates to a vehicle display device and a vehicle including the same.

BACKGROUND ART

A vehicle is an apparatus that is moved in a desired direction by a user riding therein. A typical example of the vehicle is an automobile.

Vehicles have been increasingly equipped with various sensors and electronic devices to provide user convenience. In particular, various devices for driving convenience for users are being developed.

One of the devices for driving convenience is a sun visor for protecting the passenger's eyes from direct sunlight. Since light entering through the windshield or the windows of the vehicle directly dazzles the passenger or is reflected on a display device installed in the vehicle, lowering readability of the display device, the passenger operates the sun visor to block entering sunlight.

Conventional vehicle display devices are fixedly provided to display predetermined content. Such display devices occupy a space even when they are not in use.

DISCLOSURE

Technical Problem

Therefore, the present invention has been made in view of the above problems, and it is an object of the present invention to provide a vehicle display device including a transparent flexible display which can be unrolled when necessary.

Objects of the present invention are not limited to the aforementioned objects, and other objects of the present invention which are not mentioned above will become apparent to those having ordinary skill in the art upon examination of the following.

Technical Solution

In accordance with an aspect of the present invention, the above and other objects can be accomplished by the provision of a vehicle display device including a display unit including a transparent flexible display disposed rolled around a predetermined shaft, a drive unit for adjusting a length of an area of the transparent flexible display that is exposed to an interior of a vehicle, and a processor for controlling the drive unit and controlling a screen image to be displayed on the transparent flexible display.

Other details of embodiments are included in the following detailed description and accompanying drawings.

Advantageous Effects

According to embodiments of the present invention, the present invention has one or more of the following effects.

First, as a transparent flexible display is used, it may be ensured that the vision of an occupant in the vehicle is not blocked.

Second, since the length of the light blocking area is adjusted in consideration of the illuminance, the position of the sun, or the occupant's gaze, dazzling of the occupant may be adaptively prevented.

Third, as an image assisting the occupant in driving is displayed in an image display area when necessary, the occupant can perform safe driving.

Effects of the present invention are not limited to the aforementioned effects, and other effects of the present invention which are not mentioned above will become apparent to those having ordinary skill in the art from the claims.

BEST MODE

Figure 1:
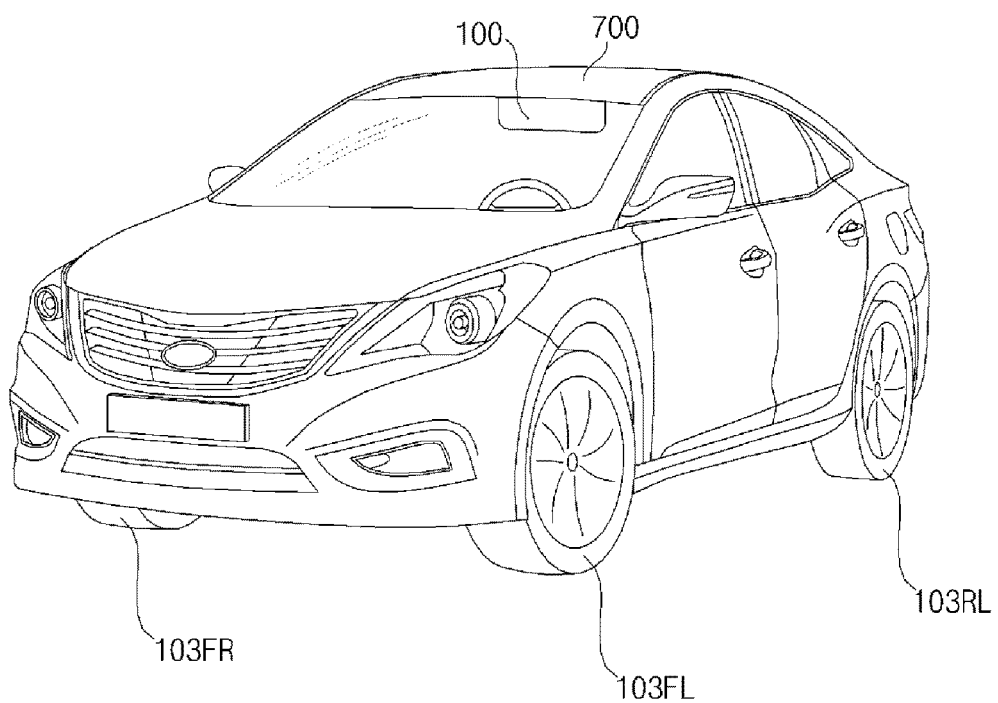
FIG. 1 shows the exterior of a vehicle according to an embodiment of the present invention.

Reference will now be made in detail to the preferred embodiments of the present invention, examples of which are illustrated in the accompanying drawings. Wherever possible, the same reference numbers will be used throughout the drawings to refer to the same or like parts. As used herein, the suffixes "module" and "unit" are added or interchangeably used to facilitate preparation of this specification and are not intended to suggest unique meanings or functions. In describing embodiments disclosed in this specification, a detailed description of relevant well-known technologies may not be given in order not to obscure the subject matter of the present invention. In addition, the accompanying drawings are merely intended to facilitate understanding of the embodiments disclosed in this specification and not to restrict the technical spirit of the present invention. In addition, the accompanying drawings should be understood as covering all equivalents or substitutions within the scope of the present invention.

Terms including ordinal numbers such as first, second, etc. may be used to explain various elements. However, it will be appreciated that the elements are not limited to such terms. These terms are merely used to distinguish one element from another.

Stating that one constituent is "connected" or "linked" to another should be understood as meaning that the one constituent may be directly connected or linked to another constituent or another constituent may be interposed between the constituents. On the other hand, stating that one constituent is "directly connected" or "directly linked" to another should be understood as meaning that no other constituent is interposed between the constituents.

As used herein, the singular forms "a", "an", and "the" are intended to include the plural forms as well, unless the context clearly dictates otherwise.

In this specification, the terms such as "includes" and "has" are intended to indicate existence of characteristics, numbers, steps, operations, constituents, components, or combinations thereof disclosed in the specification. The terms "includes" or "has" should be understood as not precluding possibility of existence or addition of one or more other characteristics, numbers, steps, operations, constituents, components, or combinations thereof.

The term "vehicle" employed in this specification may conceptually include an automobile and a motorcycle. Hereinafter, description will be given mainly focusing on an automobile.

The vehicle described in this specification may include a vehicle equipped with an internal combustion engine as a power source, a hybrid vehicle equipped with both an engine and an electric motor as a power source, and an electric vehicle equipped with an electric motor as a power source.

In the following description, the left side of the vehicle means the left side with respect to the travel direction of the vehicle, i.e., the driver's seat side, and the right side of the vehicle means the right side with respect to the travel direction of the vehicle, i.e., the passenger seat side.

FIG. 1 shows the exterior of a vehicle according to an embodiment of the present invention.

Referring to FIG. 1, a vehicle 700 may include wheels 103FR, 103FL, 103RL, . . . rotated by a power source, a steering wheel for adjusting the travel direction of the vehicle 10, and a driver assistance apparatus 100.

According to embodiment, the driver assistance apparatus 100 may be provided inside the vehicle. Preferably, the driver assistance apparatus 100 is attached to the ceiling on the driver's seat side inside the vehicle.

In an embodiment, the driver assistance apparatus 100 may be integrated with a display device 400 for vehicles. According to an embodiment, the driver assistance apparatus 100 illustrated in FIGS. 2 to 18B may be referred to as a vehicle display device.

Figure 2:
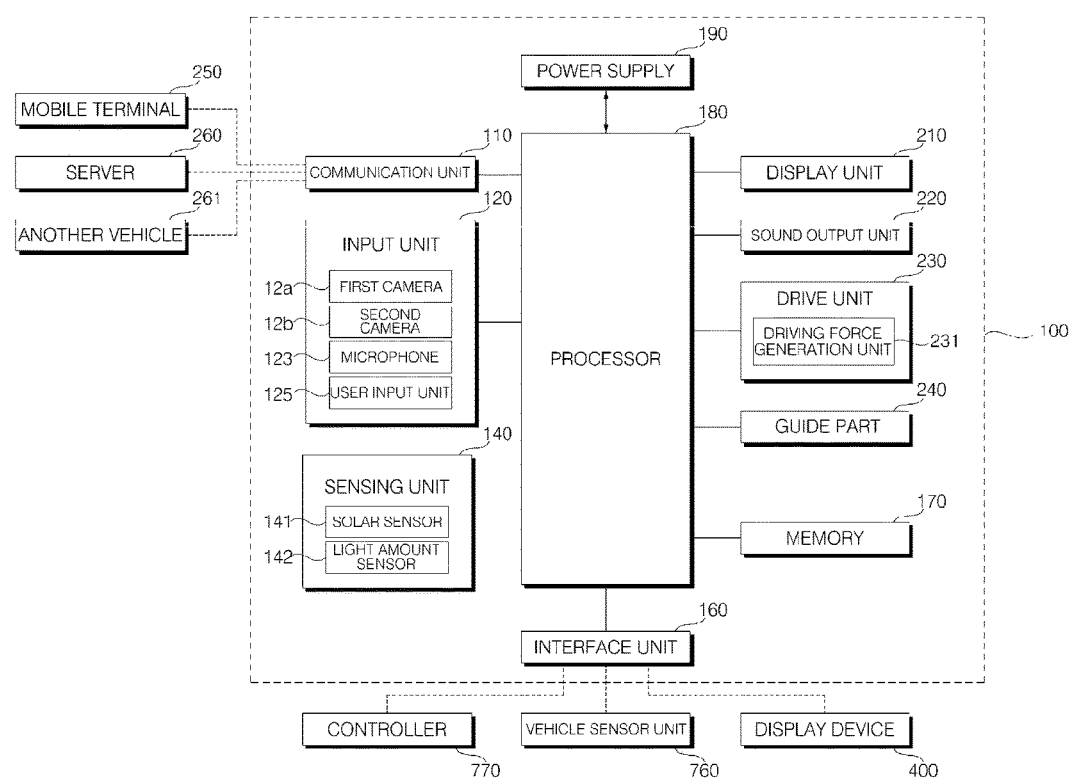
FIG. 2 is a block diagram illustrating a driver assistance apparatus according to an embodiment of the present invention.

FIG. 2 is a block diagram illustrating a driver assistance apparatus according to an embodiment of the present invention.

Referring to FIG. 2, the driver assistance apparatus 100 according to an embodiment of the present invention includes a communication unit 110, an input unit 120, a sensing unit 140, an interface unit 160, a memory 170, a processor 180, a power supply 190, a display unit 210, a sound output unit 220, a drive unit 230, and a guide part 240.

The communication unit 110 may exchange data with a mobile terminal 250, a server 260, or another vehicle 261 in a wireless manner. In particular, the communication unit 110 may wirelessly exchange data with the mobile terminal of the occupant in the vehicle. Applicable wireless data communication schemes may include Bluetooth, Wi-Fi Direct, Wi-Fi and APiX.

The communication unit 110 may receive weather information and traffic situation information (e.g., TPEG (Transport Protocol Experts Group) information) on the road from the mobile terminal 250, the server 260, or the other vehicle 261.

When a user enters the vehicle, the mobile terminal 250 of the user may be paired with the driver assistance apparatus 100 automatically or by execution of an application by the user.

The communication unit 110 may receive a control signal from the mobile terminal of the occupant in the vehicle. For example, the mobile terminal generates a control signal corresponding to an input signal received from the user, and transmits the control signal to the driver assistance apparatus 100. In this case, the communication unit 110 may receive the control signal and forward the control signal to the processor 180.

The input unit 120 may include a camera 121 or an image input unit for inputting an image signal, a microphone 123 or an audio input unit for inputting an audio signal, a user input unit (e.g., a touch key, a push key (e.g., a mechanical key)) for receiving input information from the user. The voice data or image data collected by the input unit 120 may be analyzed and processed as the user's control command.

The driver assistance apparatus 100 may include a plurality of cameras 121. The camera 121 processes image frames such as still images or moving images obtained by the image sensor. The processed image frames may be displayed on the display unit 210 or stored in the memory 170. Meanwhile, the plurality of cameras 121 provided in the driver assistance apparatus 100 may be arranged in a matrix structure, and a plurality of pieces of image information having various angles or focuses may be input to the driver assistance apparatus 100 the cameras 121 forming the matrix structure. In addition, the plurality of cameras 121 may be arranged in a stereo structure so as to obtain a left image and a right image to realize a stereoscopic image.

Meanwhile, the first camera 121a may be disposed at a position suitable for acquiring an image of the outside of the vehicle. A first camera 121a acquires an image of the surroundings of the vehicle and transmits the image to the processor 180. The first camera 121a may include two cameras arranged side by side in front of the vehicle to acquire a stereo image.

The second camera 121b may be disposed at a position suitable for capturing an image of the inside of the vehicle. Particularly, the second camera 121b may acquire an image of the occupant in the vehicle. For example, the second camera 121b may be disposed at a position where the second camera 121b can capture an image of the eyes of an occupant in order to track the occupant's gaze. For example, the second camera 121b may receive a gesture input from the occupant.

The microphone 123 processes an external sound signal into electrical voice data. The processed voice data may be utilized for various purposes according to a function (or an application program) which is being executed in the driver assistance apparatus 100. Meanwhile, various noise elimination algorithms for eliminating noise generated in receiving an external sound signal may be implemented in the microphone 123.

The microphone 123 may receive voice input of the occupant. The microphone 123 may convert the received voice input into an electrical signal.

The user input unit 125 serves to receive information input by the user. When information is input through the user input unit 125, the processor 180 may control the operation of the driver assistance apparatus 100 so as to correspond to the input information. The user input unit 125 may include a mechanical input means (or a mechanical key such as, for example, a button, a dome switch, a jog wheel, or a jog switch), and a touch input means.

The user input unit 125 may receive an input for controlling the drive unit 230 or the guide drive unit 245 from the occupant. The occupant in the vehicle may control the drive unit 230 through the user input unit 125 to adjust put-in or draw-out of the transparent flexible display. In addition, the occupant in the vehicle may adjust the angle of a contact portion 241 by controlling the guide drive unit 245 through the user input unit 125.

The sensing unit 140 may include at least one sensor for sensing at least one of the information in the driver assistance apparatus 100, the information about the surrounding environment surrounding the driver assistance apparatus 100, and the user information. For example, the sensing unit 140 may include a solar sensor 141 and a light amount sensor 142.

The solar sensor 141 tracks the position of the sun. For example, the solar sensor 141 tracks the azimuth and elevation angle of the sun. The solar sensor 141 may include one or more photodiodes to track the position of the sun.

The light amount sensor 142 senses the amount of light emitted into the vehicle. Specifically, the light amount sensor 142 senses the amount of solar light. The light amount sensor 142 may include a photoconductive element such as a CdS photoconductive cell or a CdS cell.

The interface unit 160 may receive map information related to travel of the vehicle by data communication with the display device 400. For example, the display device 400 may include a navigation system, and the interface 160 may receive a map and information about the location of the vehicle on the map and the map from the navigation system and may pass the same to the processor 180.

The interface unit 160 may receive sensor information from the controller 770 or the vehicle sensor unit 760.

Here, the sensor information may include at least one of a slip degree of the vehicle, vehicle movement direction information, vehicle location information (GPS information), vehicle orientation information, vehicle speed information, vehicle acceleration information, vehicle inclination information, vehicle drive/reverse information, battery information, fuel information, tire information, vehicular lamp information, interior temperature information, and interior humidity information.

Such sensor information may be acquired from a wheel speed sensor, a heading sensor, a yaw sensor, a gyro sensor, a position module, a vehicle drive/reverse sensor, a wheel sensor, a vehicle speed sensor, a vehicle body tilt sensor, a battery sensor, a fuel sensor, a tire sensor, a steering sensor based on turning of the steering wheel, an interior temperature sensor, and an interior humidity sensor. The position module may include a GPS module for receiving GPS information.

In the sensor information, the vehicle movement direction information, vehicle location information, vehicle orientation information, vehicle speed information and vehicle inclination information, which are related to travel of the vehicle, may be called vehicle travel information.

The memory 170 may store various kinds of data for overall operation of the driver assistance apparatus 100 including a program for the processing operation or control operation of the processor 180. The memory 170 may correspond to various storage devices such as ROM, RAM, EPROM, flash drive, hard drive, and the like.

The processor 180 controls the overall operation of each unit in the driver assistance apparatus 100. In particular, the processor 180 may control the display unit 210, the drive unit 230, and the guide part 240.

The processor 180 may calculate the length of the light blocking area or the image display area included in the transparent flexible display 211, based on the position of the sun. The processor 180 may control the drive unit 230 according to the calculated length to adjust the length of the light blocking area or the image display area. For example, the processor 180 may adjust the length of the light blocking area or the image display area, based on the occupant's gaze sensed by the second camera 121b and the position of the sun tracked through the solar sensor 141. Specifically, the processor 180 may control the drive unit 230 such that the light blocking area or the image display area can be positioned on a straight line formed by the occupant's gaze and the sun's position.

The processor 180 may calculate an angle formed by the light blocking area or the image display area with respect to the ground, based on the position of the sun. The processor 180 may control the guide part 240 according to the calculated angle. For example, the processor 180 may calculate the angle formed by the light blocking area or the image display area with respect to the ground, based on the occupant's gaze sensed through the second camera 121b and the position of the sun tracked through the solar sensor 141. Specifically, the processor 180 calculates the angle formed between the light blocking area or the image display area and the ground based on the occupant's gaze and the position of the sun and controls the guide drive unit according to the calculated angle to adjust the angle formed between the contact portion and the ground, so that the sunlight may be effectively blocked.

As described above, the processor 180 may calculate the length of the light blocking area or the image display area by considering the occupant's gaze sensed by the second camera 121b in addition to the position of the sun tracked through the solar sensor 141, and control the drive unit 230 according to the calculated length.

The processor 180 may receive information on the amount of light emitted into the vehicle from the light amount sensor 142. The processor 180 may adjust the transparency of the transparent flexible display 211 based on the amount of light.

The processor 180 receives data of images captured by the camera 121. The processor 180 signal-processes the image data based on computer vision to generate vehicle-related information. The processor 180 may display the vehicle-related information through one area of the transparent flexible display 211.

When the first camera 121a is configured by a stereo camera, the processor 180 may acquire stereo images of the front view of the vehicle from the first camera 121a, calculate disparity for the front view of the vehicle based on the stereo images, perform object detection in at least one of the stereo images based on the calculated disparity information, and then continue to track movement of an object after object detection.

Particularly, in performing object detection, the processor 180 may perform lane detection (LD), vehicle detection (VD), pedestrian detection (PD), brightspot detection (BD), traffic sign recognition (TSR), road surface detection, and the like.

The processor 180 may calculate the distance to a detected vehicle, the speed of the detected vehicle, and a difference in speed from the detected vehicle.

The processor 180 may generate vehicle-related information. The processor 180 may display the vehicle-related information through one area of the transparent flexible display 211. Here, the vehicle-related information may include vehicle control information for direct control of the vehicle or vehicle driving assistance information for a driving guide to the occupant in the vehicle. The vehicle-related information may be received through the input unit 120. Alternatively, the vehicle-related information may be received from a vehicle sensor unit 760 via the interface unit 160. Alternatively, the vehicle-related information may be received from the controller 770 via the interface unit 160. Alternatively, the vehicle-related information may be received from the mobile terminal 250 or the server 260 via the communication unit 110.

The processor 180 may be implemented by a digital signal processors (DSP), an application specific integrated circuit (ASIC), a microcontroller, programmable logic devices (PLDs), field programmable gate arrays (FPGAs), or an electrical unit for performing other functions, and may be mounted on one surface of a predetermined circuit board.

The power supply 190 may be controlled by the processor 180 to supply electric power necessary for operation of respective constituents. In particular, the power supply 190 may be supplied with power from, for example, a battery (not shown) in the vehicle. In particular, the power supply 190 may contact one area of the transparent flexible display area to supply power.

The display unit 210 displays (outputs) information processed by the processor 180. For example, the display unit 210 may display execution screen information on an application program driven by the driver assistance apparatus 100 or UI (User Interface) and GUI (Graphic User Interface) information according to the execution screen information.

The display unit 210 may include a transparent flexible display 211.

The transparent flexible display 211 may be configured to be deformable by external force. The deformation may be at least one of warping, bending, folding, twisting, and curling of the transparent flexible display 211.

When the transparent flexible display 211 is in an undeformed state (for example, a state in which the display has an infinite radius of curvature, hereinafter referred to as a first state), the display area of the transparent flexible display 211 forms a flat surface. When the display is switched from the first state to a deformed state (for example, a state having a finite radius of curvature, hereinafter referred to as a second state) d by an external force, the display area may form a curved surface. The information displayed in the second state may be visual information output on the curved surface. Such visual information is realized by independently controlling emission of light from unit pixels (sub-pixels) arranged in a matrix form. The unit pixel means a smallest unit for implementing one color.

The transparent flexible display 211 may be changed from the first state or the flat state to a warped state (e.g., a laterally or longitudinally warped state). In this case, when an external force is applied to the transparent flexible display 211, the transparent flexible display 211 may be deformed to be flat (or less warped) or more warped.

Meanwhile, the transparent flexible display 211 may be combined with a touch sensor to implement a flexible touchscreen. When the flexible touch screen is touched, the processor 180 may perform a control operation corresponding to the touch input. The flexible touchscreen may be configured to sense the touch input not only in the first state but also in the second state.

Meanwhile, the transparent flexible display 211 may have a predetermined transparency. In order to have such a transparency, the transparent flexible display 211 may include at least one of a transparent TFEL (Thin Film Elecroluminescent), a transparent OLED (Organic Light-Emitting Diode), a transparent LCD (Liquid Crystal Display), a transmissive transparent display, and a transparent LED (Light Emitting Diode). The transparency of the transparent flexible display 211 may be adjusted under control of the processor 180.

Meanwhile, the transparent flexible display 211 may be provided within the vehicle such that the length of the transparent flexible display 211 is adjustable. The transparent flexible display 211 may block light emitted into the vehicle and display at least one image.

The transparent flexible display 211 may include a light blocking area or an image display area. Here, the light blocking area adjusts the transparency of the transparent flexible display 211 to prevent the light incident from the sun from being directly radiated to the occupant. The size or the degree of transparency of the light blocking area may be adjusted based on the data sensed by the solar sensor 141 or the light amount sensor 142 in. The image display area displays information processed by the processor 180. A plurality of image display areas may be provided. The processor 180 processes a control command or data transmitted from the communication unit 110, the input unit 120, the interface unit 160, or the memory 170 and displays the processed control command or data in the image display area. For example, the image display area included in the transparent flexible display 211 may display an image acquired by the camera 121.

Meanwhile, the image display area included in the transparent flexible display 211 may display the state of the guide part 240 or the drive unit 230. Here, the state of the guide part 240 or the drive unit 230 may be displayed numerically or graphically. For example, the image display area may display the degree of draw-in and draw-out of the transparent flexible display 211, the angle formed between the contact portion and the ground, and the like.

The transparent flexible display 211 may move according to the driving force generated by the drive unit 230. In the transparent flexible display 211, the length of the light blocking area or the image display area may be adjusted based on the driving force. For example, the transparent flexible display 211 may be moved in the vehicle travel direction or the direction opposite to the vehicle travel direction according to the driving force generated by the drive unit 230.

The area of the transparent flexible display 211 except the light blocking area or the image display area may be wound around according to the driving force generated by the drive unit 230. For example, when the driving force generation unit 231 included in the drive unit 230 is a motor, the area of the transparent flexible display 211 except the light blocking area or the image display area may be released or wound through the rotational force of the motor to draw out or in the light blocking area or the image display area.

The sound output unit 220 converts an electric signal from the processor 180 into an audio signal and outputs the audio signal. To this end, the sound output unit 220 may include a speaker or the like. The sound output unit 220 may output sound corresponding to the operation of the user input unit 125, that is, the button.

The drive unit 230 is connected to the transparent flexible display 211 to control adjustment of the length of the light blocking area or the image display area included in the transparent flexible display 211. For example, the drive unit 230 may adjust the length of the light blocking area based on the azimuth angle and the elevation angle of the sun tracked by the solar sensor 141. For example, when an input signal for controlling the length of the light blocking area or the image display area is received through the user input unit 125, the drive unit 230 may correspondingly adjust the length of the light blocking area or the image display area.

Meanwhile, the drive unit 230 may include a driving force generation unit 231. The driving force generation unit 231 provides a driving force that allows the transparent flexible display 211 connected to the drive unit 230 to move forward or backward. For example, the driving force generation section 231 may include a motor or an actuator. For example, when the driving force generation unit 231 is configured as a motor, the length of the light blocking area or the image display area of the transparent flexible display 211 may be adjusted according to the driving force generated. For example, when the driving force generation unit 231 is configured by an actuator, the length of the light blocking area or the image display area of the transparent flexible display 211 may be adjusted according to the driving force generated in the actuator.

The drive unit 230 may transmit driving force to the transparent flexible display 211 such that the area except the light blocking area or the image display area is wound. For example, when the driving force generation unit 231 included in the drive unit 230 is configured by a motor, the drive unit 230 may provide rotational force of the motor to draw in or out the light blocking area or the image display area. In this case, in the transparent flexible display 211, the area except the light blocking area or the image display area may be wound or unwound based on the rotational force. The driver assistance apparatus 10) may further include a stopper. Here, the stopper limits winding of the transparent flexible display 211.

The drive unit 230 may further include an elastic part. Here, the elastic part may support the transparent flexible display 211 upward. As the transparent flexible display 211 is supported upward by the elastic part, vertical movement of the transparent flexible display 211 is restricted. Because of such function of the elastic part, movement of the transparent flexible display 211 is limited and thus the transparent flexible display 211 is fixed without shaking even when the vehicle moves up and down.

The guide part 240 is provided inside the vehicle. The guide part 240 guides movement of the transparent flexible display when the length of the transparent flexible display 211 is adjusted.

The guide part 240 may include a contact portion and a guide drive unit. The contact portion may contact the transparent flexible display. The contact portion forms a predetermined angle with the ground. The contact portion guides movement of the transparent flexible display. The guide drive unit adjusts the angle formed between the contact portion and the ground. For example, the guide drive unit may include a driving force generation means, such as a motor or an actuator, to adjust the angle formed by the contact portion and the ground.

FIGS. 3A to 4B illustrate a transparent flexible display, a drive unit, and a guide part according to an embodiment of the present invention. FIGS. 3A to 4B are side views of a driver's seat inside a vehicle provided with the driver assistance apparatus 100.

Figure 3A:
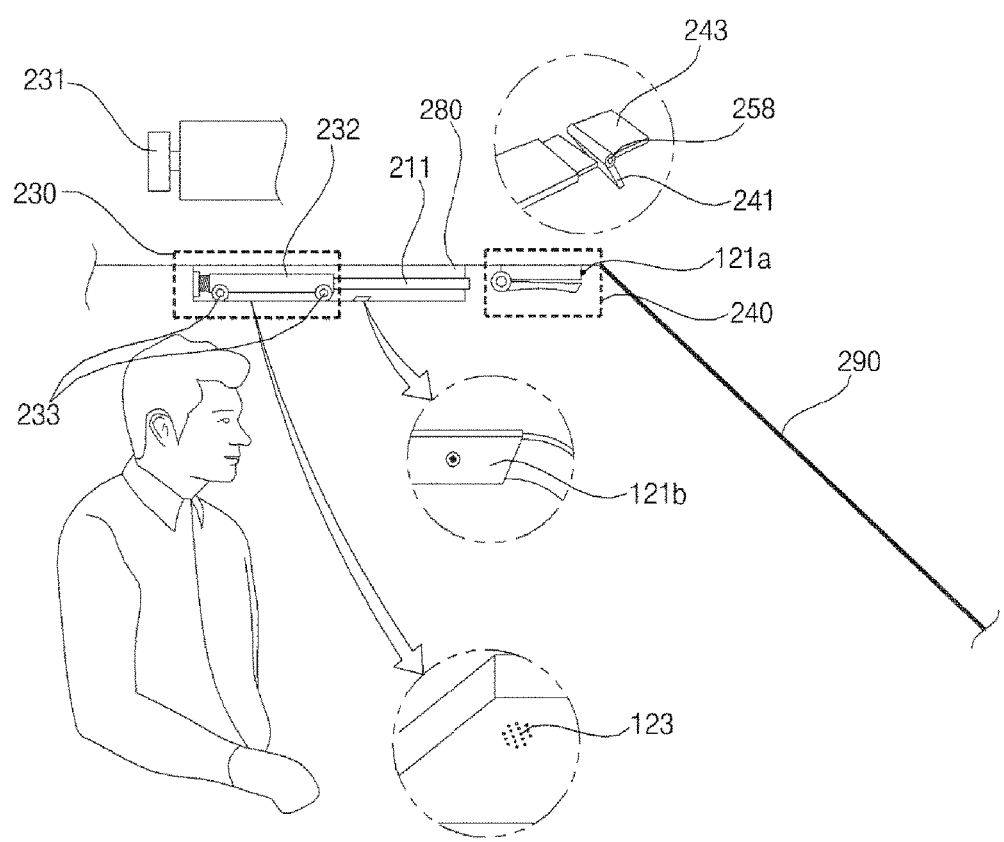
FIGS. 3A to 4B illustrate a transparent flexible display, a drive unit, and a guide part according to an embodiment of the present invention.
Figure 3B:
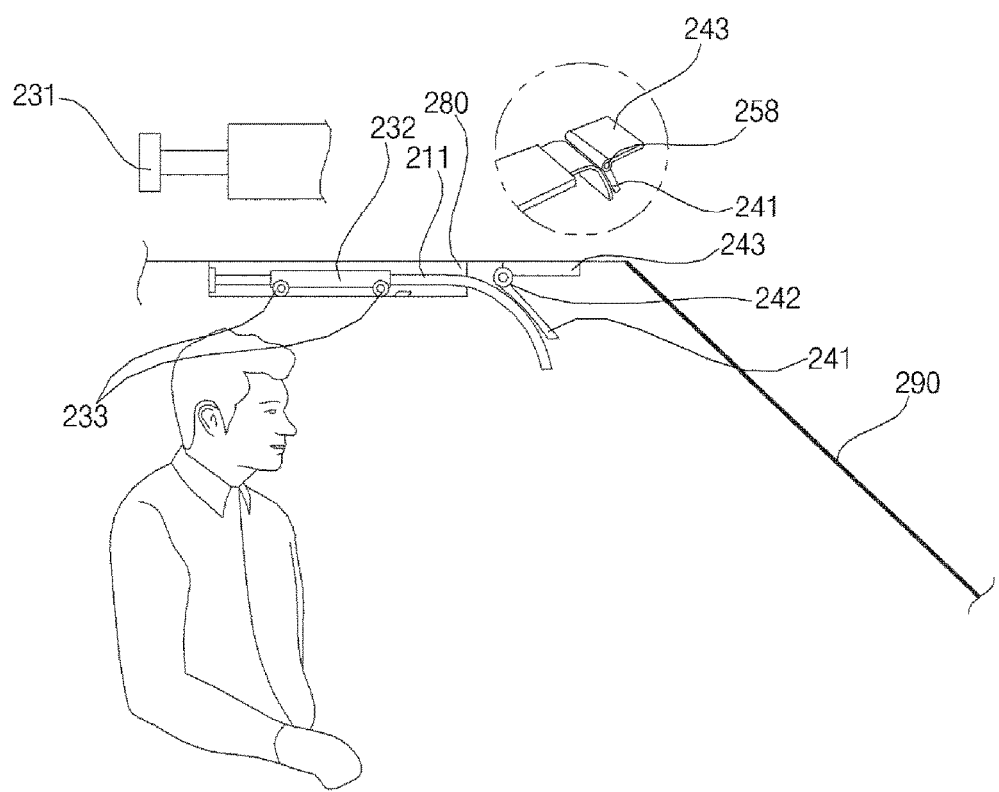

Referring to FIGS. 3A and 3B, the drive unit 230 is connected to the transparent flexible display 211 to control adjustment of the length of the light blocking area or the image display area included in the transparent flexible display 211.

The drive unit 230 may include a driving force generation unit 231, a connector 232, and a moving part 233.

The driving force generation unit 231 provides driving force that allows the transparent flexible display 211 connected to the drive unit 230 to move forward or backward under control of the processor 180. While it is illustrated in the figures that the driving force generation unit 231 is a linear motor, but embodiments of the present invention are not limited thereto. The driving force generation unit 231 generates driving force according to a control command of the processor 180.

The connector 232 connects the drive unit 230 and the transparent flexible display 211. The moving part 233 is attached to the lower end of the connector 232. The moving part 233 may be a roller.

The drive force generated by the drive force generation unit 231 is transmitted to the connector 232. The drive unit 230 may move forward or backward through the driving force. That is, the drive unit 230 may move linearly toward the windshield 290 or away from the windshield 290 through the driving force. Thereby, the transparent flexible display 211 connected to the drive unit 230 through the connector 232 may be drawn out of the housing 280 or drawn into the housing 280. FIG. 3A illustrates the transparent flexible display 211 positioned drawn into the housing 280, and FIG. 3B illustrates the transparent flexible display 211 positioned drawn out of the housing 280.

Meanwhile, the housing 280 accommodating the drive unit 230 may be attached to the ceiling over the driver's seat in the vehicle.

The guide part 240 may include a contact portion 241 and a guide drive unit 243.

The contact portion 241 may contact the transparent flexible display 211. For example, when the transparent flexible display 211 is drawn out of the housing 280, the contact portion 241 contacts the transparent flexible display 211. When the transparent flexible display 211 is continuously drawn out while being in contact with the contact portion 241, the contact portion 241 guides the movement direction of the transparent flexible display 211. For example, the contact portion 241 guides the transparent flexible display 211 to move downward at a predetermined angle. FIG. 3B illustrates that the transparent flexible display 211 is guided by the contact portion 241, forming a predetermined angle downward.

The guide drive unit 243 adjusts an angle formed by the contact portion 241 with respect to the ground. For example, in order to adjust the angle formed by the transparent flexible display 211 with respect to the ground, the guide driver 243 may adjust the angle formed by the contact portion 241 with respect to the ground. Here, the angle formed by the transparent flexible display 211 and the ground may be calculated by the processor 180 based on the position of the sun or the gaze of the occupant.

Meanwhile, the second camera 121b may be disposed in one area of the housing 280 such that the lens of the camera faces the occupant. The second camera 121b may sense the gaze or gesture of the occupant. In addition, the microphone 123 may be disposed in one area of the housing 280 so as to facilitate reception of the occupant's voice.

On the other hand, the first camera 121a may be disposed between the guide part 240 and the windshield 290 such that the lens of the camera faces forward of the vehicle.

Figure 4A:
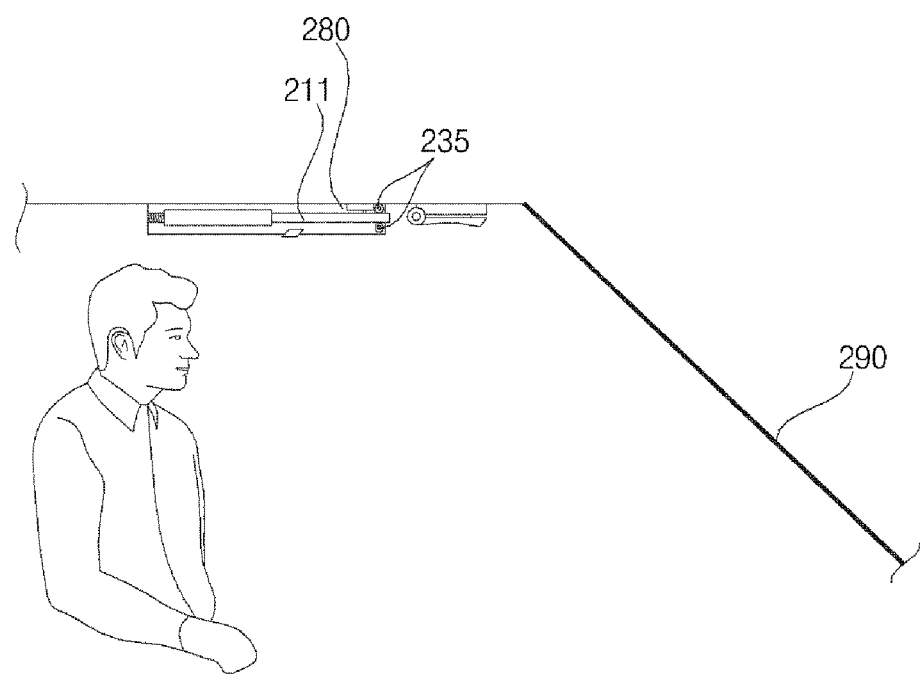
Figure 4B:
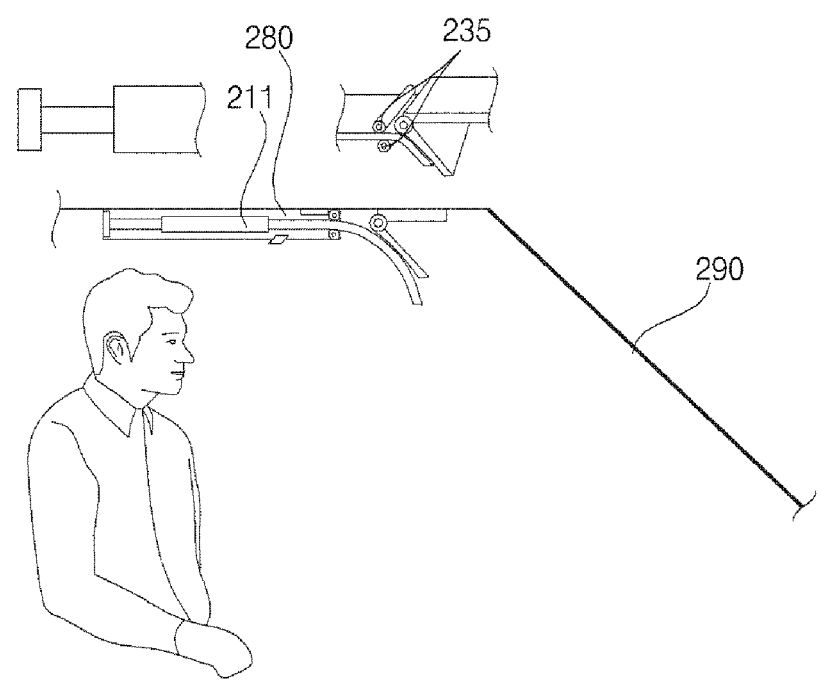

FIGS. 4A and 4B show differences in the position of the roller 235 over FIGS. 3A and 3B. The differences will be described below. Referring to 4A and 4B, the driver assistance apparatus 100 may include one or more rollers 235. When the transparent flexible display 211 is drawn out of or drawn into the housing 280 by the driving force generated by the driving force generation unit 231, the rollers 235 reduce the frictional force produced according to movement of the transparent flexible display 211. For example, when the transparent flexible display 211 is drawn out of the housing 280, the rollers 235 rotate in contact with the transparent flexible display 211. Drawing out the transparent flexible display 211 is facilitated by rotation of the rollers 235. For example, when the transparent flexible display 211 is drawn into the housing 280, the rollers 235 rotate in contact with the transparent flexible display 211. As the rollers 235 rotate, drawing in the transparent flexible display 211 is facilitated.

Figure 5A:
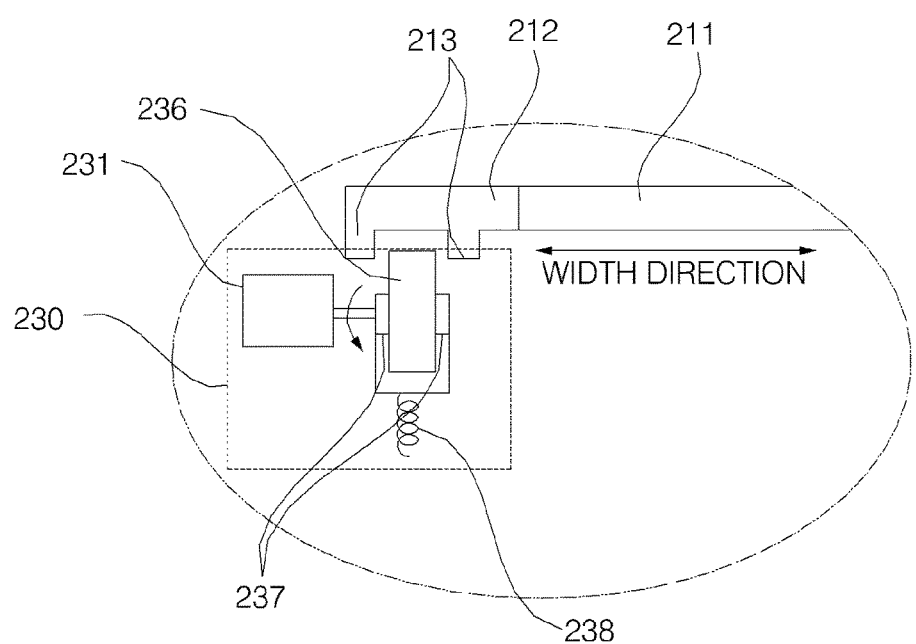
FIG. 5A is a view illustrating the drive unit 230 according to an embodiment of the present invention.

FIG. 5A is a view illustrating the drive unit 230 according to an embodiment of the present invention. FIG. 5A is a partial front view showing the drive unit 230 viewed from the windshield 290 of FIG. 3A. FIG. 5A illustrates a first drive unit 230a disposed on one side of the transparent flexible display 211 in the width direction. A second drive unit 230b may be disposed on the other side of the transparent flexible display 211 in the width direction, such that the second drive unit 230b corresponds to the first drive unit 230a.

Referring to FIG. 5A, the drive unit 230 may include a driving force generation unit 231, a rotating part 236, a fixing part 237, and an elastic part 238. In addition, the display unit 210 may include a transparent flexible display 211, an extension 212, and a protrusion 213.

The driving force generation unit 231 generates driving force under control of the processor 180. In the figure, the driving force generation unit 231 is illustrated as being a motor. The generated driving force is transmitted to the rotating part 236. As the rotating part 236 rotates, the transparent flexible display 211 moves. The rotation portion 237 is disposed between the two protrusions 213.

The fixing part 237 restricts movement of the rotation portion 236 other than rotation. The fixing part 237 restricts the upward, downward, leftward, rightward, forward, and backward movements of the rotating part 236 such that rotational force is transmitted to the display part 210.

The elastic part 238 is connected to the fixing part 237. The elastic part 238 includes an elastic member that provides elasticity. Although the spring is illustrated in this figure, embodiments of the present invention are not limited thereto. The elastic part 238 allows the display portion 210 to be supported upward, that is, toward the ceiling of the vehicle. As the transparent flexible display 211 is supported upward by the elastic part, vertical movement of the transparent flexible display 211 is restricted. Because of the function of the elastic part, movement of the transparent flexible display 211 is limited and the transparent flexible display 211 is fixed without checking even when the vehicle moves up and down.

The extension 212 extends from the display 211 toward one side in the width direction. The protrusions 213 protrude downward from the extension 236. The rotating part 236 is disposed between the two protrusions 213. Since the rotating part 236 is disposed between the two protrusions 213, the rotational force generated by the rotating part 236 may be accurately transmitted to the display part 210.

Figure 5B:
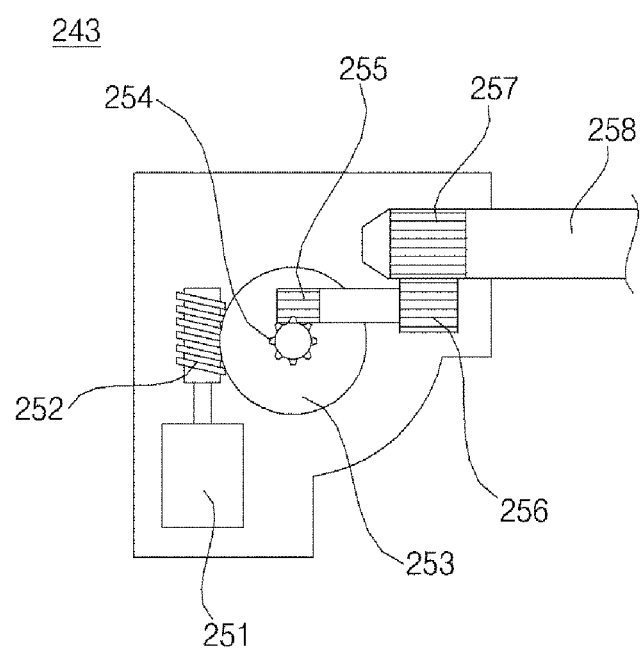
FIG. 5B is a view illustrating a guide drive unit according to an embodiment of the present invention.

FIG. 5B is a view illustrating a guide drive unit according to an embodiment of the present invention.

Referring to FIG. 5B, in the guide drive unit 243, a first worm gear 252 is connected to the shaft of the rotating motor 251 under control of the processor 180. The first worm gear 252 is engaged with a first worm wheel gear 253 that reduces the rotation speed of the motor 251 and converts the rotation axis to be orthogonal to the motor shaft. A second worm wheel gear 255 is engaged with the second worm gear 254 formed integrally with the first worm wheel gear 253. The second worm wheel gear 255 serves to convert the axis of rotation of the first worm wheel gear 253 and the second worm gear 254 by a right angle.

A first spur gear 256 is positioned on the same axis as the second worm wheel gear 255. The first spur gear 256 is engaged with a second spur gear 257 formed at the end of a pivot 258 to transmit the rotational force to the contact portion 241.

Figure 6:
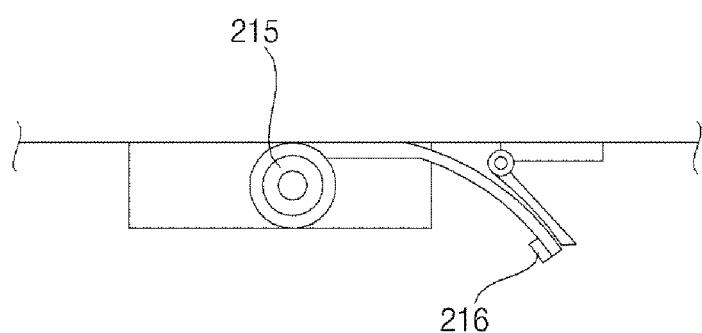
FIG. 6 is a view illustrating a drive unit according to another embodiment of the present invention.

FIG. 6 is a view illustrating a drive unit according to another embodiment of the present invention.

Referring to FIG. 6, the drive unit 230 may transmit driving force to the transparent flexible display 211 such that the area 215 of the transparent flexible display 211 excluding the light blocking area or the image display area is wound.

Here, the area 215 excluding the light blocking area or the image display area may be formed of a material that is extended from the transparent flexible display 211 and is deformable by external force. According to an embodiment, the area 215 may be formed of the same material as that of the transparent flexible display 211.

In the case where the driving force generation unit 231 included in the drive unit 230 is a motor, the drive unit 230 may provide the rotational force of the motor to draw in or out the light blocking area or the image display area. Here, the drive unit 230 may be the drive unit described with reference to FIG. 5A. In this case, the area 215 excluding the light blocking area or the image display area in the transparent flexible display 211 may be wound or unwound based on the rotational force. The drive unit 230 may further include a stopper 216. Here, the stopper 216 restricts winding of the transparent flexible display 211.

Figure 7:
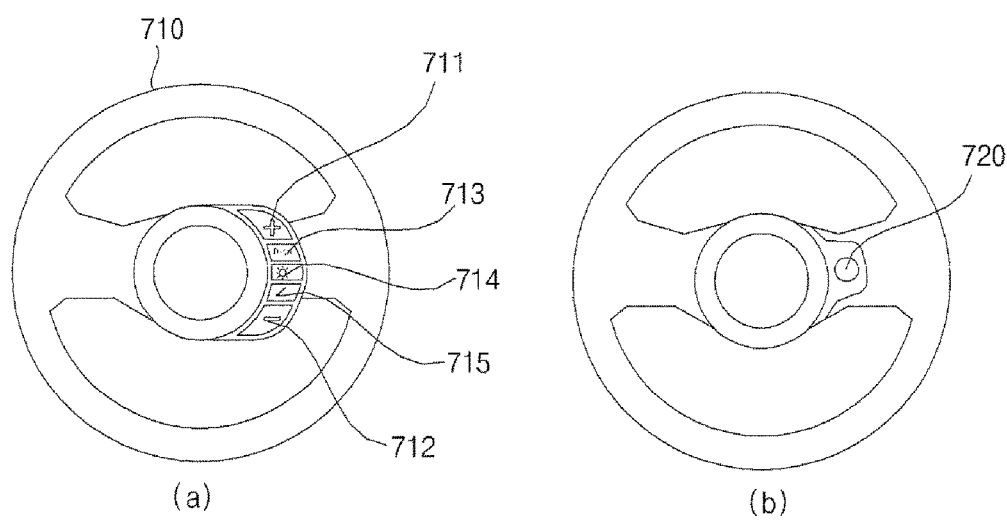
FIG. 7 is an exemplary internal block diagram of the vehicle of FIG. 1.
Figure 8:
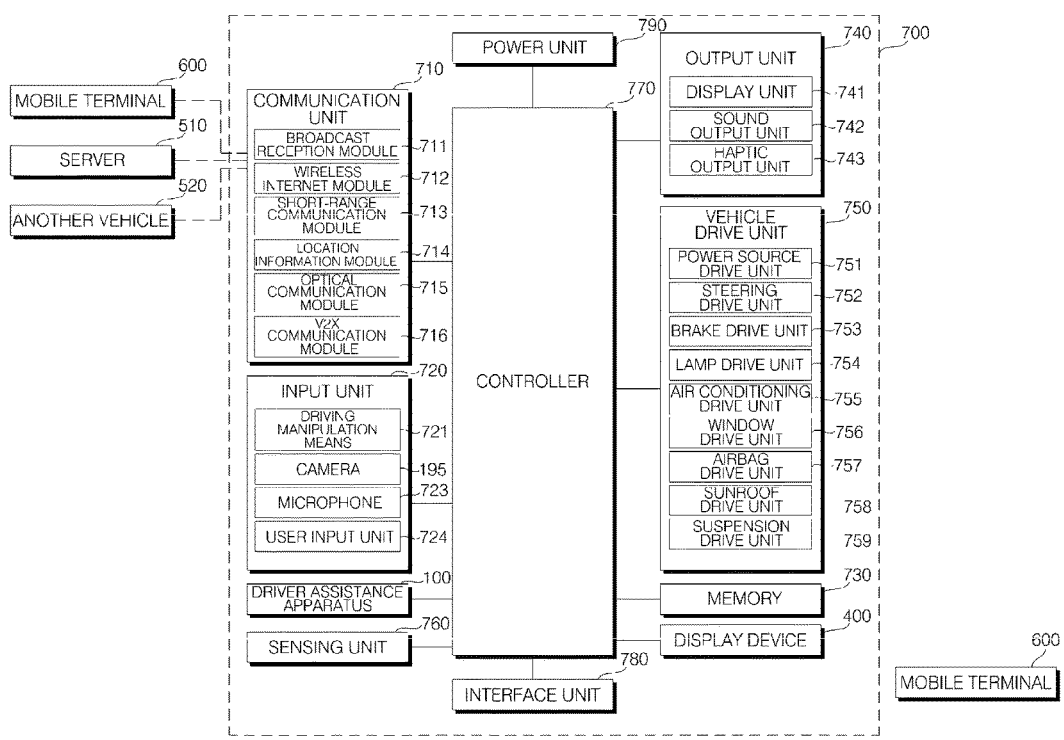
FIG. 8 is an exemplary internal block diagram of the electronic control unit in the vehicle of FIG. 1.

FIG. 7 is a diagram illustrating a user input unit 125 according to an embodiment of the present invention.

Referring to FIG. 7, the user input unit 125 may be attached to the steering wheel 310. The user input unit 125 may be configured to allow the occupant to perform inputting with a thumb while holding the steering wheel 310.

As shown in FIG. 7(a), the user input unit 125 includes a "+" button 311, a "−" button 312, a first button 313, a second button 314, a third button 315. Here, each of the buttons 311, 312, 313, 314, and 315 may be a physical button or a soft key.

When an input is received through the first button 313 and an input is received through the "+" button, the processor 180 controls the transparent flexible display 211 to move downward. For example, the processor 180 controls the drive unit 230 to cause the transparent flexible display 211 to be drawn out of the housing. At this time, the movement direction of the transparent flexible display 211 is changed through a guide part 240 so as to have a predetermined angle downward. Thereby, the transparent flexible display 211 may be moved downward.

When an input is received through the first button 313 and an input is received through the "−" button, the processor 180 controls the transparent flexible display 211 to move upward. For example, the processor 180 controls the drive unit 230 to cause the transparent flexible display 211 to be drawn into the housing.

When an input is received through the second button 314 and an input is received through the "+" button, the processor 180 adjusts the transparency of the transparent flexible display 211 such that the transparency increases.

When an input is received through the second button 314 and an input is received through the "−" button, the processor 180 adjusts the transparency of the transparent flexible display 211 such that the transparency decreases.

When an input is received through the third button 315 and an input is received through the "+" button, the processor 180 controls the guide drive unit 243 to adjust the angle at which the contact portion 241 forms with respect to the ground such that the angle increases.

When an input is received through the third button 315 and an input is received through the "−" button, the processor 180 controls the guide drive unit 243 to adjust the angle at which the contact portion 241 forms with respect to the ground such that the angle decreases.

As shown in FIG. 7(b), the user input unit 125 may be configured as a ball type 320. The ball type user input unit may receive upward, downward, leftward, and rightward rolling inputs.

For example, when a rolling input in a first direction is received, the processor 180 controls the transparent flexible display 211 to move downward. For example, the processor 180 controls the drive unit 230 to cause the transparent flexible display 211 to be drawn out of the housing. At this time, the movement direction of the transparent flexible display 211 is changed through the guide part 240 so as to have a predetermined angle downward. Thereby, the transparent flexible display 211 may be moved downward.

For example, when a rolling input in a second direction is received, the processor 180 controls the transparent flexible display 211 to move upward. For example, the processor 180 controls the drive unit 230 to cause the transparent flexible display 211 to be drawn into the housing.

For example, when a rolling input in a third direction is received, the processor 180 adjusts the transparency of the transparent flexible display 211 such that the transparency increases.

For example, when a rolling input in a fourth direction is received, the processor 180 adjusts the transparency of the transparent flexible display 211 such that the transparency decreases.

It should be noted that the control operations of the processor 180 corresponding to the rolling directions described above are merely illustrative. Various embodiments may be implemented depending on matching between the rolling directions and the corresponding control operations of the processor 180, which may also be within the scope of the present invention.

FIG. 7 is an exemplary internal block diagram of the vehicle of FIG. 1.

The vehicle 700 may include a communication unit 710, an input unit 720, a sensing unit 760, an output unit 740, a vehicle drive unit 750, a memory 730, an interface unit 780, a controller 770, a power unit 790, a driver assistance apparatus 100, and a display device 400 for a vehicle.

The communication unit 710 may include at least one module enabling wireless communication between the vehicle 700 and a mobile terminal 600, between the vehicle 700 and an external server 601, or between the vehicle 700 and another vehicle 602. The communication unit 710 may also include at least one module for connecting the vehicle 700 to at least one network.

The communication unit 710 may include a broadcast reception module 711, a wireless Internet module 712, a short-range communication module 713, a location information module 714, an optical communication module 715, and a V2X communication module 716.

The broadcast reception module 711 receives a broadcast signal or broadcast-related information from an external broadcast management server over a broadcast channel. Herein, the broadcast includes radio broadcast or TV broadcast.

The wireless Internet module 712, which refers to a module for wireless Internet access, may be internally or externally installed to the vehicle 700. The wireless Internet module 712 is configured to transmit and receive a radio signal over a communication network according to wireless Internet technologies.

Examples of wireless Internet technologies include Wireless LAN (WLAN), Wi-Fi, Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A). The wireless Internet module 712 transmits and receives data according to at least one of the aforementioned wireless Internet technologies. For example, the wireless Internet module 712 may wirelessly exchange data with the external server 601. The wireless Internet module 712 may receive weather information and traffic situation information (e.g., TPEG (Transport Protocol Expert Group) information) from the external server 601.

The short-range communication module 713, which is used for short-range communication, may support short-range communication using at least one of Bluetooth™, Radio Frequency Identification (RFID), Infrared Data Association (IrDA), ultra wideband (UWB), ZigBee, Near Field Communication (NFC), Wi-Fi, Wi-Fi Direct, and Wireless Universal Serial Bus (Wireless USB) technologies.

The short-range communication module 713 may establish a wireless local area network to implement short-range communication between the vehicle 700 and at least one external device. For example, the short-range communication module 713 may wirelessly exchange data with the mobile terminal 600. The short-range communication module 713 may receive weather information and traffic situation information (e.g., TPEG (Transport Protocol Expert Group)) from the mobile terminal 600. For example, once a user enters the vehicle 700, the mobile terminal 600 of the user may be paired with the vehicle 700 automatically or by execution of an application by the user.

A typical example of the location information module 714, which serves to acquire the location of the vehicle 700, is a global positioning system (GPS) module. For example, if the vehicle utilizes the GPS module, the location of the vehicle may be acquired using a signal from a GPS satellite.

The optical communication module 715 may include a light transmitter and a light receiver.

The light receiver may covert a light signal into an electrical signal to receive information. The light receiver may include a photodiode (PD) for receiving light. The PD is capable of converting light into an electrical signal. For example, the light receiver may receive information on a preceding vehicle through light emitted from a light source included in the foregoing vehicle.

The light transmitter may include at least one light emitting device for converting an electrical signal into a light signal. Preferably, the light emitting device is a light emitting diode (LED). The light transmitter converts an electrical signal into a light signal and transmits the light signal outside. For example, the light transmitter transmits a light signal by blinking a light emitting device at a predetermined frequency. According to some embodiments, the light transmitter may include an array of a plurality of light emitting devices. According to some embodiments, the light transmitter may be integrated with a lamp provided to the vehicle 700. For example, the light transmitter may be at least one of a headlight, a taillight, a stop lamp, a turn signal lamp and a sidelight. For example, the optical communication module 715 may exchange data with the other vehicle 602 through optical communication.

The V2X communication module 716 serves to perform wireless communication with the server 601 or another vehicle 602. The V2X communication module 716 includes a module capable of implementing a vehicle-to-vehicle communication (V2V) protocol or a vehicle-to-infrastructure communication (V2I) protocol. The vehicle 700 may perform wireless communication with the external server 601 or the other vehicle 602 through the V2X communication module 716.

The input unit 720 may include a driving manipulation means 721, a camera 195, a microphone 723 and a user input unit 724.

The driving manipulation means 721 receives user input for driving the vehicle 700. The driving manipulation means 721 may include a steering input means 721a, a shift input means 721b, an acceleration input means 721c, and a brake input means 721d.

The steering input means 721a receives a travel direction input of the vehicle 700 from the user. Preferably, the steering input means 721a is formed in the shape of a wheel to allow steering input through rotation. According to some embodiments, the steering input means 721a may include a touchscreen, a touch pad, or a button.

The shift input means 721b receives, from the user, inputs for Park (P), Drive (D), Neutral (N) and Reverse (R) of the vehicle 700. Preferably, the shift input means 721b is formed in the shape of a lever. According to some embodiments, the shift input means 721b may include a touchscreen, a touch pad, or a button.

The acceleration input means 721c receives an input for accelerating the vehicle 700 from the user. The brake input means 721d receives an input for decelerating the vehicle 700 from the user. Preferably, the acceleration input means 721c and the brake input means 721d are formed in the shape of a pedal. According to some embodiments, the acceleration input means 721c or the brake input means 721d may include a touchscreen, a touch pad, or a button.

The camera 195 may include an image sensor and an image processing module. The camera 195 may process a still image or a moving image obtained by the image sensor (e.g., CMOS or CCD). The image processing module may extract necessary information by processing the still image or moving image obtained through the image sensor, and transfer the extracted information to the controller 170.

Meanwhile, the vehicle 100 may include a front view camera 195a for capturing an image of the front view of the vehicle, an around-view camera 195b for capturing an image of the surroundings of the vehicle, and an internal camera 195c for capturing an image of the interior of the vehicle. Each camera 195a, 195b, 195c may include a lens, an image sensor, and a processor. The processor may perform computer processing on the captured images, generate data or information, and transmit the generated data or information to the controller 170.

The processor included in the camera 195 may be controlled by the controller 170.

The processor included in the camera 195 may be implemented as hardware using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units for performing other functions.

The front view camera 195a may include a stereo camera. In this case, the processor of the camera 195a may detect the distance to an object, the relative speed with respect to an object detected in the image, and the distance between plural objects, using the disparity detected in stereo images.

The front view camera 195a may include a time of flight (TOF) camera. In this case, the camera 195 may include a light source (for example, an infrared ray or laser) and a receiver. In this case, the processor of the camera 195a may detect the distance to an object, the relative speed with respect to the object, the distance between plural objects, based on the time (TOF) time taken to receive the infrared ray or laser emitted from the light source and reflected on the object.

The surround view camera 195b may include a plurality of cameras. For example, the cameras may be disposed on the left, back, right and front of the vehicle, respectively.

The left camera may be disposed in a case surrounding the left side-view mirror. Alternatively, the left camera may be disposed at the exterior of the case surrounding the left side-view mirror. Alternatively, the left camera may be disposed in one outer area of the left front door, left rear door or left fender.

The right camera may be disposed in a case surrounding the right side-view mirror. Alternatively, the right camera may be disposed at the exterior of the case surrounding the right side-view mirror. Alternatively, the right camera may be disposed in one outer area of the right front door, right rear door or right fender.

The rear camera may be disposed near the rear license plate, the trunk, or a tail gate switch.

The front camera may be disposed near the emblem or the radiator grille.

Images captured by the plurality of cameras may be transmitted to the processor of the camera 195b, and the processor may synthesize the images to generate a surroundings-of-vehicle image. At this time, the surroundings-of-vehicle image may be displayed through the display unit 141 as a top view image or bird's eye view image.

The internal camera 195c may capture an image of the interior of the vehicle 100. The internal camera 195c may acquire an image of the occupant.

The processor of the internal camera 195c may acquire an image of occupants in the vehicle 100, and detect the number of occupants in the vehicle and the seat positions of the occupants. For example, the internal camera 195c may detect presence or absence of passengers and the positions of the passengers.

The internal camera 195c may acquire an image for biometric recognition of the occupant. The processor of the internal camera 195c may confirm the ID of the occupant based on the facial image of the occupant.

While FIG. 7 illustrates the camera 195 as being included in the input unit 720, the camera 195 may be included in the sensing unit 125.

The microphone 723 may process an external sound signal into electrical data. The data created through processing may be utilized for various purposes according to functions being performed in the vehicle 700. The microphone 723 may convert a voice command from the user into electrical data. The electrical data may be delivered to the controller 770.

According to an embodiment, the camera 722 or microphone 723 may be included in the sensing unit 760 rather than in the input unit 720.

The user input unit 724 serves to receive information input by the user. When information is input through the user input unit 724, the controller 770 may control operation of the vehicle 700 so as to correspond the input information. The user input unit 724 may include a touch input means or a mechanical input means. According to some embodiments, the user input unit 724 may be disposed in one area of the steering wheel. In this case, the driver may manipulate the user input unit 724 with fingers while holding the steering wheel.

The sensing unit 760 senses a signal related to traveling of the vehicle 700. To this end, the sensing unit 760 may include a collision sensor, a wheel sensor, a speed sensor, a tilt sensor, a weight sensor, a heading sensor, a yaw sensor, a gyro sensor, a position module, a vehicle drive/reverse sensor, a battery sensor, a fuel sensor, a tire sensor, a steering sensor based on turning of the steering wheel, a vehicle interior temperature sensor, a vehicle interior humidity sensor, a rain sensor, an ultrasonic sensor, radar, and LiDAR (Light Detection And Ranging).

Thereby, the sensing unit 760 may acquire sensing signals carrying vehicle collision information, vehicle direction information, vehicle location information (GPS information), vehicle orientation information, vehicle speed information, vehicle acceleration information, vehicle inclination information, vehicle drive/reverse information, battery information, fuel information, tire information, vehicle lamp information, vehicle interior temperature information, vehicle interior humidity information, information about whether it rains, and an angle by which the steering wheel is rotated.

The sensing unit 760 may further include an accelerator pedal sensor, a pressure sensor, an engine speed sensor, an air flow sensor (AFS), an intake air temperature sensor (ATS), a water temperature sensor (WTS), a throttle position sensor (TPS), a TDC sensor, and a crankshaft angle sensor (CAS).

The sensing unit 760 may include a biometric information sensing unit. The biometric information sensing unit senses and acquires biometric information of a passenger. The biometric information may include fingerprint information, iris scan information, retina scan information, hand geometry information, facial recognition information, and voice recognition information. The biometric information sensing unit may include a sensor for sensing biometric information of a person in the vehicle. Herein, the interior camera 195c and the microphone 723 may operate as sensors. The biometric recognition information sensing unit may acquire hand shape information and face recognition information through the interior camera 195c.

The output unit 740, which serves to output information processed by the controller 770, may include a display unit 741, a sound output unit 742 and a haptic output unit 743.

The display unit 741 may display information processed by the controller 770. For example, the display unit 741 may display vehicle-related information. Here, the vehicle-related information may include vehicle control information for controlling the direction of the vehicle or vehicle driving assistance information for assisting the driver in driving the vehicle. The vehicle-related information may also include vehicle condition information indicating the current condition of the vehicle or vehicle driving information related to driving.

The display unit 741 may include at least one of a liquid crystal display (LCD), a thin film transistor-liquid crystal display (TFT LCD), an organic light-emitting diode (OLED) display, a flexible display, a 3D display and an e-ink display.

The display unit 741 may form a layered architecture together with a touch sensor or be integrated with the touch sensor, thereby implementing a touchscreen. Such touchscreen may function as the user input unit 724 providing an input interface between the vehicle 700 and the user and also as an output interface between the vehicle 700 and the user. In this case, the display unit 741 may include a touch sensor for sensing touch applied to the display unit 741 in order to receive a control command in a touch manner. Thereby, when the display unit 741 is touched, the touch sensor may sense the touch, and the controller 770 may generate a control command corresponding to the touch. Content input in a touch manner may include characters, numbers, or menu items which can be indicated or specified in various modes.

Meanwhile, the display unit 741 may include a cluster to allow the driver to check the vehicle condition information or vehicle driving information during driving. The cluster may be positioned on the dashboard. In this case, the driver can check the information displayed on the cluster while looking forward.

According to some embodiments, the display unit 741 may be implemented as a head up display (HUD). If the display unit 741 is implemented as the HUD, information may be output through a transparent display provided to the windshield. Alternatively, the display unit 741 may be provided with a projection module, thereby outputting information through an image projected onto the windshield.

The sound output unit 742 converts an electrical signal from the controller 770 into an audio signal and outputs the audio signal. To this end, the sound output unit 742 may be provided with a speaker. The sound output unit 742 may output sound corresponding to operation of the user input unit 724.

The haptic output unit 743 generates haptic output. For example, the haptic output unit 743 may vibrate the steering wheel, a seat belt and a seat to allow the user to recognize the output.

The vehicle drive unit 750 may control operation of various vehicular devices. The vehicle drive unit 750 may include a power source drive unit 751, a steering drive unit 752, a brake drive unit 753, a lamp drive unit 754, an air conditioning drive unit 755, a window drive unit 756, an airbag drive unit 757, a sunroof drive unit 758 and a suspension drive unit 759.

The power source drive unit 751 may perform electronic control of the power source in the vehicle 700.

For example, if a fossil fuel-based engine (not shown) is the power source, the power source drive unit 751 may perform electronic control of the engine. Thereby, the output torque of the engine may be controlled. If the power source drive unit 751 is an engine, the output torque of the engine may be controlled by the controller 770 to limit the speed of the vehicle.

As another example, if an electric motor (not shown) is the power source, the power source drive unit 751 may control the motor. Thereby, the rotational speed and torque of the motor may be controlled.

The power source drive unit 751 may receive an acceleration control signal from the driver assistance apparatus 100. The power source drive unit 751 may control the power source according to the received acceleration control signal.

The steering drive unit 752 may perform electronic control of the steering apparatus in the vehicle 700. Thereby, the steering drive unit 752 may change the travel direction of the vehicle. The steering drive unit 752 may receive a steering control signal from the driver assistance apparatus 100. The steering drive unit 752 may control the steering apparatus to be steered according to the steering control signal.

The brake drive unit 753 may perform electronic control of a brake apparatus (not shown) in the vehicle 700. For example, by controlling the operation of the brakes disposed on the wheels, the speed of the vehicle 700 may be reduced. In another example, the brake disposed on a left wheel may be operated differently from the brake disposed on a right wheel in order to adjust the travel direction of the vehicle 700 to the left or right. The brake drive unit 753 may receive a deceleration control signal from the driver assistance apparatus 100. The brake drive unit 753 may control the brake apparatus according to the received deceleration control signal.

The lamp drive unit 754 may control lamps disposed inside and outside the vehicle to be turned on/off. In addition, the lamp drive unit 754 may control the intensity and direction of light from the lamps. For example, the lamp drive unit 754 may control a turn signal lamp and a brake lamp.

The air conditioning drive unit 755 may perform electronic control of an air conditioner (not shown) in the vehicle 700. For example, if the temperature of the interior of the vehicle is high, the air conditioning drive unit 755 may control the air conditioner to supply cool air to the interior of the vehicle.

The window drive unit 756 may perform electronic control of a window apparatus in the vehicle 700. For example, the window drive unit 756 may control opening or closing of the left and right windows on both sides of the vehicle.

The airbag drive unit 757 may perform electronic control of an airbag apparatus in the vehicle 700. For example, the unit may control the airbag apparatus such that the airbags are inflated when the vehicle is exposed to danger.

The sunroof drive unit 758 may perform electronic control of a sunroof apparatus (not shown) in the vehicle 700. For example, the sunroof drive unit 758 may control opening or closing of the sunroof.

The suspension drive unit 759 may perform electronic control of a suspension apparatus (not shown) in the vehicle 700. For example, when a road surface is uneven, the suspension drive unit 759 may control the suspension apparatus to attenuate vibration of the vehicle 700. The suspension drive unit 759 may receive a suspension control signal from the driver assistance apparatus 100. The suspension drive unit 759 may control the suspension apparatus according to the received suspension control signal.

The memory 730 is electrically connected to the controller 770. The memory 730 may store basic data for each unit, control data for controlling operation of each unit, and input/output data. When implemented through hardware, the memory 730 may include various storage devices such as a ROM, RAM, EPROM, flash drive, and hard drive. The memory 730 may store various kinds of data for overall operation of the vehicle 700, including a program for processing or controlling operation of the controller 770.

The interface unit 780 may serve as a path between the vehicle 700 and various kinds of external devices connected thereto. For example, the interface unit 780 may be provided with a port connectable to the mobile terminal 600, thus being connected to the mobile terminal 600 through the port. In this case, the interface unit 780 may exchange data with the mobile terminal 600.

The interface unit 780 may also serve as a path through which electrical energy is supplied to the mobile terminal 600 connected thereto. If the mobile terminal 600 is electrically connected to the interface unit 780, the interface unit 780 is controlled by the controller 770 to provide the mobile terminal 600 with electrical energy supplied from the power supply 790.

The controller 770 may control overall operations of the respective units in the vehicle 700. The controller 770 may be called an electronic control unit (ECU).

The controller 770 may be implemented as hardware using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units for performing other functions.

The power supply 790 may be controlled by the controller 770 to supply electric power necessary for operation of respective constituents. In particular, the power supply 790 may be supplied with power from, for example, a battery (not shown) in the vehicle.

The driver assistance apparatus 100 may exchange data with the controller 770. A control signal generated from the driver assistance apparatus 100 may be output to the controller 770. The driver assistance apparatus 100 may be the driver assistance apparatus described above with reference to FIGS. 1 to 7.

The vehicle display device 400 may exchange data with the controller 770.

Figure 9:
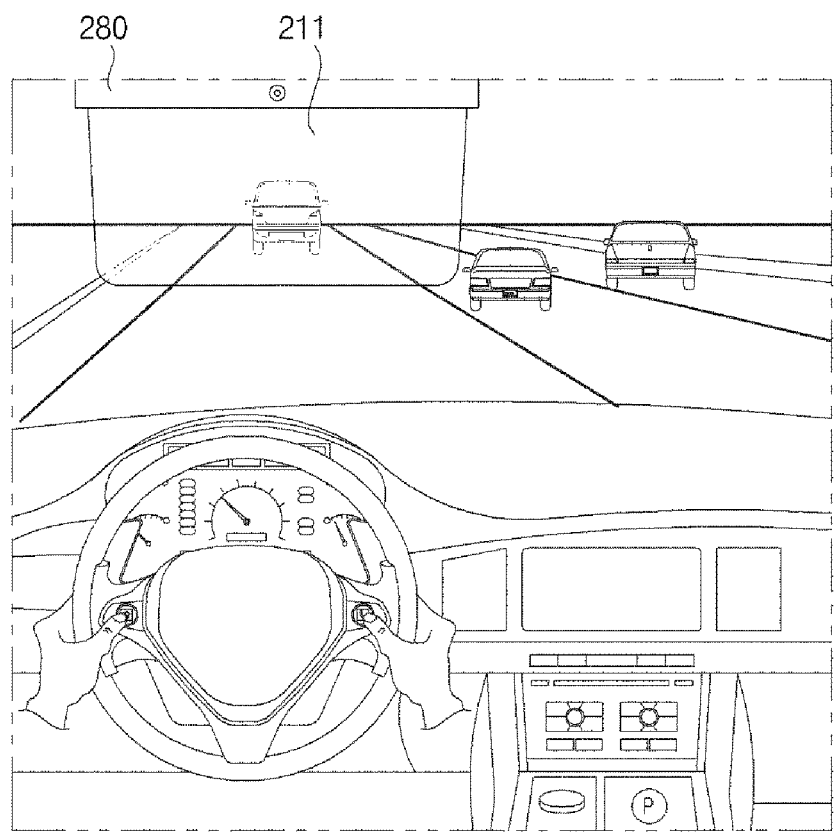
FIG. 9 is an exemplary diagram illustrating a driver assistance apparatus according to an embodiment of the present invention.

FIG. 9 is an exemplary diagram illustrating a driver assistance apparatus according to an embodiment of the present invention.

Referring to FIG. 9, the transparent flexible display 211 may be provided within the vehicle such that the length of the transparent flexible display 211 is adjustable. Specifically, the transparent flexible display 211 includes a light blocking area or an image display area. The transparency of the transparent flexible display 211 is adjustable.

The processor 180 may control the drive unit 230 to adjust the length of the light blocking area or the image display area. Here, the drive unit 230 is housed in the housing 280.

The processor 180 may receive information on the amount of light emitted into the vehicle from the light amount sensor 142. The processor 180 may adjust the transparency of the transparent flexible display 211 based on the amount of light.

Figure 10A:
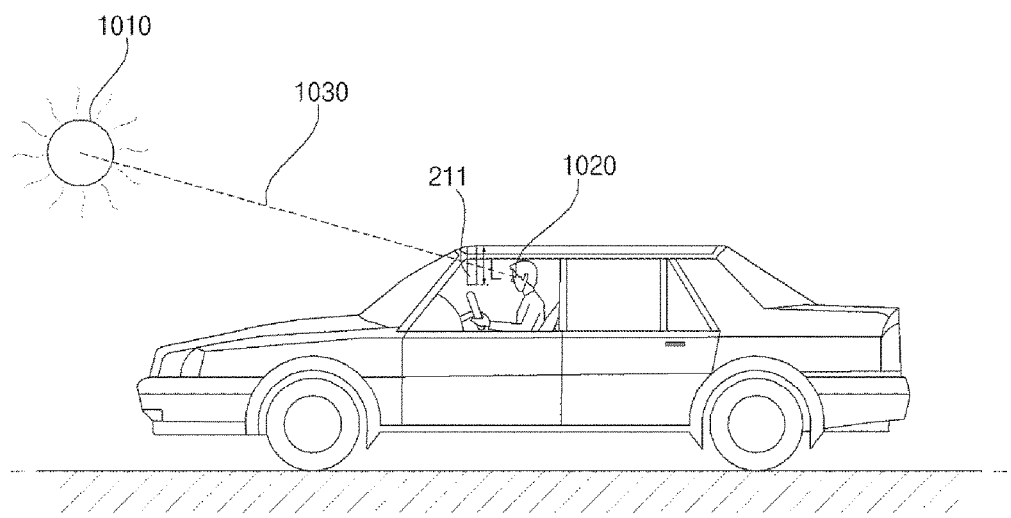
FIG. 10A illustrates the operation of a driver assistance apparatus controlling the length of a transparent flexible display according to an embodiment of the present invention.

FIG. 10A illustrates the operation of a driver assistance apparatus controlling the length of a transparent flexible display according to an embodiment of the present invention.

The processor 180 may calculate the length L of the light blocking area or the image display area included in the transparent flexible display 211, based on the position of the sun 1010. The processor 180 may control the drive unit 230 according to the calculated length L to adjust the length L of the light blocking area or the image display area. For example, the processor 180 may adjust the length L of the light blocking area or the image display area, based on the gaze 1020 of the occupant sensed by the second camera 121b and the position of the sun 1010 tracked through the solar sensor 141. Specifically, the processor 180 may control the drive unit 230 such that the light blocking area or the image display area can be positioned on a straight line formed by the gaze 1020 of the occupant and the position of the sun 1010.

Figure 10B:
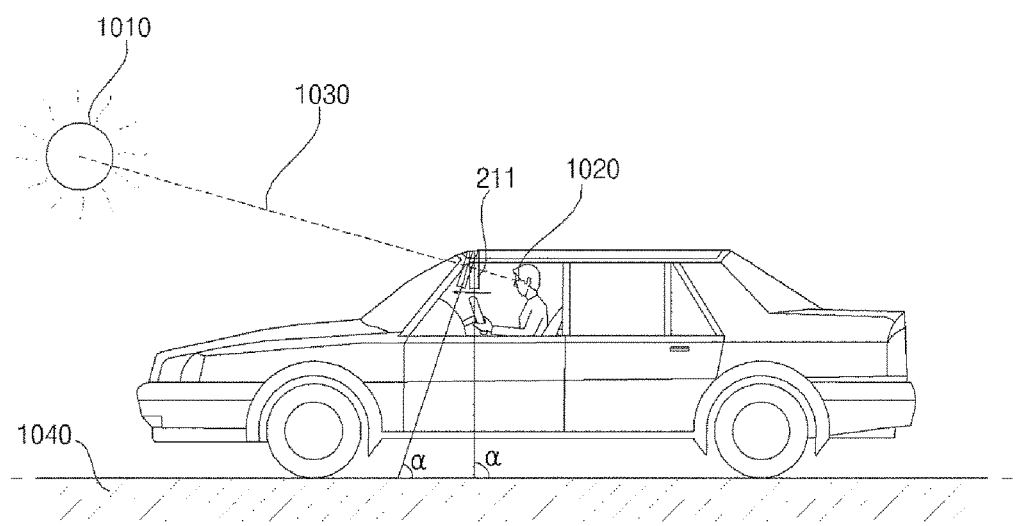
FIG. 10B illustrates the operation of a driver assistance apparatus controlling the angle of a transparent flexible display according to an embodiment of the present invention.

FIG. 10B illustrates the operation of a driver assistance apparatus controlling the angle of a transparent flexible display according to an embodiment of the present invention.

The processor 180 may calculate an angle α formed by the light blocking area or the image display area with respect to the ground 1040, based on the position of the sun. The processor 180 may control the guide part 240 according to the calculated angle α. For example, the processor 180 may calculate the angle α formed by the light blocking area or the image display area with respect to the ground 1040, based on the gaze 1020 of the occupant sensed through the second camera 121b and the position of the sun 1010 tracked through the solar sensor 141. Specifically, the processor 180 calculates the angle α formed between the light blocking area or the image display area and the ground based on the gaze 1020 of the occupant and the position of the sun 1010 and controls the guide drive unit 243 according to the calculated angle α to adjust the angle formed between the contact portion 241 and the ground, so that the sunlight may be effectively blocked. As the angle formed between the contact portion 241 and the ground is adjusted, the angle formed by the transparent flexible display 211 contacting the guide drive unit 243 with respect to the ground 1040 is adjusted.

FIGS. 11A to 11D illustrates a screen image displayed on a transparent flexible display according to an embodiment of the present invention.

Figure 11A:
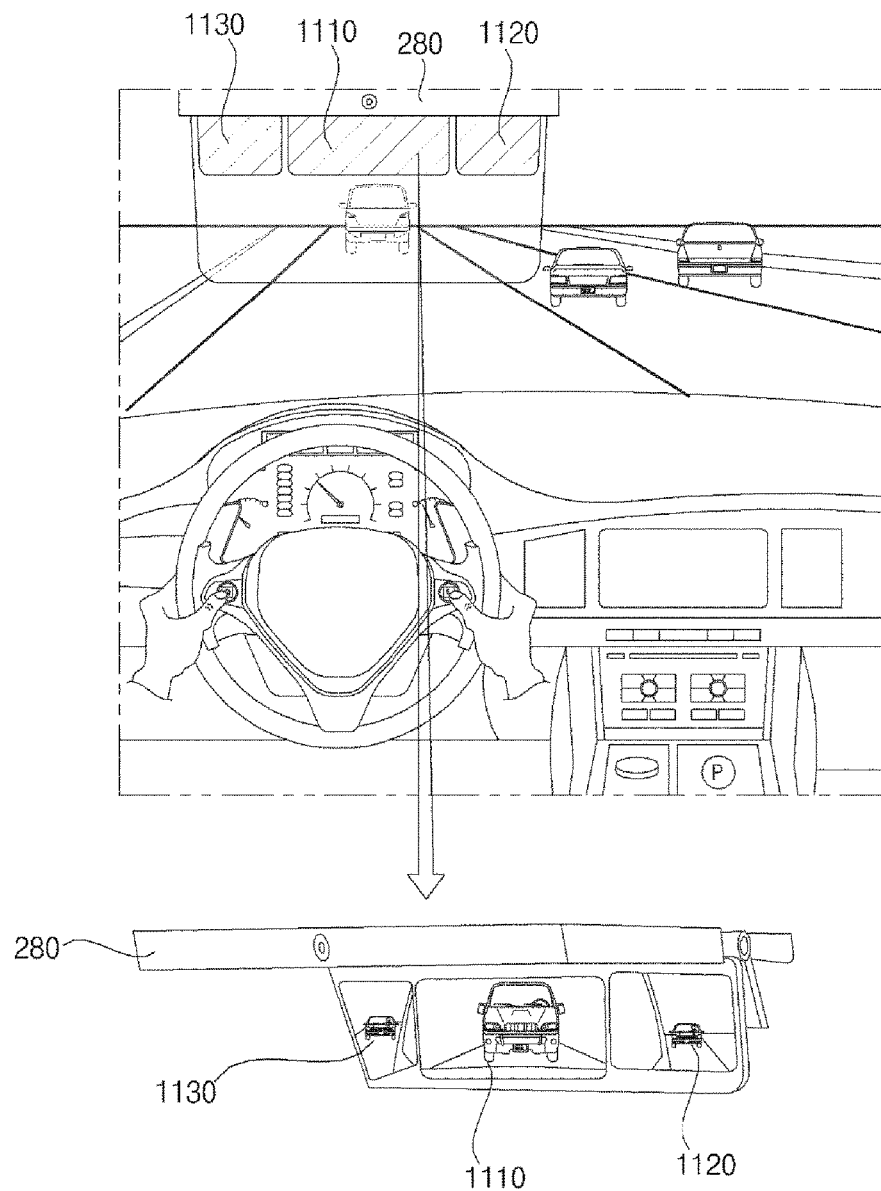
FIGS. 11A to 11D illustrates a screen image displayed on a transparent flexible display according to an embodiment of the present invention.

Referring to FIG. 11A, the transparent flexible display 211 may include image display areas 1110, 1120, and 1130. The processor 180 may display an image received from the camera 121 in the image display areas.

For example, the first camera 121a may include a plurality of cameras. The first camera 121a may consist of three cameras, and may capture images of the rear view, rear left-side view and rear right-side view of the vehicle. Here, the camera for capturing an image of the rear view of the vehicle may be installed at the upper or lower end of the rear license plate. The camera for capturing an image of the rear left-side view of the vehicle may be installed on a left door or in a left side-view mirror module. The camera for capturing an image of the rear right-side view of the vehicle may be installed on the right door or in a right side-view mirror module. The processor 180 may display the acquired rear-view image in the first area 1110. The processor 180 may display the acquired rear right side-view image in the second area 1120. The processor 180 may display the acquired rear left side-view image in the third area 1130. In this case, the transparent flexible display 211 may function as a side-view mirror.

For example, the second camera 121b may capture an image of the interior of the vehicle. The processor 180 may display the vehicle interior image on one of the first to third areas 1110, 1120, and 1130. In this case, the transparent flexible display 211 may function as a rear view mirror.

Figure 11B:
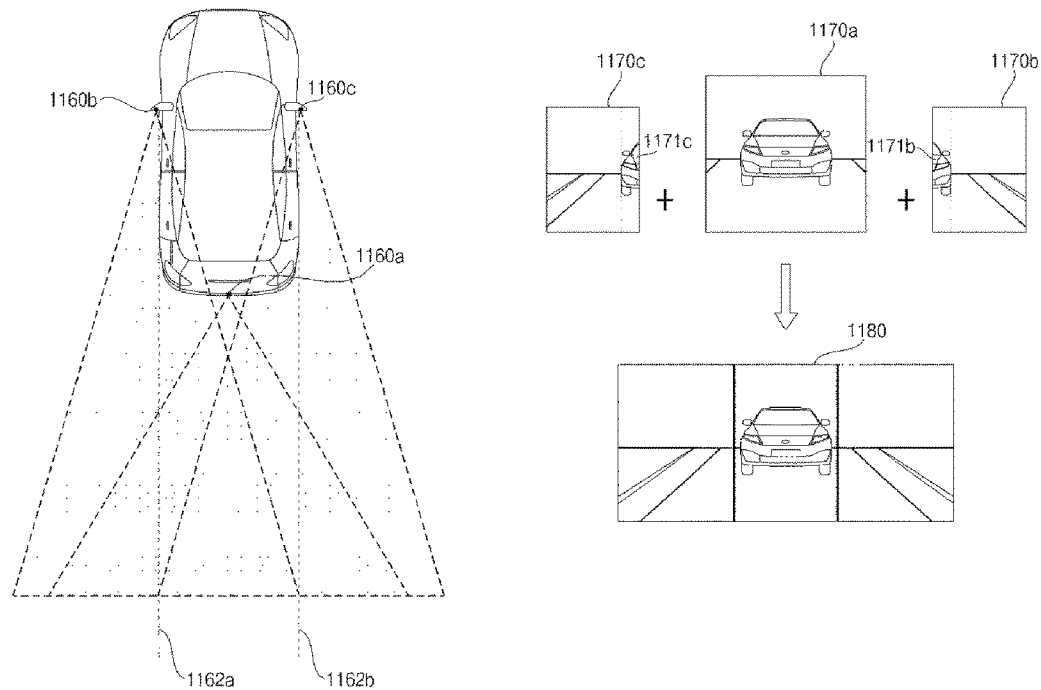

FIG. 11B illustrates an embodiment in which the vehicle rear view image is received and displayed on the display 210.

The camera for acquiring a vehicle rear view image may include a first camera 1160a, a second camera 1160b, and a third camera 1160c. The first camera 1160a may be arranged at the rear of the vehicle (e.g., the upper side or lower side of the rear license plate). The first camera 1160a may acquire a first image 1170a. The first image 1170a may be a rear view image of the vehicle. The second camera 1160b may be arranged on the left side of the vehicle (for example, in the left side-view mirror module). The second camera 1160b may acquire a second image 1170b. The second image 1170b may be a rear left-side view image of the vehicle. The third camera 1160c may be arranged on the right side of the vehicle (for example, in the right side-view mirror module). The third camera 1160c may acquire a third image 1170c. The third image 1170c may be a rear right-side view image of the vehicle.

The processor 180 may receive the first to third images 1170a, 1170b and 1170c and may synthesize the first to third images 1170a, 1170b and 1170c to generate a synthesized image 1180. The processor 180 may control the synthesized image to be displayed on the transparent flexible display 211.

The images acquired by the first to third cameras 1160a, 1160b, and 1160c may have an overlapping area. In creating a synthesized image 1180, the overlapping areas need to be processed.

The overlapping areas may be processed as follows. In creating the synthesized image 1180, the processor 180 may synthesize the first image 1170a and the second image 1170b with reference to the extension line 1162a (hereinafter, referred to as a first line) of the left body line of the vehicle. Specifically, the processor 180 may create a synthesized image. The right part of the synthesized image with respect to the first line 1162a may be created based on the first image 1170a, and the left part of the synthesized image with respect to the first line 1162a may be created based on the second image 1170b. In addition, the processor 180 may synthesize the first image 1170a and the third image 1170c based on the extension line 1162b (hereinafter, referred to as a second line) of the right side body line of the vehicle. Specifically, the processor 180 may create a synthesized image. The left part of the synthesized image with respect to the second line 1162b may be created based on the first image 1170a, and the right part of the synthesized image with respect to the second line 1162b may be created based on the third image 1170d. By synthesizing the first to third images as described above, a wide rear view of the vehicle can be provided to the occupant.

The first to third cameras 1160a, 1160b, and 1160c are arranged at different positions in the vehicle. Thereby, the images acquired by the respective cameras may provide different depths for the same point. In creating the synthesized image 1180, depth correction is required.

Depth correction may be processed as follows. In creating a synthesized image, the processor 180 may adjust the depths in the second and third images based on the first camera position to synthesize the first to third images. For example, the second and third cameras may not be disposed in the same plane as that of the first camera. The first camera may be arranged at the upper or lower side of the rear license plate of the vehicle, the second camera may be arranged in the left side-view mirror module, and the third camera may be arranged in the right side-view mirror module. In this case, the positions at which the second and third cameras acquire an image is different from the position at which the first camera acquires an image. Accordingly, the second and third images provide a depth different a depth in the first image, according to a distance from the second and third cameras to the first camera. The processor 180 may adjust the depths through scaling as if the first through third images were captured by cameras in the same plane.

Figure 11C:
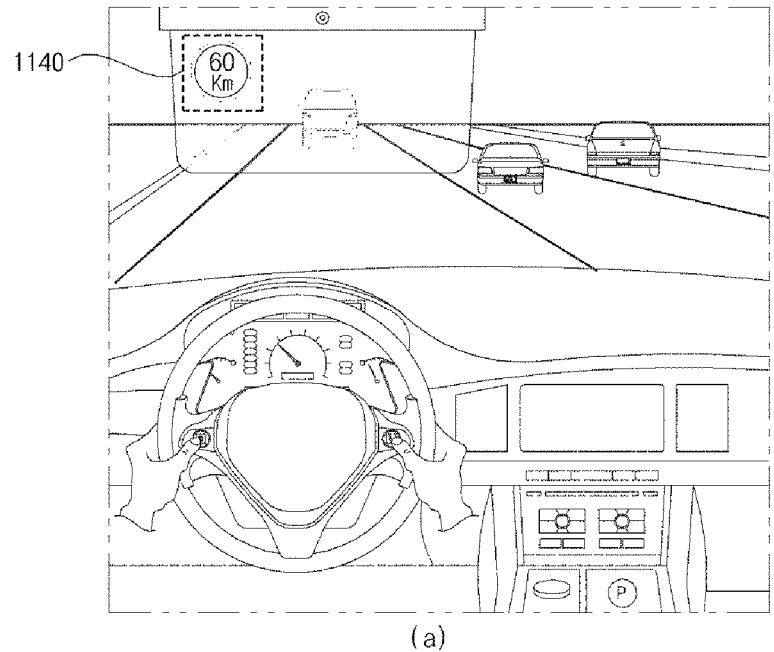
Figure 11C:
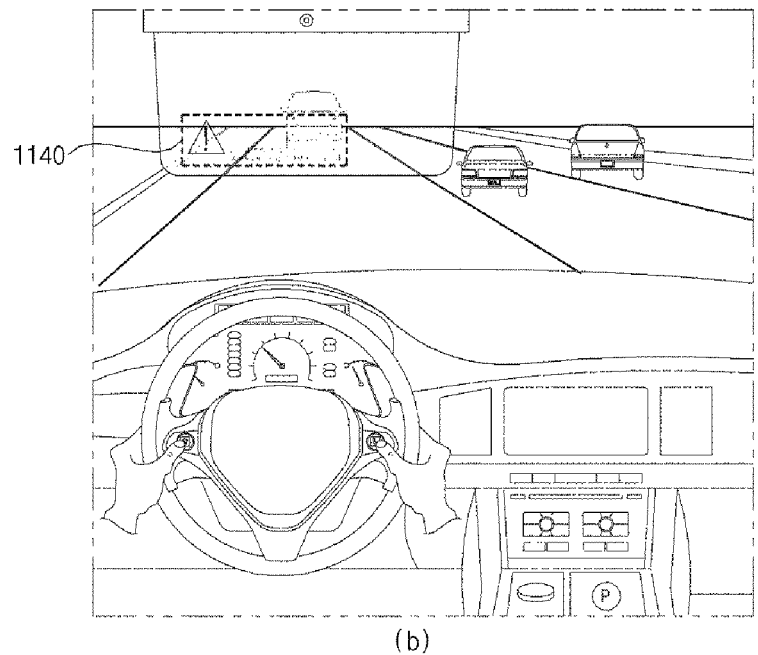

Referring to FIG. 11C, the processor 180 may display vehicle information in a image display area. Here, the vehicle information may be information received from the vehicle sensor unit 760 via the interface unit 160. Alternatively, the vehicle information may be information received from the controller 770 via the interface unit 160. Alternatively, the vehicle information may be information received from the mobile terminal 250 or the server 260 via the communication unit 110. Alternatively, the vehicle information may be received information through the input unit 120.

For example, the processor 180 displays vehicle speed information (shown in FIG. 11C(a)), traffic sign information, navigation information, remaining fuel amount information (shown in FIG. 11C(b)), vehicle fault information, traffic information, and the like on the image display area 1140.

Figure 11D:
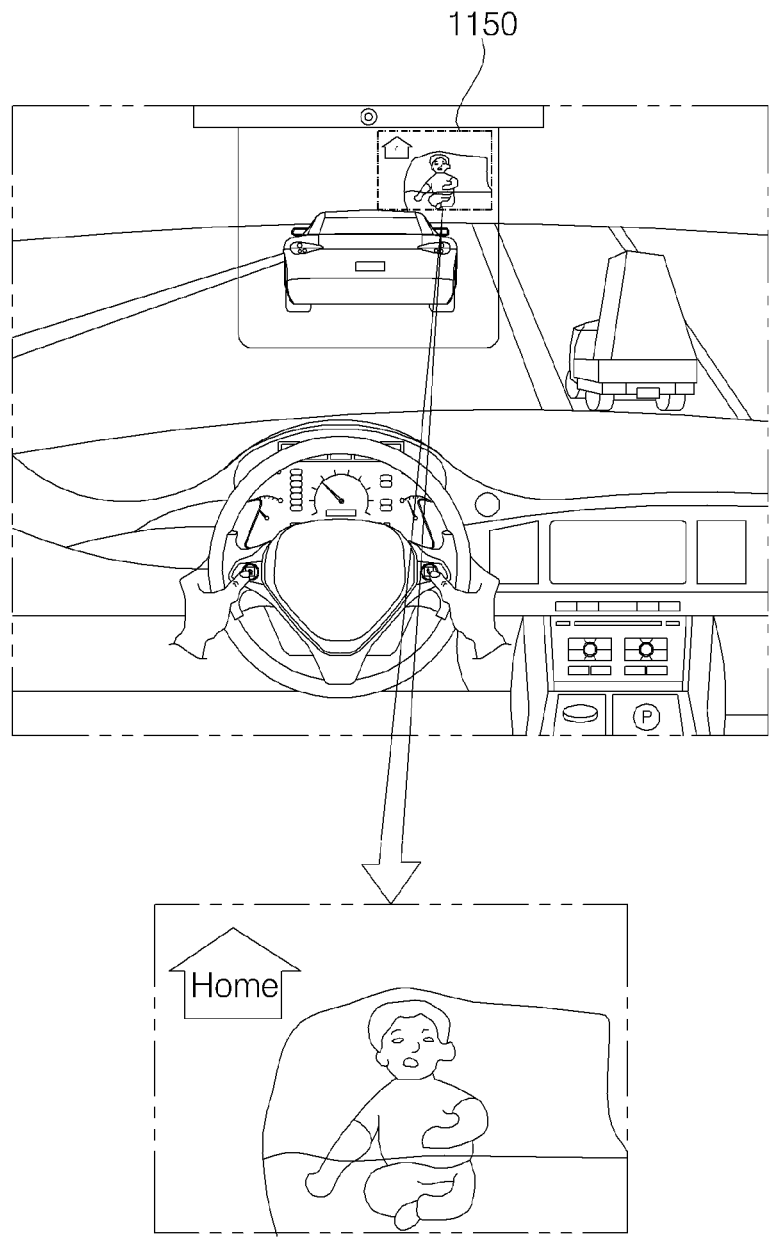

Referring to FIG. 11D, the processor 180 may exchange data with the server 260 via the communication unit 110. The server 260 may be a home server. For example, an image captured from a camera installed in a house may be delivered to the home server. The processor 180 may receive the captured image through the communication unit 110 and display the captured image in the image display area 1150.

Figure 12:
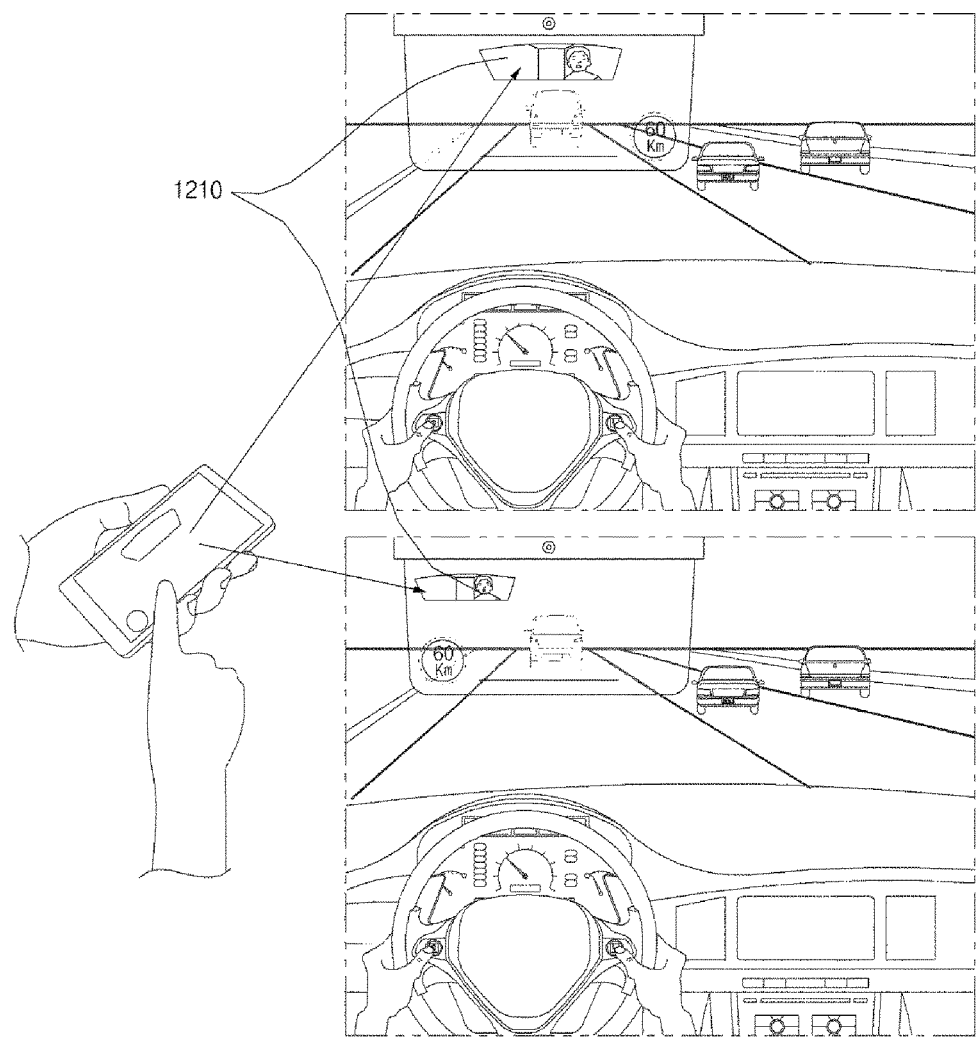
FIG. 12 illustrates the operation of controlling an image display area through a mobile terminal 250 according to an embodiment of the present invention.

FIG. 12 illustrates the operation of controlling an image display area through a mobile terminal 250 according to an embodiment of the present invention.

Referring to FIG. 12, with the mobile terminal 250 and the driver assistance apparatus 100 paired, the processor 180 may receive a control signal of the mobile terminal 250 and control the display unit 210.

For example, when a pinch-in input is received through the display unit of the mobile terminal 250 with the mobile terminal 250 and the driver assistance apparatus 100 paired, the processor 180 may reduce the size of the image display area 1210 displayed on the transparent flexible display 211 according to the pinch-in input.

For example, when a pinch-out input is received through the display unit of the mobile terminal 250 with the mobile terminal 250 and the driver assistance apparatus 100 paired, the processor 180 may increase the size of the image display area 1210 displayed on the transparent flexible display 211 according to the pinch-out input.

For example, when a touch-and-drag input is received through the display unit of the mobile terminal 250 with the mobile terminal 250 and the driver assistance apparatus 100 paired, the processor 180 may respond to the drag direction to change the position of the image display area 1210 displayed on the transparent flexible display 211.

Figure 13:
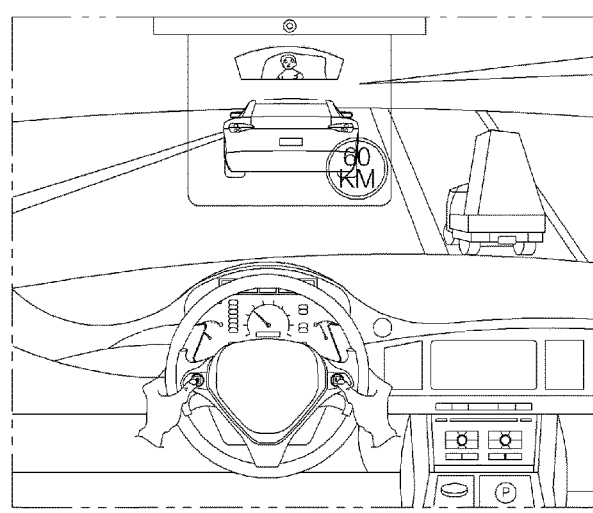
FIG. 13 illustrates the operation of outputting vehicle information by voice according to an embodiment of the present invention.
Figure 13:
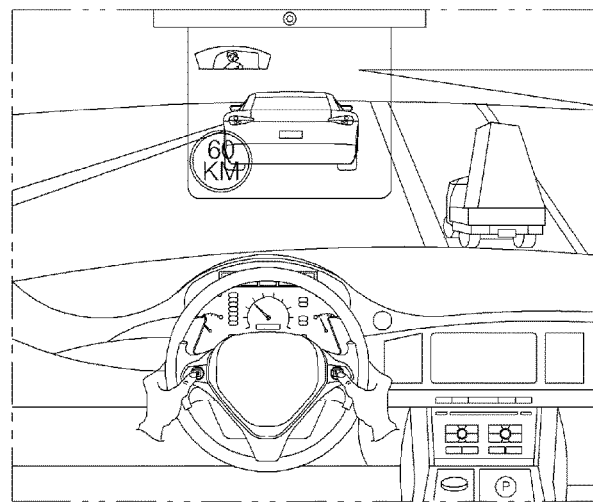

FIG. 13 illustrates the operation of outputting vehicle information by voice according to an embodiment of the present invention.

Referring to FIG. 13, the processor 180 may output vehicle information by voice through the sound output unit 220.

For example, as shown in FIG. 13, the processor 180 may output the status of the remaining fuel amount by voice 1310. If the remaining fuel amount is insufficient, the processor 180 may inquire whether to search for nearby gas stations by voice 1310. In this case, the processor 180 may receive a voice command via the microphone 123.

Meanwhile, the processor 180 may provide a calendar function. Here, the calendar function may be provided through an application provided in the vehicle 10. Alternatively, the calendar function of the mobile terminal 250 may be provided through pairing. For example, as shown in FIG. 13, when there is a preset schedule on that day, the processor 180 may output the preset schedule by voice 1320 through the sound output unit 220. In addition, the processor 180 may output navigation information corresponding to the preset schedule by voice 1320.

Figure 14:
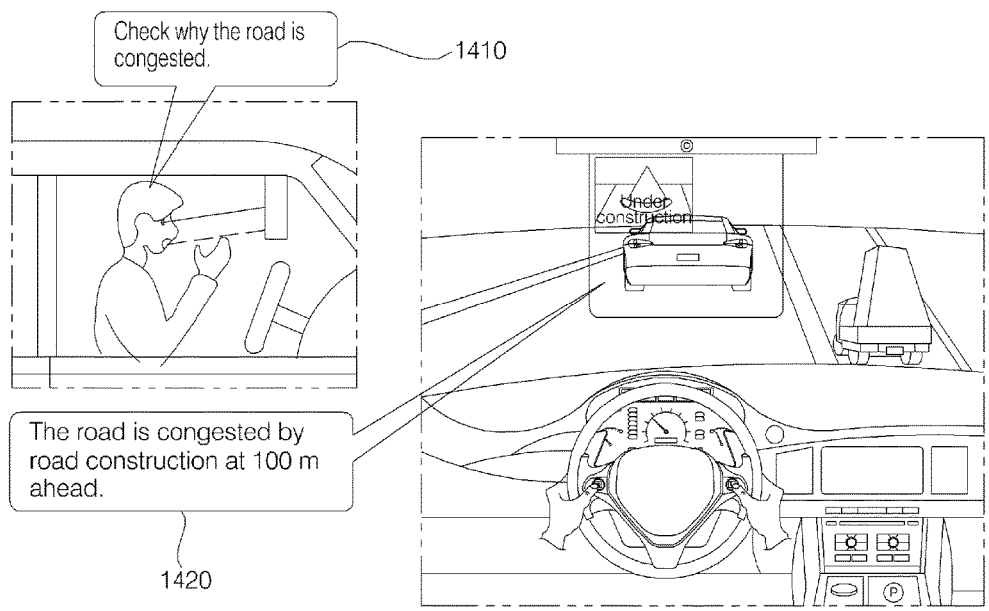
FIG. 14 illustrates the operation of receiving a voice command according to an embodiment of the present invention.

FIG. 14 illustrates the operation of receiving a voice command according to an embodiment of the present invention.

Referring to FIG. 14, the processor 180 may receive a user voice command through the microphone 123. For example, as shown in FIG. 14, the occupant may ask the reason for traffic congestion in a traffic congestion section by voice 1410. In this case, the processor 180 may receive information from the server 260 through the communication unit 110. Here, the server 260 may be a server configured to provide traffic information. The processor 180 may output the received information by voice 1420 through the sound output unit 220. Alternatively, the processor 180 may display the received information on the transparent flexible display 211.

Figure 15:
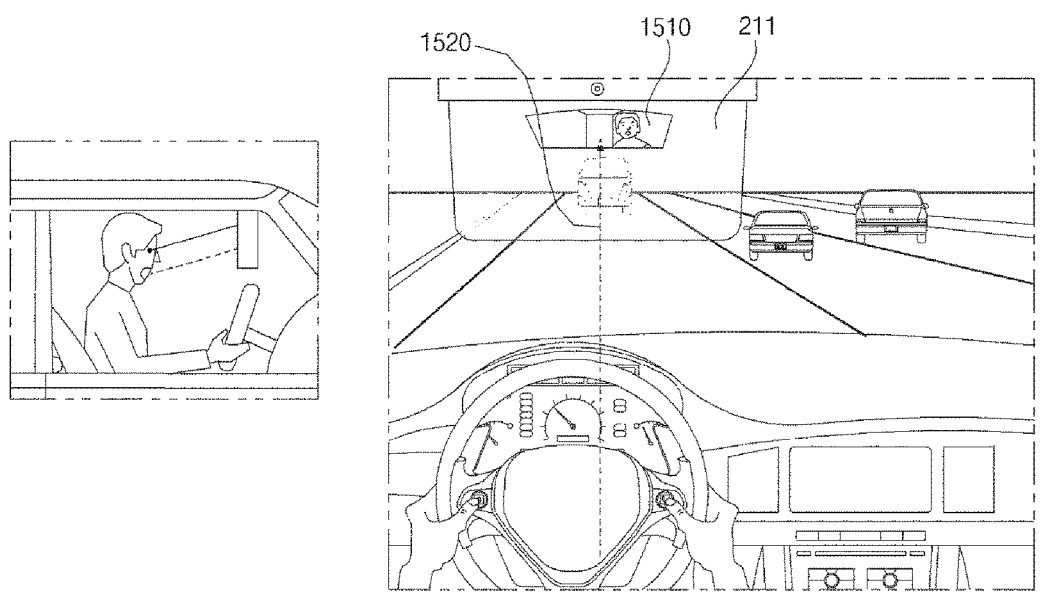
FIG. 15 illustrates the operation of controlling an image display area by sensing the gaze of an occupant according to an embodiment of the present invention.

FIG. 15 illustrates the operation of controlling an image display area by sensing the gaze of an occupant according to an embodiment of the present invention.

Referring to FIG. 15, the second camera 121*b* may capture an image of the gaze of the occupant. For example, the second camera 121*b* may capture an image of the occupant's eyes. In this case, the processor 180 receives the image from the second camera 121*b*. The processor 180 extracts pupils from the received image. The processor 180 tracks the extracted pupils.

If the pupils are located above a predetermined position, the processor 180 may activate the image display area 1510. That is, when the gaze of the occupant is directed forward of the vehicle, the transparent flexible display 211 only functions to block light from the outside. When the occupant's gaze is directed to the transparent flexible display 211, the processor 180 may activate the image display area 1510 and the transparent flexible display 211 may serve as a display means.

The images described with reference to FIGS. 11A to 11C may be displayed in the image display area 1510. Particularly, a vehicle interior image acquired from the second camera 121*b* may be displayed in the image display area 1510.

Figure 16:
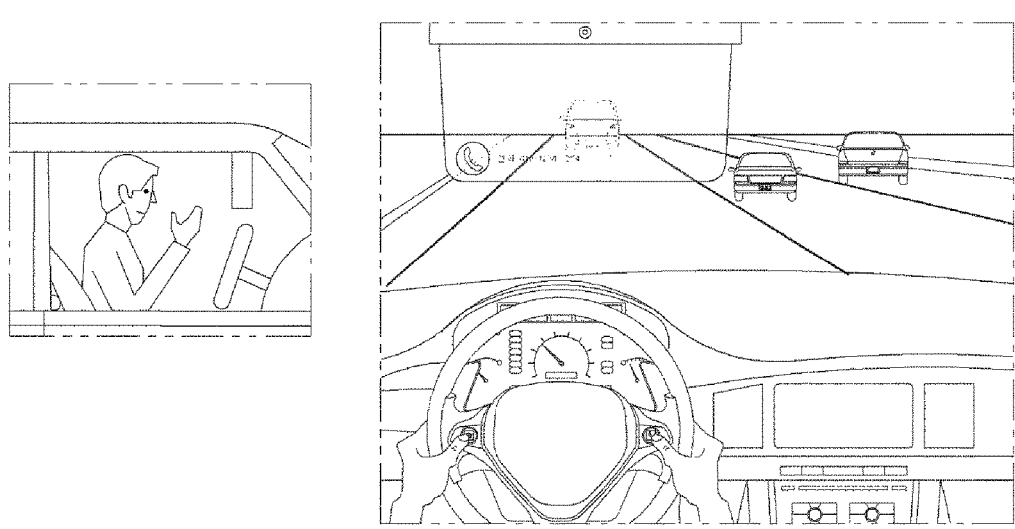
FIG. 16 illustrates the operation of sensing a gesture of an occupant according to an embodiment of the present invention.

FIG. 16 illustrates the operation of sensing a gesture of an occupant according to an embodiment of the present invention.

Referring to FIG. 16, when a call is received by the mobile terminal 250 in a paired state, the processor 180 may output call reception information through the display unit 210 or the sound output unit 220.

In this case, when the occupant makes a predetermined gesture, the processor 180 receives the gesture input through the second camera 121*b*. When the gesture input is a gesture corresponding to an action of an answering the phone, the processor 180 transmits an answer-the-phone command to the mobile terminal 250. Thereby, the mobile terminal 250 may establish a call connection. At this time, the processor 180 may receive the user's voice through the microphone 123, and output received voice through the sound output unit 220.

Figure 17:
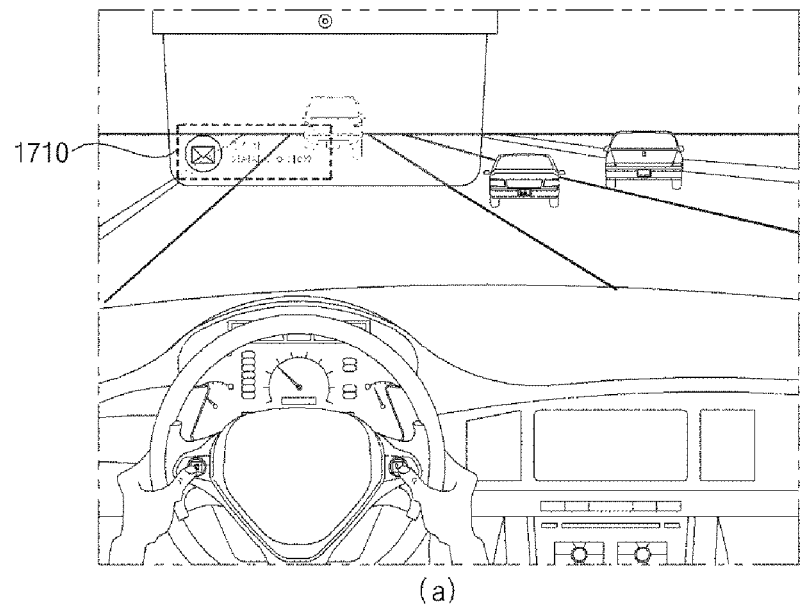
FIG. 17 illustrates the operation of displaying text message reception information and call reception information according to an embodiment of the present invention.
Figure 17:
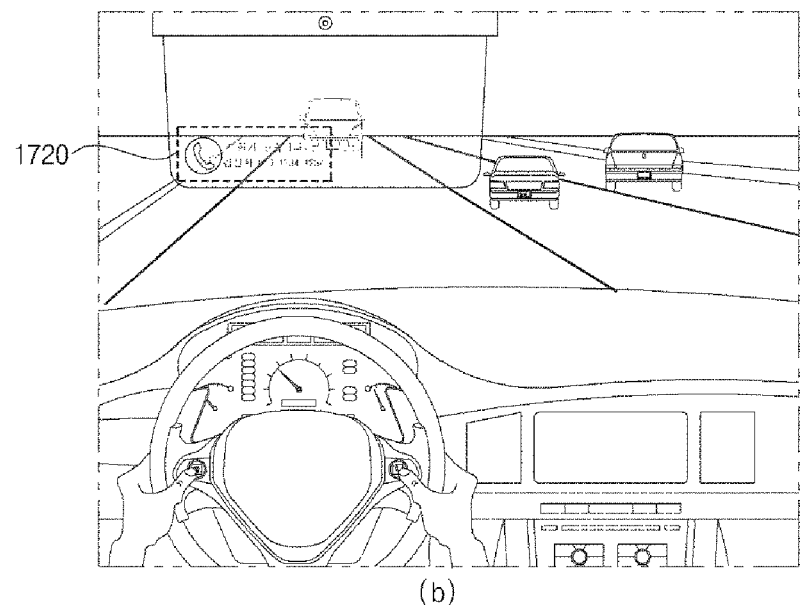

FIG. 17 illustrates the operation of displaying text message reception information and call reception information according to an embodiment of the present invention.

As shown in FIG. 17(*a*), when a text message is received by the mobile terminal 250 in a paired state, the processor 180 receives the text message through the communication unit 110 and displays the same on the display unit 210. Specifically, the processor 180 displays the text message in an image display area 1710 included in the transparent flexible display 211.

As shown in FIG. 17(*b*), when a call signal is received by the mobile terminal 250 in a paired state, the processor 180 receives the call signal through the communication unit 110, and displays a call reception event on the display unit 210. Specifically, the processor 180 displays the call reception event in the image display area 1720 included in the transparent flexible display 211.

Figure 18A:
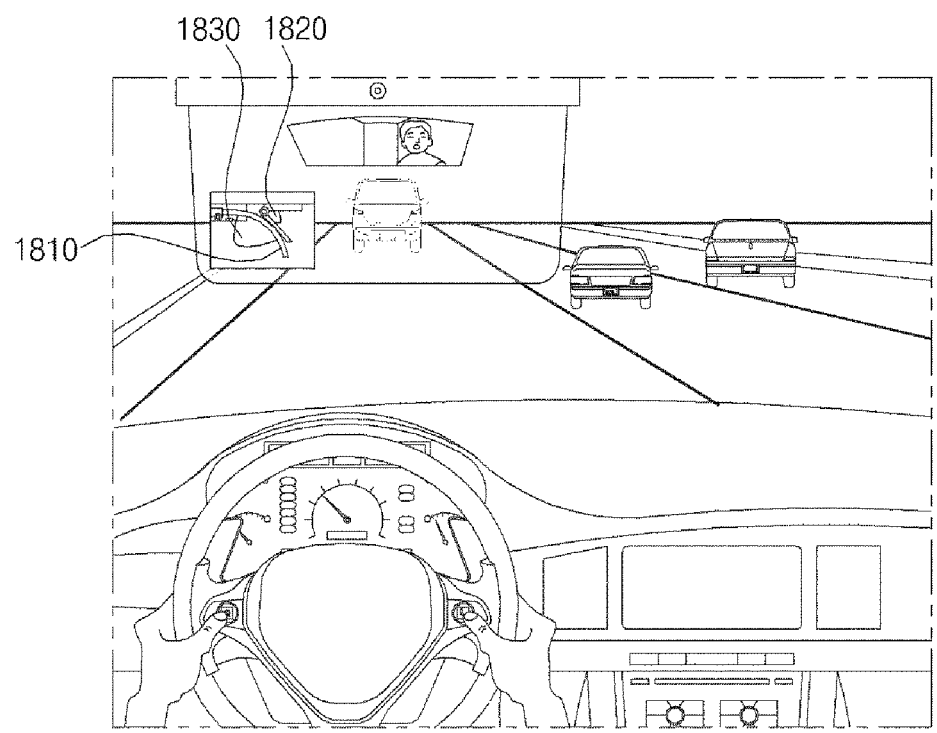
FIGS. 18A and 18B illustrate the operation of displaying the status of a transparent flexible display, a drive unit, or a guide part, according to an embodiment of the present invention.
Figure 18B:
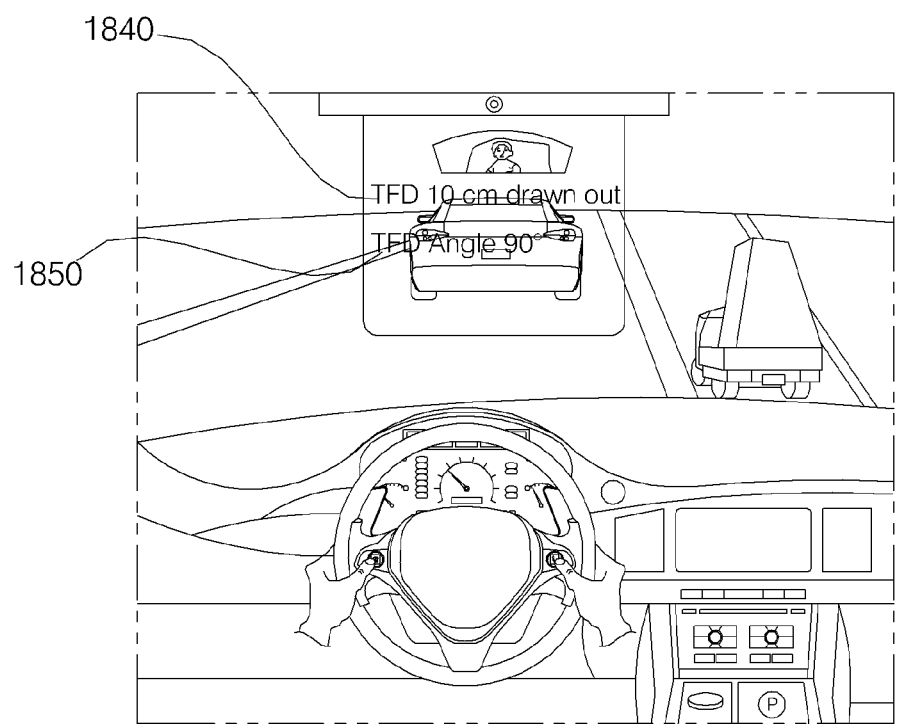

FIGS. 18A and 18B illustrate the operation of displaying the status of a transparent flexible display, a drive unit, or a guide part, according to an embodiment of the present invention.

The processor 180 may display the state of the transparent flexible display 211, the drive unit 230, or the guide part 240 as shown in FIG. 18A. For example, the processor 180 may display on the display unit 210 an image 1810 corresponding to the length by which the transparent flexible display 211 is drawn out. For example, the processor 180 may display on the display 210 an image 1820 corresponding to an angle formed by the contact portion 241 with respect to the ground. For example, the processor 180 may display on the display 210 an image 1830 corresponding to an angle formed by the transparent flexible display 211 with respect to the ground. Through each of the displayed images 1810, 1820, 1830, the occupant may intuitively perceive the state of the transparent flexible display, the drive unit, or the guide part.

The processor 180 may display the state of the transparent flexible display 211, the drive unit 230, or the guide part 240 as shown in FIG. 18B. For example, the processor 180 may display a text message 1840 indicating the length by which the transparent flexible display 211 is drawn out. For example, the processor 180 may display a text message 1850 indicating the angle formed by the transparent flexible display 211 with respect to the ground. For example, although not shown, the processor 180 may display a text message indicating the angle formed by the contact portion 241 with respect to the ground.

Figure 19:
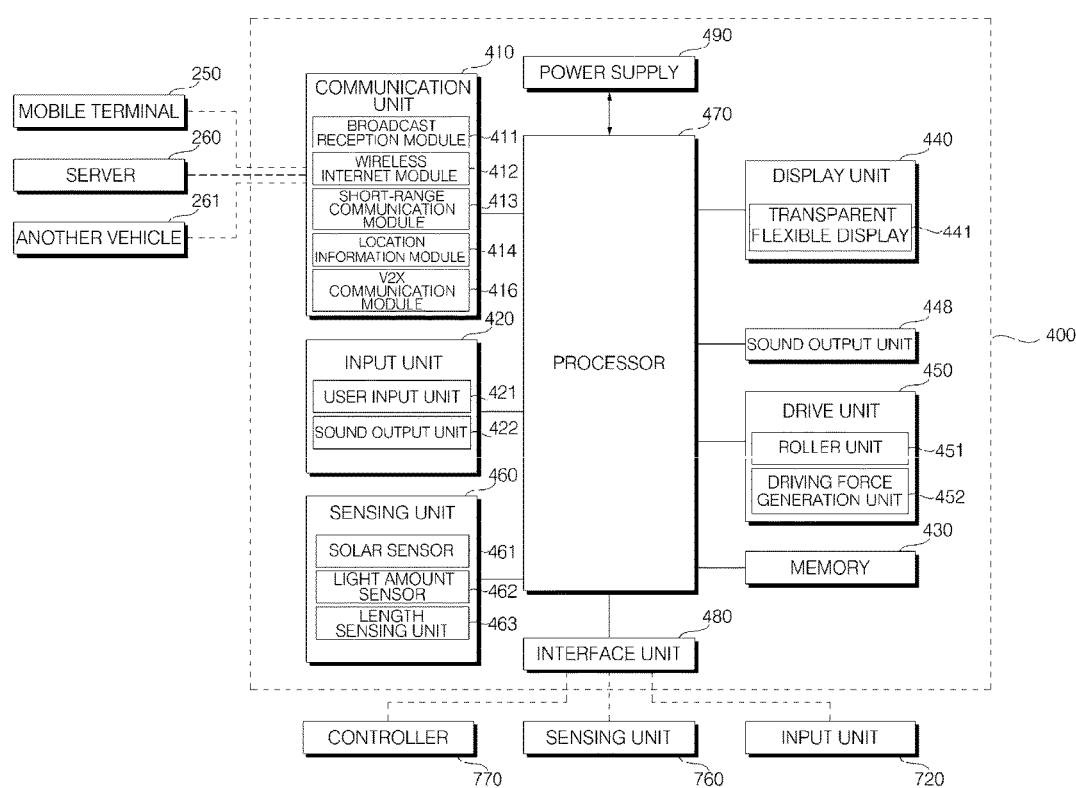
FIG. 19 is a block diagram illustrating a display device for a vehicle according to an embodiment of the present invention.

FIG. 19 is a block diagram illustrating a display device for a vehicle according to an embodiment of the present invention.

Referring to FIG. 19, the vehicle display device 400 may include a communication unit 410, an input unit 420, a memory 430, a display unit 440, a sound output unit 448, a drive unit 450, a sensing unit 460, a processor 470, an interface unit 480, and a power supply 490.

The communication unit 410 may include at least one module enabling wireless communication between the vehicle 700 and the mobile terminal 600, between the vehicle 700 and an external server 510, or between the vehicle 700 and another vehicle 520. The communication unit 410 may also include at least one module for connecting the vehicle 700 to at least one network.

The communication unit 410 may include a broadcast reception module 411, a wireless Internet module 412, a short-range communication module 413, a location information module 414, and a V2X communication module 416.

The broadcast reception module 411 receives a broadcast signal or broadcast-related information from an external broadcast management server over a broadcast channel. Herein, the broadcast includes radio broadcast or TV broadcast.

The wireless Internet module 412, which refers to a module for wireless Internet access, may be internally or externally installed to the vehicle 700. The wireless Internet module 412 is configured to transmit and receive a radio signal over a communication network according to wireless Internet technologies.

Examples of wireless Internet technologies include Wireless LAN (WLAN), Wi-Fi, Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A). The wireless Internet module 412 transmits and receives data according to at least one of the aforementioned wireless Internet technologies. For example, the wireless Internet module 412 may wirelessly exchange data with the external server 510. The wireless Internet module 412 may receive weather information and traffic situation information (e.g., TPEG (Transport Protocol Expert Group) information) from the external server 510.

The short-range communication module 413, which is used for short-range communication, may support short-range communication using at least one of Bluetooth™, Radio Frequency Identification (RFID), Infrared Data Association (IrDA), ultra wideband (UWB), ZigBee, Near Field Communication (NFC), Wi-Fi, Wi-Fi Direct, and Wireless Universal Serial Bus (Wireless USB) technologies.

The short-range communication module 413 may establish a wireless local area network to implement short-range communication between the vehicle 400 and at least one external device. For example, the short-range communication module 413 may wirelessly exchange data with the mobile terminal 600. The short-range communication module 413 may receive weather information and traffic situation information (e.g., TPEG (Transport Protocol Expert Group)) from the mobile terminal 600. For example, once a user enters the vehicle 700, the mobile terminal 600 of the user may be paired with the vehicle 700 automatically or by execution of an application by the user.

A typical example of the location information module 414, which serves to acquire the location of the vehicle 700, is a global positioning system (GPS) module. For example, if the vehicle utilizes the GPS module, the location of the vehicle may be acquired using a signal from a GPS satellite.

The V2X communication module 416 is a module for performing wireless communication with the server 510 or another vehicle 520. The V2X communication module 416 includes a module capable of implementing a vehicle-to-vehicle communication (V2V) protocol or a vehicle-to-infrastructure communication (V2I) protocol. The vehicle 700 may perform wireless communication with the external server 510 and the other vehicle 520 through the V2X communication module 416.

The input unit 420 may include a user input unit 421 and a sound input unit 422.

The user input unit 421 serves to receive information input by the user. When information is input through the user input unit 424, the processor 470 may control the operation of the vehicle display device 400 so as to correspond to the input information. The user input unit 424 may include a touch input means or a mechanical input means.

The sound input unit 422 may process an external sound signal into electrical data. The data created through processing may be utilized for various purposes according to functions performed in the vehicle display device 400. The sound input unit 422 may convert a voice command from the user into electrical data. The electrical data may be delivered to the processor 470.

The memory 430 is electrically connected to the processor 470. The memory 430 may store basic data for each unit, control data for controlling operation of each unit, and input/output data. The memory 430 may include various storage devices such as a ROM, RAM, EPROM, flash drive, and hard drive. The memory 430 may store various kinds of data for overall operation of the vehicle display device 400, including a program for processing or controlling operation of the processor 470.

The memory 430 may store map data for implementing the navigation function. Here, the map data may be stored as a default when the vehicle is shipped out. Alternatively, the map data may be received from an external device through the communication unit 410 or the interface unit 480.

The display unit 440 may display information processed by the processor 470. For example, the display unit 440 may display vehicle-related information. Here, the vehicle-related information may include vehicle control information for controlling the direction of the vehicle or vehicle driving assistance information for assisting the driver in driving the vehicle. The vehicle-related information may also include vehicle condition information indicating the current condition of the vehicle or vehicle driving information related to driving.

The display unit 440 may include a transparent flexible display 441.

The transparent flexible display 441 may be configured to be deformable by external force. The deformation may be at least one of warping, bending, folding, twisting, and curling of the transparent flexible display 441.

When the transparent flexible display 441 is in an undeformed state (for example, a state in which the display has an infinite radius of curvature, hereinafter referred to as a first state), the display area of the transparent flexible display 441 forms a flat surface. When the display is switched from the first state to a deformed state (for example, a state having a finite radius of curvature, hereinafter referred to as a second state) d by an external force, the display area may form a curved surface. The information displayed in the second state may be visual information output on the curved surface. Such visual information is realized by independently controlling emission of light from unit pixels (subpixels) arranged in a matrix form. The unit pixel means a smallest unit for implementing one color.

The transparent flexible display 441 may be changed from the first state or the flat state to a warped state (e.g., a laterally or longitudinally warped state). In this case, when an external force is applied to the transparent flexible display 441, the transparent flexible display 441 may be deformed to be flat (or less warped) or more warped.

Meanwhile, the transparent flexible display 441 may be combined with a touch sensor to implement a flexible touchscreen. When the flexible touch screen is touched, the processor 470 may perform a control operation corresponding to the touch input. The flexible touchscreen may be configured to sense the touch input not only in the first state but also in the second state.

Meanwhile, the transparent flexible display 441 may have a predetermined transparency. In order to have such a transparency, the transparent flexible display 411 may include at least one of a transparent TFEL (Thin Film Elecroluminescent), a transparent OLED (Organic Light-Emitting Diode), a transparent LCD (Liquid Crystal Display), a transmissive transparent display, and a transparent LED (Light Emitting Diode). The transparency of the transparent flexible display 441 may be adjusted under control of the processor 470.

The transparent flexible display 441 may be rolled around a predetermined shaft and disposed inside the vehicle without being exposed to the outside. One area of the transparent flexible display 441 in this state may be exposed to the interior of the vehicle according to a predetermined event. Here, the event may be a user input.

For example, the transparent flexible display 441 may be rolled around a predetermined shaft and disposed inside the dashboard. The transparent flexible display 441 may be rolled so as to be unrolled out of the dashboard toward the front windshield. When a predetermined event occurs, the transparent flexible display 441 may be unrolled out of the dashboard toward the front windshield under control of the processor 470.

For example, the transparent flexible display 441 may be rolled around a predetermined shaft and disposed inside the A-pillar. The transparent flexible display 441 may be rolled so as to be unrolled out of the a A-pillar toward the front windshield or the side window glass. When a predetermined event occurs, under the control of the processor 470, the transparent flexible display 441 may be unrolled out of the A-pillar toward the front windshield or the side window glass under control of the processor 470.

For example, the transparent flexible display 441 may be rolled around a predetermined shaft and disposed inside a door. The transparent flexible display 441 may be rolled so as to be unrolled out of the door toward the side window glass. When a predetermined event occurs, the transparent flexible display 441 may be unrolled out of the door toward the side window glass under control of the processor 470.

For example, the transparent flexible display 441 may be rolled around a predetermined shaft and disposed inside the vehicle interior ceiling. The transparent flexible display 441 may be rolled so as to be unrolled out of the ceiling toward the front windshield, the rear windshield, or the side window glass. When a predetermined event occurs, the transparent flexible display 441 may be unrolled out of the ceiling toward the front windshield, the rear windshield or the side window glass under control of the processor 470.

For example, the transparent flexible display 441 may be rolled around a predetermined shaft and disposed on a seat. The transparent flexible display 441 may be rolled so as to be unrolled out of the seat upward, downward, or sideways. When a predetermined event occurs, the transparent flexible display 441 may be unrolled out of the seat upward, downward, or sideways under control of the processor 470.

The length of an area of the transparent flexible display 441 that is exposed to the interior of the vehicle may be adjusted according to user input. For example, the unrolled area of the transparent flexible display 441 may be adjusted according to user input.

The transparent flexible display 441 may be disposed in close proximity to at least one of the front windshield, the rear windshield, the side window glass, and the front seat in the interior space of the vehicle.

The sound output unit 448 converts an electric signal from the processor 470 into an audio signal and outputs the audio signal. For this purpose, the sound output unit 448 may include a speaker. The sound output unit 448 is also capable of outputting a sound corresponding to an operation of the user input unit 421.

The drive unit 450 may adjust the length of an area of the transparent flexible display 441 that is exposed to the interior of the vehicle. For example, the drive unit 450 may adjust the unrolled area of the transparent flexible display 441.

Figure 22:
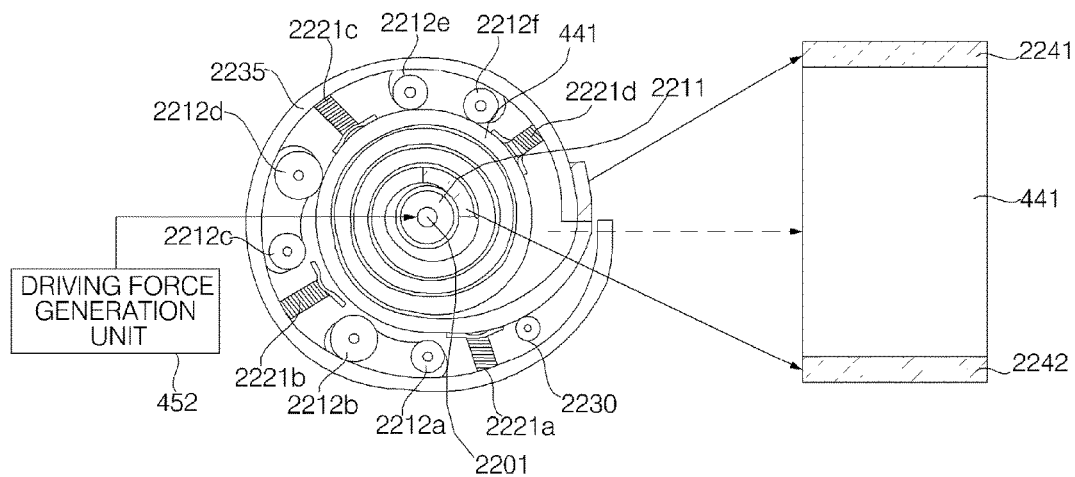
FIG. 22 illustrates a transparent flexible display and a drive unit according to an embodiment of the present invention, which shows a side view of the drive unit 450.

The drive unit 450 may include a roller unit 451, a driving force generation unit 452, an elastic supports 2221a to 2221d (see FIG. 22), and an inclination adjustment part 2230 (see FIG. 22).

The roller unit 451 may rotate in contact with the transparent flexible display 441, thereby adjusting the length of the area of the transparent flexible display 441 exposed to the outside. For example, the roller unit 451 may rotate in contact with the transparent flexible display 441 to adjust the unrolled area.

The roller unit 451 may include a main roller 2211 (see FIG. 22) and sub-rollers 2212a to 2211f (see FIG. 22).

The main roller 2211 (see FIG. 22) may be connected to the driving force generation unit 452. The main roller 2211 (see FIG. 22) may receive the rotational driving force generated by the driving force generation unit 452.

The sub-rollers 2212a to 2212f (see FIG. 22) may be disposed between the transparent flexible display 441 and the housing. The sub-rollers 2212a to 2212f (see FIG. 22)

may reduce friction with the housing 2235 (see FIG. 22) when the transparent flexible display 441 is drawn in or out.

The driving force generation unit 452 may provide rotational driving force to the roller unit 451.

For example, the driving force generation unit 452 may include a motor. The driving force generation unit 452 may provide rotational driving force generated by the motor to the roller unit 451.

The elastic supports 2221a to 2221d (see FIG. 22) may elastically support the transparent flexible display 441 against the housing 2235.

The inclination adjustment part 2230 (see FIG. 22) may adjust inclination of the transparent flexible display 441.

The drive unit 450 will be described later with reference to FIG. 22.

The sensing unit 460 may include a solar sensor 461, a light amount sensor 462, and a length sensing unit 463.

The solar sensor 461 tracks the position of the sun. For example, the solar sensor 461 tracks the azimuth and elevation angle of the sun. The solar sensor 461 may include one or more photodiodes to track the position of the sun.

The light amount sensor 462 senses the amount of light emitted into the vehicle. Specifically, the light amount sensor 462 senses the amount of solar light. The light amount sensor 462 may include a photoconductive element such as a CdS photoconductive cell or a CdS cell.

The length sensing unit 463 may sense the length by which the transparent flexible display 441 is exposed to the interior of the vehicle. For example, the length sensing unit 463 may sense the unrolled area of the transparent flexible display 441.

The processor 470 controls the overall operation of each unit in the vehicle display device 400.

The processor 470 may control the display unit 440 or the sound output unit 448 such that the information or data received through the communication unit 410, the input unit 420, or the interface unit 480 is output. The processor 470 may control the display unit 440 or the sound output unit 448 such that information or data stored in the memory 430 is output. The processor 470 may directly output or process and output the received information or data. The processor 470 may visually output information or data through the display unit 440. The processor 470 may output information or data audibly through the sound output 448.

The processor 470 may control the drive unit 450. The processor 470 may control the drive unit 450 to control the transparent flexible display 441 to be drawn in or out. For example, the processor 470 may control unrolling of the transparent flexible display by controlling the drive unit 450.

When the transparent flexible display 441 is drawn out, one area of the transparent flexible display 441 may be exposed to the interior of the vehicle.

The processor 470 may control a screen image to be displayed on the transparent flexible display 441. The processor 470 may control the screen image to be displayed in the exposed area. For example, the processor 470 may control the screen image to be displayed in the unrolled area of the transparent flexible display 441.

When there is a plurality of transparent flexible displays 441 provided, the processor 470 may control different screen images to be displayed on each of the transparent displays.

The transparent flexible display 441 may include a first display and a second display. When a passenger other than the user enters the vehicle, the processor 470 may control the second display to be exposed to the interior of the vehicle. For example, the processor 470 may control the second display to be unrolled.

The processor 470 may receive image data acquired by the camera 195 through the interface unit 480. The processor 470 may display a screen image based on the image data on the transparent flexible display 441.

If the transparent flexible display 441 is disposed in close proximity to the side window glass, the processor 470 may control the rear view image of the vehicle to be displayed on the transparent flexible display 441.

For example, when the vehicle travels in a snowy or rainy weather, the processor 470 may control a rear view image of the vehicle to be displayed on the transparent flexible display 441 disposed in close proximity to the side window glass.

For example, when a turn signal is input for lane change or redirection, the processor 470 may control the rear view image of the vehicle to be displayed on the transparent flexible display 441 disposed in close proximity to the side window glass.

The processor 470 may darken the transparent flexible display 441 according to the amount of light emitted into the vehicle. The processor 470 may control the transparent flexible display 441 to become in a predetermined color or darkness so as to darken the transparent flexible display 441. The amount of light may be sensed through the light amount sensor 462.

The processor 470 may receive information about collision with an object through the interface unit 480.

For example, the camera 195 may sense collision with an object. Alternatively, radar, LiDAR, or an ultrasonic sensor included in the sensing unit 760 may sense collision with an object.

When the information about collision with the object is received, the processor 470 may control the drive unit 450 such that the transparent flexible display 441 is not exposed. For example, the processor 470 may control the drive unit 450 to control the transparent flexible display 441 to be arranged rolled around a predetermined shaft. Thereby, damage to the transparent flexible display 441 may be prevented in the event of an accident.

The processor 470 may generate new information based on the information or data received through the interface unit 480. The processor 470 may control the display unit 441 to display the generated information or a screen image corresponding to the generated information.

The processor 470 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units for performing other functions.

The interface unit 480 may receive data or externally transmit the signal processed or generated by the processor 470. To this end, the interface unit 130 may perform data communication with the controller 770, the driver assistance apparatus 400, the sensing unit 760, or the like in the vehicle by wire communication or wireless communication.

The interface unit 480 may receive sensor information from the controller 770 or the sensing unit 760.

Herein, the sensor information may include at least one of vehicle direction information, vehicle location information (GPS information), vehicle orientation information, vehicle speed information, vehicle acceleration information, vehicle inclination information, vehicle drive/reverse information, battery information, fuel information, tire information, vehicular lamp information, vehicle interior temperature information, and vehicle interior humidity information.

Such sensor information may be acquired from a heading sensor, a yaw sensor, a gyro sensor, a position module, a vehicle drive/reverse drive sensor, a wheel sensor, a vehicle speed sensor, a vehicle body tilt sensor, a battery sensor, a fuel sensor, a tire sensor, a steering sensor based on turning of the steering wheel, a vehicle interior temperature sensor, and a vehicle interior humidity sensor. The position module may include a GPS module for receiving GPS information.

Among the pieces of sensor information, the vehicle direction information, vehicle location information, vehicle orientation information, vehicle speed information and vehicle inclination information, which are related to traveling of the vehicle, may be called vehicle travel information.

The interface unit 480 may receive object detection information, distance information about an object, relative speed information about the object, or information about collision with the object acquired through radar, LiDAR, or an ultrasonic sensor. Here, the object may include various objects located on the road, such as other vehicles, a traffic light, a traffic sign, a street tree, a pedestrian, a streetlight, and a guardrail The interface unit 480 may receive vehicle front view image data or surroundings-of-vehicle image data acquired from the camera 195. For example, the interface unit 480 may receive image data acquired by respective cameras arranged on the front, back, left, and right.

The interface unit 480 may receive information or data obtained by processing the vehicle front view image or the surroundings-of-vehicle image from the processor 170 of the driver assistance apparatus 100. For example, the interface unit 480 may receive object detection information, distance information about an object, relative speed information about the object, or information about collision with the object acquired through image processing.

The interface unit 480 may receive the occupant information acquired by the internal camera 195*c*. For example, the interface unit 480 may receive the gaze information about the user acquired by the internal camera 195*c*.

The interface unit 480 may receive vehicle state information. For example, the interface unit 480 may receive window open or closed state information from a window drive unit 756.

The power supply 490 may supply power necessary for operation of each component under control of the processor 770. Particularly, the power supply 490 may receive power from a battery or the like inside the vehicle.

Figure 20:
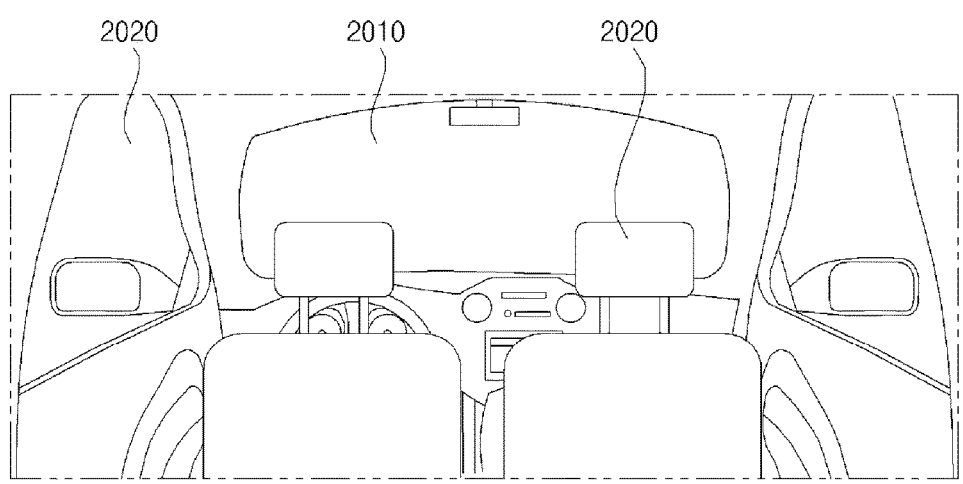
FIG. 20 illustrates the position of a transparent flexible display according to an embodiment of the present invention.

FIG. 20 illustrates the position of a transparent flexible display according to an embodiment of the present invention.

Referring to FIG. 20, the transparent flexible display 441 may be disposed in close proximity to the front windshield 2210.

For example, the transparent flexible display 441 may be located inside the dashboard. In this case, a hole for drawing out the transparent flexible display 441 may be formed on the upper side of the dashboard. The transparent flexible display 441 may be rolled around a predetermined shaft and disposed inside the dashboard. A portion of the transparent flexible display 441 may be exposed to the interior of the vehicle under control of the processor 470.

The transparent flexible display 441 may be disposed in close proximity to the rear windshield.

For example, the transparent flexible display 441 may be located inside the C-pillar. In this case, a hole for drawing out the transparent flexible display 441 may be formed on one side of the C-pillar. The transparent flexible display 441 may be rolled around a predetermined shaft and disposed inside the C-pillar. A portion of the transparent flexible display 441 may be exposed to the interior of the vehicle under control of the processor 470.

The transparent flexible display 441 may be disposed in close proximity to the side window glass 2020.

For example, the transparent flexible display 441 may be located inside the door of the vehicle. In this case, a hole for drawing out the transparent flexible display 441 may be formed on the upper side of the door. The transparent flexible display 441 may be rolled around a predetermined shaft and disposed inside the door. A portion of the transparent flexible display 441 may be exposed to the interior of the vehicle under control of the processor 470.

For example, the transparent flexible display 441 may be located inside the A-pillar or B-pillar of the vehicle. In this case, a hole for drawing out the transparent flexible display 441 may be formed on one side of the A-pillar or B-pillar. The transparent flexible display 441 may be rolled around a predetermined shaft and disposed inside the A-pillar or B-pillar. A portion of the transparent flexible display 441 may be exposed to the interior of the vehicle under control of the processor 470.

The transparent flexible display 441 may be disposed in close proximity to the front seat 2020.

For example, the transparent flexible display 441 may be disposed on the back of the front sheet 2020. In this case, the user sitting on the rear seat can view the contents displayed on the transparent flexible display 441.

Figure 21:
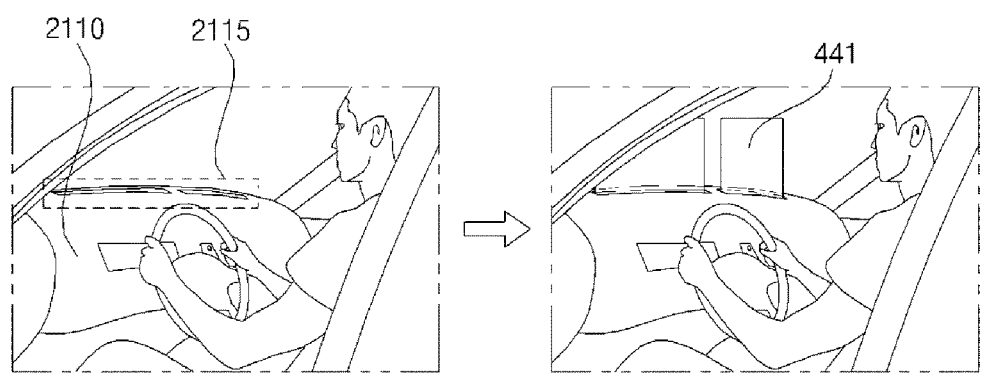
FIG. 21 illustrates a case where a transparent flexible display is disposed in close proximity to the windshield, according to an embodiment of the present invention.

FIG. 21 illustrates a case where a transparent flexible display is disposed in close proximity to the windshield, according to an embodiment of the present invention.

Referring to FIG. 21, the transparent flexible display 441 may be located inside the dashboard 2110. In this case, a hole 2115 for drawing out the transparent flexible display 441 may be formed on the upper side of the dashboard 2110.

The transparent flexible display 441 may be rolled around a predetermined shaft and disposed inside the dashboard 2110. A portion of the transparent flexible display 441 may be exposed to the interior of the vehicle under control of the processor 470.

The front windshield may be formed of an internal glass and an external glass. In this case, a space may be formed between the internal glass and the external glass. The exposed area of the transparent flexible display 441 may be disposed in a space between the internal glass and the external glass.

FIG. 22 illustrates a transparent flexible display and a drive unit according to an embodiment of the present invention, which shows a side view of the drive unit 450.

Referring to FIG. 22, the transparent flexible display 441 may be rolled around a first shaft 2201.

Transparent electrodes 2241 and 2242 may be disposed in at least one area of the transparent flexible display 441. The processor 470 may transmit electrical signals or electrical energy to the transparent flexible display 441 through the transparent electrodes 2241 and 2242.

The drive unit 450 may adjust the length by which the transparent flexible display 441 is exposed to the interior of the vehicle.

The drive unit 450 may include a roller unit 451, a driving force generation unit 452, elastic supports 2221*a* to 2221*d*, and an inclination adjustment part 2230.

The roller unit 451 may rotate in contact with the transparent flexible display 441, thereby adjusting the length of the area of the transparent flexible display 441 exposed to the outside. The roller unit 451 may be drawn in or drawn out of the transparent flexible display 441 by rotational driving force.

The roller unit 451 may include a main roller 2211 and sub-rollers 2212a to 2211f.

The main roller 2211 may be connected to the driving force generation unit 452. The main roller 2211 may receive the rotational driving force generated by the driving force generation unit 452.

The main roller 2211 may be connected to the transparent flexible display 441.

The main roller 2211 may rotate abut the first shaft 2201. Here, the first shaft 2201 is a center axis around which the transparent flexible display 441 is rolled. The main roller 2211 may rotate about the first shaft 2201, rolling or unrolling the transparent flexible display 441.

The sub-rollers 2212a to 2212f may be disposed between the transparent flexible display 441 and the housing. In the figure, six sub-rollers 2212a to 2212f are illustrated, but the number of the sub-rollers is not limited thereto. The drive unit 450 may include one or more sub-rollers.

The sub-rollers 2212a to 2212f may reduce friction against the housing 2235 when the transparent flexible display 441 is drawn in or out.

The driving force generation unit 452 may provide rotational driving force to the roller unit 451.

For example, the driving force generation unit 452 may include a motor.

The driving force generation unit 452 may provide rotational driving force generated by the motor to the roller unit 451.

The elastic supports 2221a to 2221d may elastically support the transparent flexible display 441 against the housing 2235. For example, the elastic supports 2221a to 2221d may include a spring. The elastic supporting portions 2221a to 2221d may press the transparent flexible display 441 in a predetermined direction to prevent the transparent flexible display 441 and the housing 2235 from being spaced apart.

The inclination adjustment part 2230 may adjust inclination of the transparent flexible display 441. The inclination adjustment part 2230 may be disposed in one area of the housing 2235. The inclination adjustment part 2230 may adjust inclination of the exposed area of the transparent flexible display 441 according to the degree of protrusion.

Figure 23:
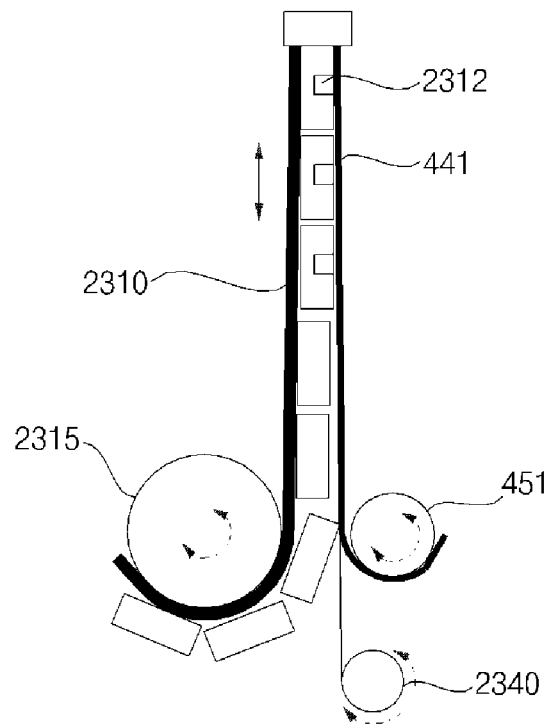
FIGS. 23 to 25 illustrate a support module according to an embodiment of the present invention.
Figure 24:
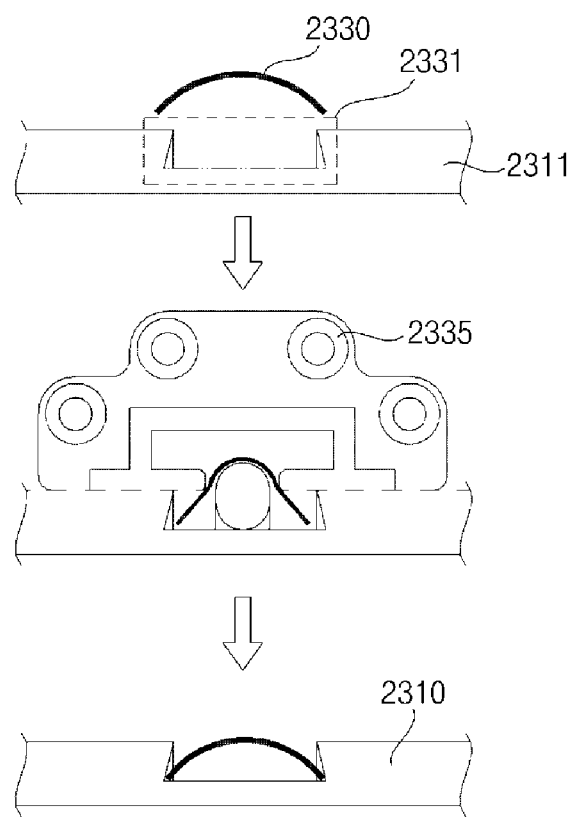
Figure 25:
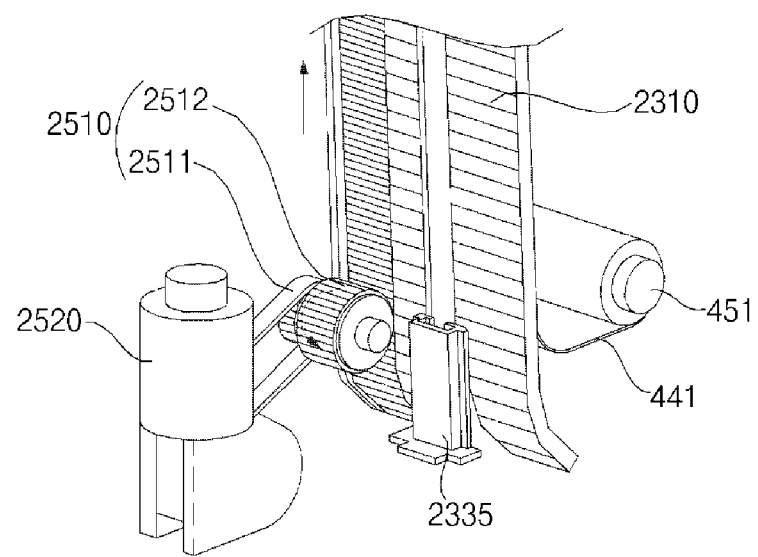

FIGS. 23 to 25 illustrate a support module according to an embodiment of the present invention.

Referring to FIGS. 23 to 25, the vehicle display device 400 may further include a support module 2310, a support module roller 2315, an elastic module 2330, an insertion guide 2335, and an elastic module roller 2340.

The support module 2310 may support an area of the transparent flexible display 441 that is exposed to the interior of the vehicle.

The support module 2310 may be rolled. The support module 2310 may include a plurality of aprons 2311 connected to each other. The support module 2310 may be wound or unwound by the support module roller 2315.

Each of the aprons 2311 may include a magnet 2312. The magnet 2312 may attach the aprons to the transparent flexible display 441.

As illustrated in FIG. 25, the support module roller 2315 may roll or unroll the support module 2310 by rotational driving force generated by the motor 2520. The rotational driving force generated by the motor 2520 may be transmitted to the supporting module 2315 through the driving force transmission unit 2510. Here, the driving force transmission unit 2510 may include a belt 2511 and a gear 2512.

The elastic module 2330 may include a plurality of elastic pieces 2230. As illustrated in FIG. 24, the elastic piece 2330 may be inserted into a slot 2331 formed in the apron 2311. Since the slot 2331 formed in the apron 2311 has an undercut structure, and the elastic piece 2330 is wider than the inlet of the slot 2331. Accordingly, the elastic piece 2330 is not inserted into the slot. The insertion guide 2335 may be inserted into the slot 2331 by narrowing the width of the elastic piece 2330.

As described above, each of the plurality of elastic pieces 2330 is inserted into the slots 2331 formed in the plurality of aprons 2311, such that the vertical position of the support module 2310 may be maintained by the elastic force of the elastic pieces 2330.

The elastic module roller 2340 may roll or unroll the elastic module 2310 through rotational driving force generated by a motor (not shown).

The transparent flexible display 441 may be attached to the support module 2310 through the plurality of magnets 2312. The transparent flexible display 441 may be exposed to the interior of the vehicle while being attached to the support module 2310. In this case, the transparent flexible display 441 may maintain the vertical posture thereof.

Figure 26A:
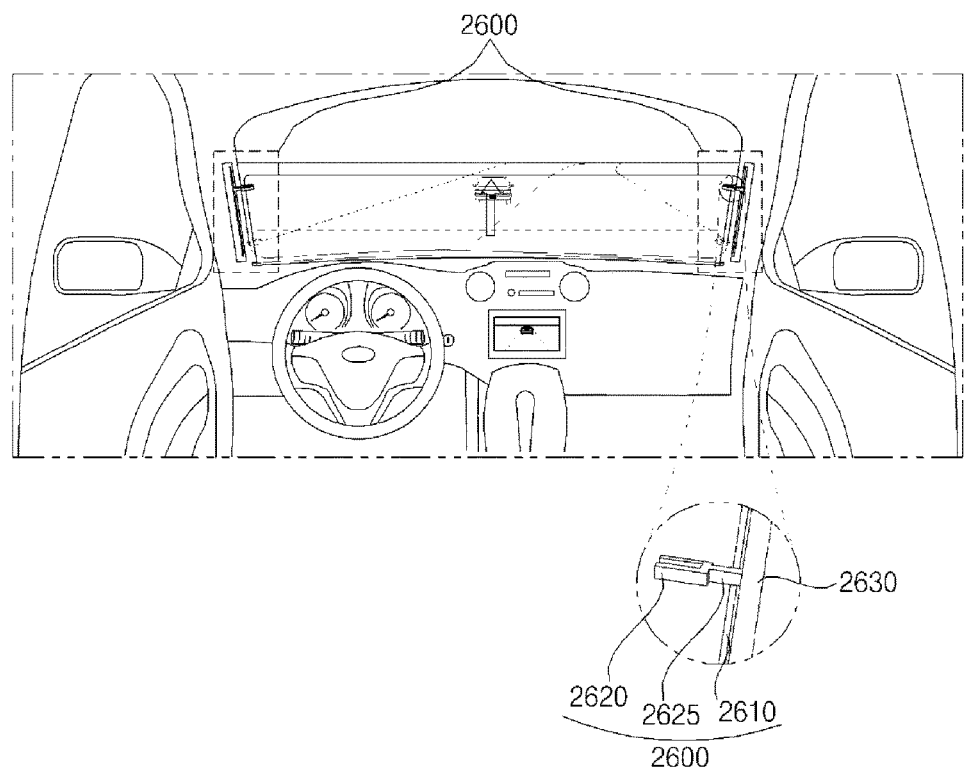
FIGS. 26A and 26B illustrate a support module according to an embodiment of the present invention.
Figure 26B:
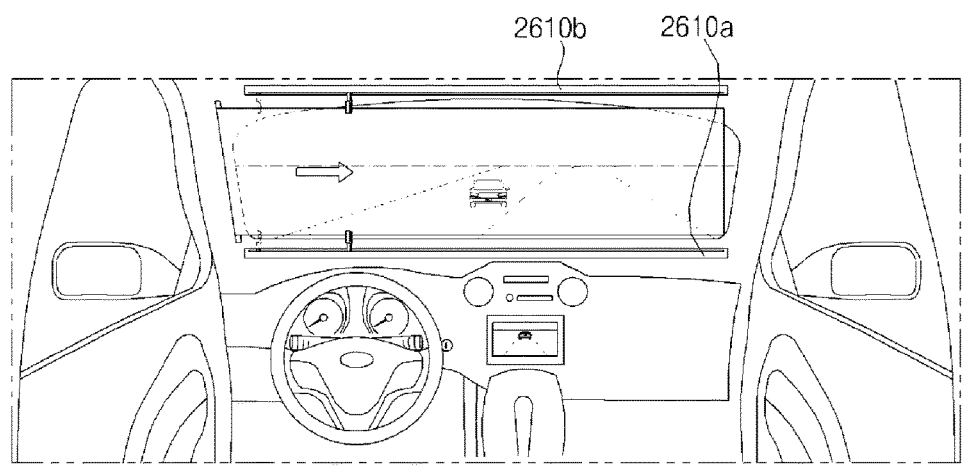

FIGS. 26A and 26B illustrate a support module according to an embodiment of the present invention.

Referring to FIGS. 26A to 26B, the support module 2600 may support an area of the transparent flexible display 441 that is exposed to the vehicle interior.

The support module 2600 may include a fixing part 2620, a connector 2625 and a guide portion 2610.

The support module 2600 may include a first support module and a second support module. Hereinafter, the first support module will be mainly described. The second support module may be configured to correspond to the first support module.

The fixing part 2620 may fix the exposed area of the transparent flexible display 441. For example, the fixing part 2620 may remain holing a part of the exposed area of the transparent flexible display 441.

The fixing part 2620 may be formed of a transparent material. For example, the fixing part 2620 may be formed of a transparent plastic material.

The guide portion 2610 may be formed such that the fixing part 2620 is linearly movable. The guide portion 2610 may include a groove. The connector 2625 may be seated in the groove. In this case, the fixing part 2620 may be linearly moved up and down or left and right along the groove with the connector 2625 seated in the groove.

For example, the transparent flexible display 441 may be arranged in close proximity to the front windshield. In this case, the fixing part 2620 may be linearly moved in the vertical direction or the horizontal direction of the front windshield.

Meanwhile, the guide portion 2610 may be disposed inside the A-pillar.

The guide portion 2610 may include a first guide portion and a second guide portion.

In this case, as illustrated in FIG. 26A, the first guide portion and the second guide portion may be respectively disposed inside the A-pillars on both sides of the vehicle. In this case, the transparent flexible display 441 may be vertically unrolled or rolled.

Alternatively, as illustrated in FIG. 26B, the first guide portion may be disposed on the dashboard, and the second guide portion may be disposed on the ceiling. In this case, the transparent flexible display 441 may be unrolled or rolled in the horizontal direction.

Figure 27:
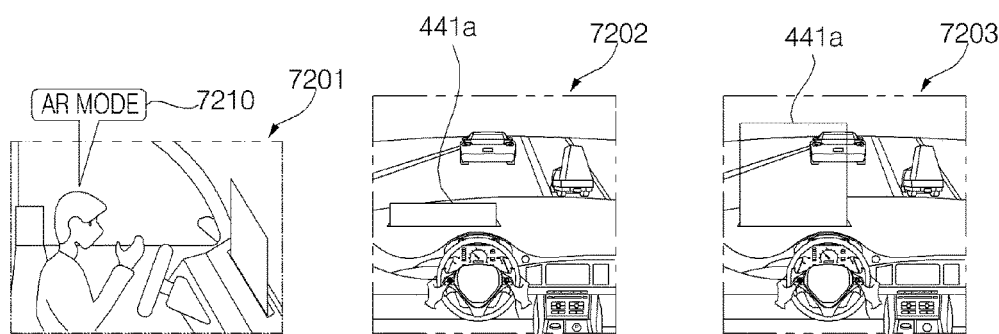
FIG. 27 illustrates the operation of exposing a transparent flexible display according to an embodiment of the present invention.

FIG. 27 illustrates the operation of exposing a transparent flexible display according to an embodiment of the present invention.

As shown in illustration 2701, the transparent flexible display 441 may be rolled around a first shaft and disposed inside the dashboard.

The processor 470 may receive user input through the input unit 420. For example, the processor 470 may receive a voice input 2710.

When user input is received, the processor 470 may control one area of the transparent flexible display 441 to be exposed to the interior of the vehicle as shown in as illustration 2702.

The processor 270 may control the driving force generation unit 452 to generate rotational driving force. The rotational driving force generated by the driving force generation unit 452 may be transmitted to the main roller 2211. The main roller 2211 can rotate. As the main roller 2211 rotates, the transparent flexible display 441 connected to the main roller 2211 may be unrolled. As the transparent flexible display 441 is unrolled, one area 441a of the transparent flexible display 441 may be exposed to the interior of the vehicle.

As shown in illustration 2703, the length of the exposed area 441a of the transparent flexible display is adjustable. The processor 470 may control the drive unit 450 to adjust the length of the area 441a of the transparent flexible display 441 that is exposed to the interior of the vehicle.

Meanwhile, the processor 470 may display information in the exposed area 441a. For example, the processor 470 may display navigation information in the exposed area 441a.

Figure 28:
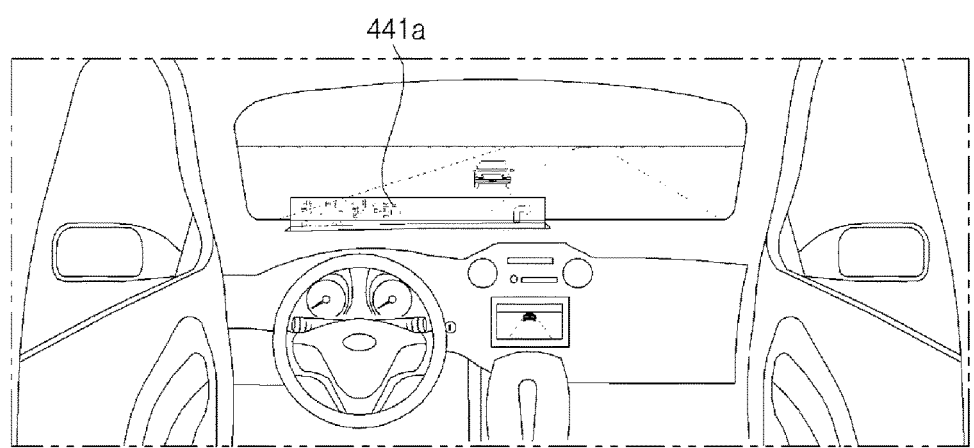
FIG. 28 illustrates the operation of displaying information in an exposed area, according to an embodiment of the present invention.

FIG. 28 illustrates the operation of displaying information in an exposed area, according to an embodiment of the present invention.

Referring to FIG. 28, the processor 470 may display information with the one area 441a of the transparent flexible display 441 exposed. Here, the information may include vehicle-related information, travel situation information, and navigation information.

The vehicle-related information may include vehicle control information for direct control of the vehicle or vehicle driving assistance information for a driving guide to the occupant in the vehicle. In addition, the vehicle-related information may include vehicle state information indicating the current state of the vehicle or vehicle travel information related to travel of the vehicle.

The travel situation information may include information about the travel environment or the travel road. The travel environment information may include weather information at the time of travel. The travel road information may include construction information and road congestion information.

The navigation information may include destination information, estimated arrival time, the amount of travel time, and a path.

Figure 29:
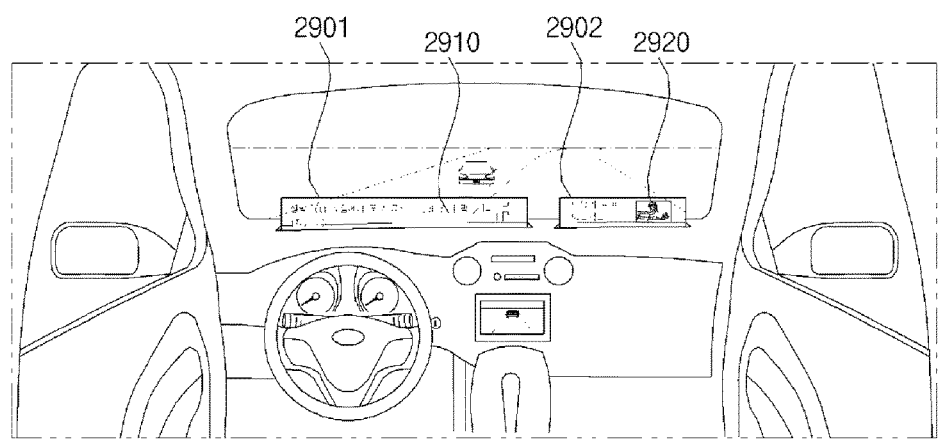
FIG. 29 illustrates the operation of displaying information in exposed areas of a first display and a second display, according to an embodiment of the present invention.

FIG. 29 illustrates the operation of displaying information in exposed areas of a first display and a second display, according to an embodiment of the present invention.

Referring to FIG. 29, when there is a plurality of transparent flexible displays 441 provided, the processor 470 may control different screen images to be displayed on each of the transparent displays.

The processor 470 may control different screen images to be displayed in the exposed areas of the respective transparent flexible displays.

For example, the transparent flexible display 441 may include a first display 2901 and a second display 2902.

The first display 2901 may be disposed in close proximity to the driver's seat. The first display 2901 may be rolled around a first shaft and disposed inside the dashboard.

The processor 470 may control one area of the first display 2901 to be exposed to the interior of the vehicle, according to user input. The processor 470 may display vehicle-related information, travel situation information, or navigation information in the exposed area of the first display 2901.

The second display 2902 may be disposed in close proximity to the passenger seat. The second display 2902 may be rolled around a second shaft and disposed inside the dashboard.

The processor 470 may control one area of the second display 2902 to be exposed to the interior of the vehicle, according to user input. The processor 470 may display predetermined content in an exposed area of the second display 2902. Here, the content may include, for example, a video clip, the Internet, or a game which is irrelevant to the vehicle.

According to an embodiment, the processor 470 may control the second display 2902 to be exposed to the interior of the vehicle when a passenger enters the vehicle. For example, when a passenger sitting on the passenger seat is detected through the internal camera 195c with only the first display 2901 exposed, the processor 470 may control the second display 2902 to be exposed to the interior of the vehicle.

Figure 30:
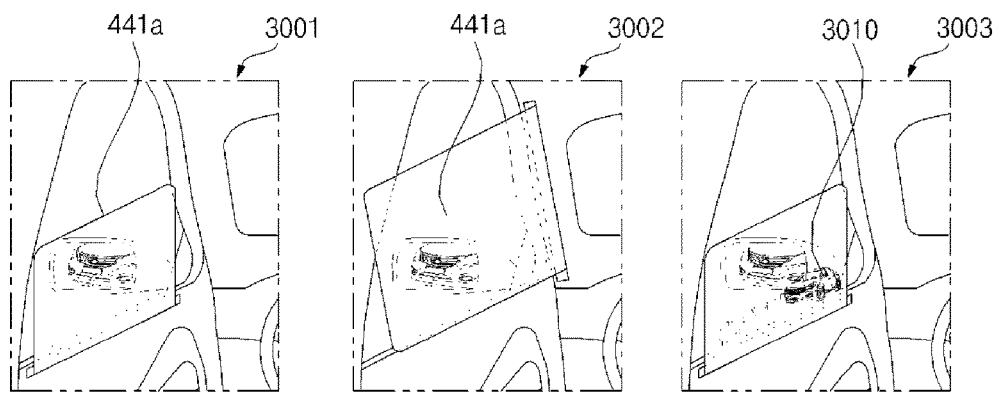
FIG. 30 illustrates the operation of displaying an image acquired through a camera on a transparent flexible display according to an embodiment of the present invention.

FIG. 30 illustrates the operation of displaying an image acquired through a camera on a transparent flexible display according to an embodiment of the present invention.

Referring to FIG. 30, the processor 470 may receive image data acquired by the camera 195 through the interface unit 480. The processor 470 may display a screen image based on the image data on the transparent flexible display 441.

If the transparent flexible display 441 is disposed in close proximity to the side window glass, the processor 470 may control the rear view image of the vehicle to be displayed on the transparent flexible display 441.

As shown in illustration 3001, the transparent flexible display 441 may be rolled around a first shaft and disposed inside the door.

The processor 470 may control one area 441a of the transparent flexible display 441 to be exposed to the interior of the vehicle according to user input. The processor 470 may display an image captured by the camera 195 in the exposed area 441a.

As shown in illustration 3002, the transparent flexible display 441 may be rolled around a first shaft and disposed within the A-pillar.

The processor 470 may control one area 441a of the transparent flexible display 441 to be exposed to the interior of the vehicle according to user input. The processor 470 may display an image captured by the camera 195 in the exposed area 441a.

For example, when the vehicle travels in a snowy or rainy weather, the processor 470 may control a rear view image 3010 of the vehicle to be displayed on the transparent flexible display 441a disposed in close proximity to the side window glass.

For example, when a turn signal is input for lane change or redirection, the processor 470 may control a rear view image 3003 of the vehicle to be displayed on the transparent flexible display 441a disposed in close proximity to the side window glass.

Figure 31:
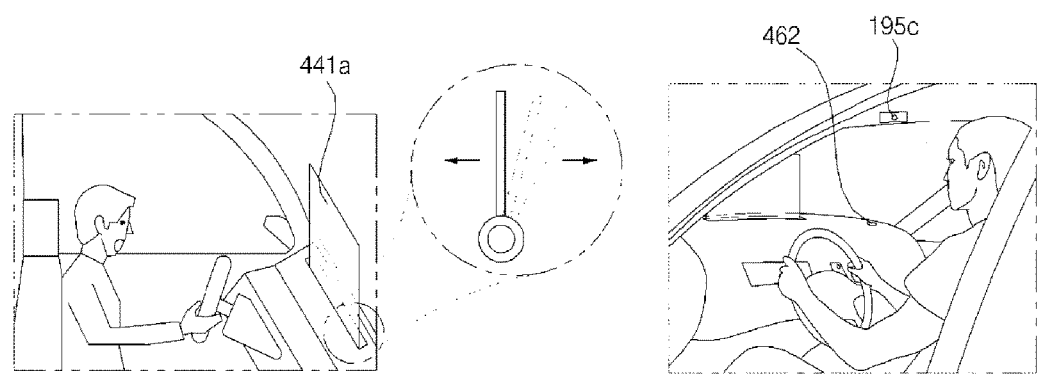
FIG. 31 illustrates a transparent flexible display whose angle and brightness are adjustable, according to an embodiment of the present invention.

FIG. 31 illustrates a transparent flexible display whose angle and brightness are adjustable, according to an embodiment of the present invention.

Referring to FIG. 31, the angle of the transparent flexible display 441 may be adjusted. The exposed area 441a of the transparent flexible display 441 may form a predetermined angle with respect to the dashboard in the Y-Z plane. Here, the Y axis may be arranged in the width direction W, and the Z axis may be arranged in the length direction L.

The angel of the exposed area 441a of the transparent flexible display 441 may be adjusted depending on the user's gaze. The processor 470 may control the degree of protrusion of an inclination adjustment unit 2230. The processor 470 may adjust inclination of the exposure area 441a with respect to the dashboard by controlling the degree of protrusion through the inclination adjustment unit 2230.

The processor 470 may control inclination of the exposed area 441a in order to allow the user to easily view the screen image displayed in the exposed area 441a while looking forward. For example, the processor 470 may control inclination of the exposed area 441a such that the angle formed between the direction of the user's gaze and the exposed area 441a in the Y-Z plane is greater than or equal to 80° and less than or equal to 100°.

The processor 470 may adjust the brightness of the transparent flexible display 441 according to the amount of light emitted into the vehicle. For example, the processor 470 may darken the transparent flexible display 441 in proportion to the amount of light emitted into the vehicle. By darkening the entire transparent flexible display 441, visibility of the displayed content may be enhanced.

Figure 32:
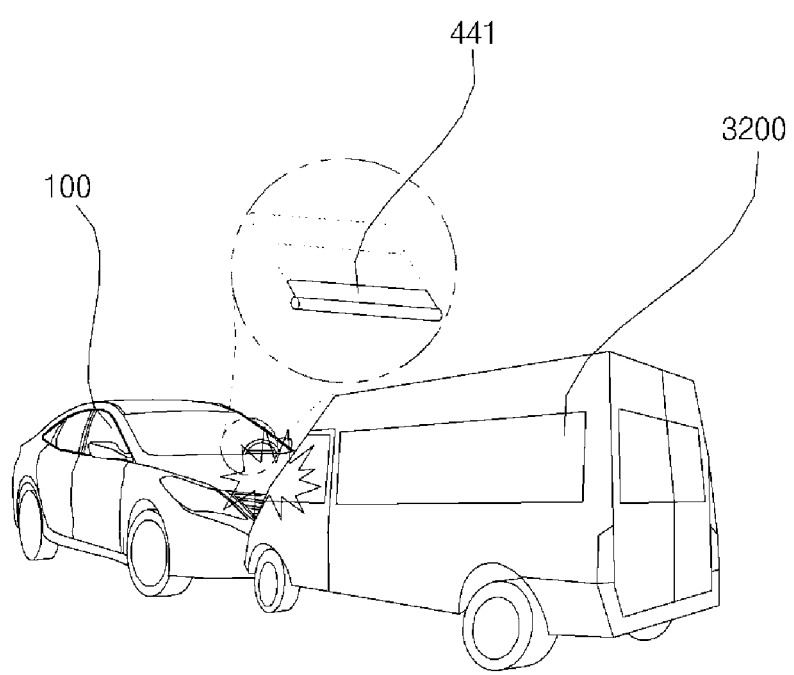
FIG. 32 illustrates operation of a transparent flexible display performed when information about collision with an object is received, according to an embodiment of the present invention.

FIG. 32 illustrates operation of a transparent flexible display performed when information about collision with an object is received, according to an embodiment of the present invention.

Referring to FIG. 32, the processor 470 may receive information about collision with an object through the interface unit 480. The camera 195 may sense collision with an object. Alternatively, radar, LiDAR, or an ultrasonic sensor included in the sensing unit 760 may sense collision with an object.

When the information about collision with the object is received, the processor 470 may control the drive unit 450 such that the transparent flexible display 441 is not exposed. For example, the processor 470 may control the drive unit 450 to control the transparent flexible display 441 to be arranged rolled around a predetermined shaft. Thereby, damage to the transparent flexible display 441 may be prevented in the event of an accident.

Figure 33:
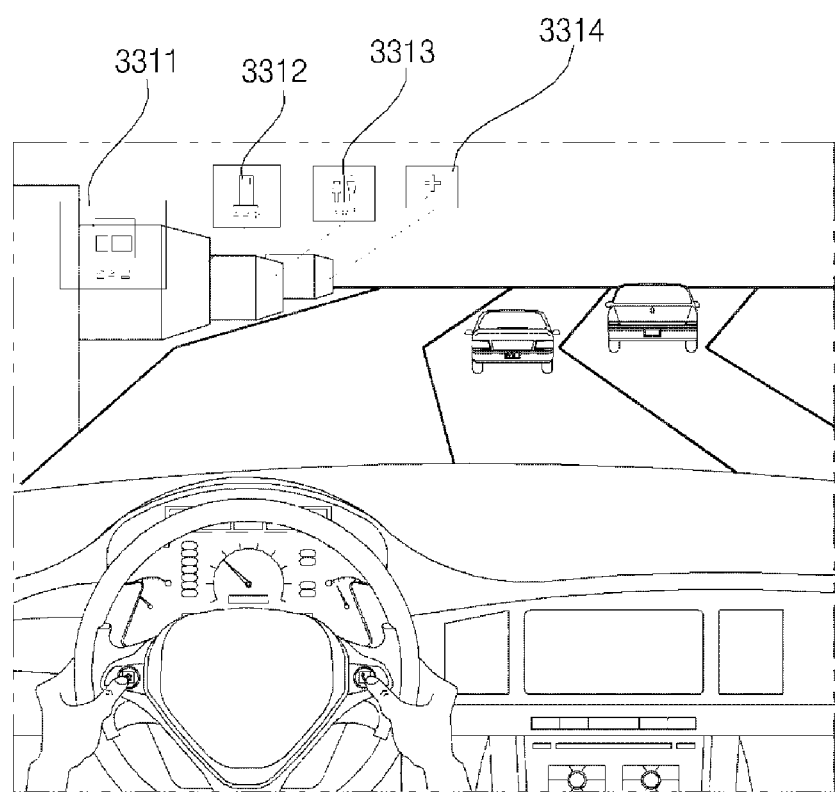
FIG. 33 illustrates the operation of displaying POI information on a transparent flexible display according to an embodiment of the present invention.

FIG. 33 illustrates the operation of displaying POI information on a transparent flexible display according to an embodiment of the present invention.

Referring to FIG. 33, the vehicle display device 400 may communicate with the user's mobile terminal 250 through the communication unit 410. The processor 470 may receive user's interest information from the mobile terminal 250 through the communication unit 410.

For example, the mobile terminal 250 may accumulate and store information corresponding to websites visited by the user, SNS keywords, and text message keywords. The mobile terminal 250 may extract user's interest information based on the stored information.

The processor 470 may receive the interest information from the mobile terminal 250. The processor 470 may display Points of Interest (POIs) 3311, 3312, 3313, and 3314 corresponding to the interest information on the exposed area 441a of the transparent flexible display.

Figure 34:
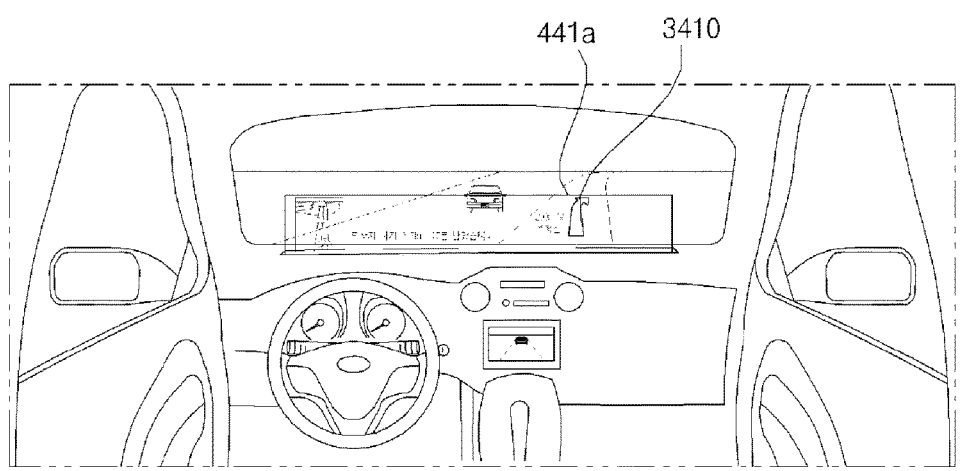
FIG. 34 illustrates the operation of displaying TBT information on a transparent flexible display according to an embodiment of the present invention.

FIG. 34 illustrates the operation of displaying TBT information on a transparent flexible display according to an embodiment of the present invention.

Referring to FIG. 34, the processor 470 may display navigation information in the exposed area 441a of the transparent flexible display 441.

The navigation information may include TBT (Turn by Turn) information.

The processor 470 may display the TBT information 3410 such that the TBT information matches with an actual lane. The processor 470 may give a perspective to and display a TBT image 3410. Alternatively, the processor 470 may stereoscopically display the TBT image 3410. The processor 470 may display the TBT image 3410 such that the height of the TBT image 3410 matches with the perspective of an actual lane. In this case, the width of the displayed TBT image may be reduced according to the height.

Figure 35:
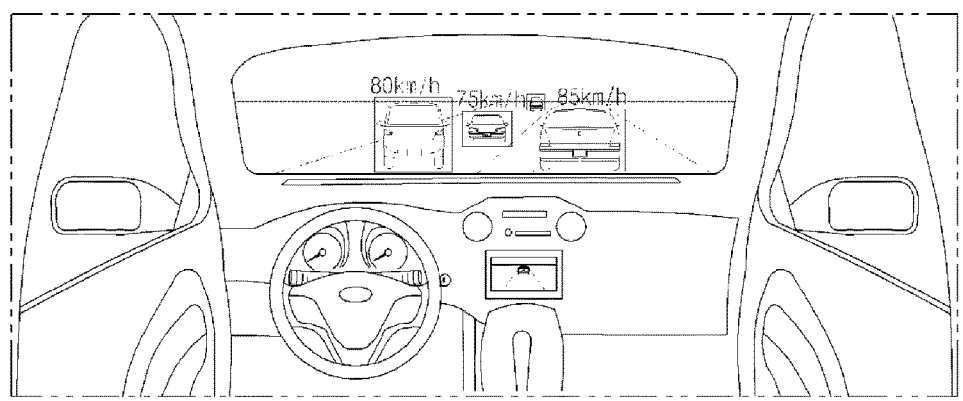
FIG. 35 illustrates the operation of displaying information about the distance to an object on a transparent flexible display according to an embodiment of the present invention.

FIG. 35 illustrates the operation of displaying information about the distance to an object on a transparent flexible display according to an embodiment of the present invention.

Referring to FIG. 35, the processor 470 may receive information about the distance to an object through the interface unit 480. Here, the distance information may be sensed through the camera 195, radar, LiDAR, or an ultrasonic sensor.

The processor 470 may display distance information about at least one object in the exposed area of the transparent flexible display.

Figure 36:
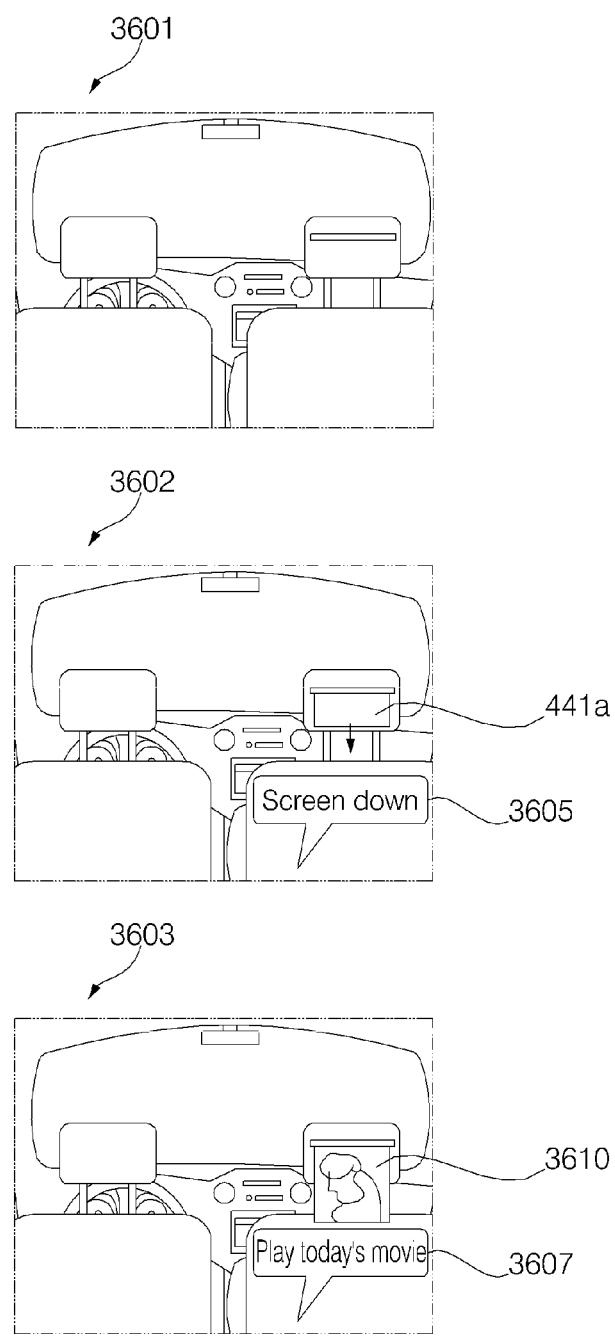
FIG. 36 illustrates a case where a transparent flexible display is disposed on a front seat, according to an embodiment of the present invention.

FIG. 36 illustrates a case where a transparent flexible display is disposed on a front seat, according to an embodiment of the present invention.

As shown in illustration 3601, the transparent flexible display 441 may be rolled around a first shaft and disposed inside the front seat.

The processor 470 may receive user input through the input unit 420. For example, the processor 470 may receive a voice input 3605.

When user input is received, the processor 470 may control one area of the transparent flexible display 441 to be exposed to the interior of the vehicle as shown in as illustration 3602. In this case, the exposed area 441a may be arranged along the rear surface of the headrest of the front seat.

The processor 270 may control the driving force generation unit 452 to generate rotational driving force. The rotational driving force generated by the driving force generation unit 452 may be transmitted to the main roller 2211. The main roller 2211 can rotate. As the main roller 2211 rotates, the transparent flexible display 441 connected to the main roller 2211 may be unrolled. As the transparent flexible display 441 is unrolled, one area 441a of the transparent flexible display 441 may be exposed to the interior of the vehicle.

As shown in illustration 3603, the length of the exposed area 441a of the transparent flexible display is adjustable. The processor 470 may control the drive unit 450 to adjust the length of the area 441a of the transparent flexible display 441 that is exposed to the interior of the vehicle.

The processor 470 may display content in the exposed area 441a. Here, the content may include, for example, a video clip, the Internet, or a game which is irrelevant to the vehicle.

Figure 37:
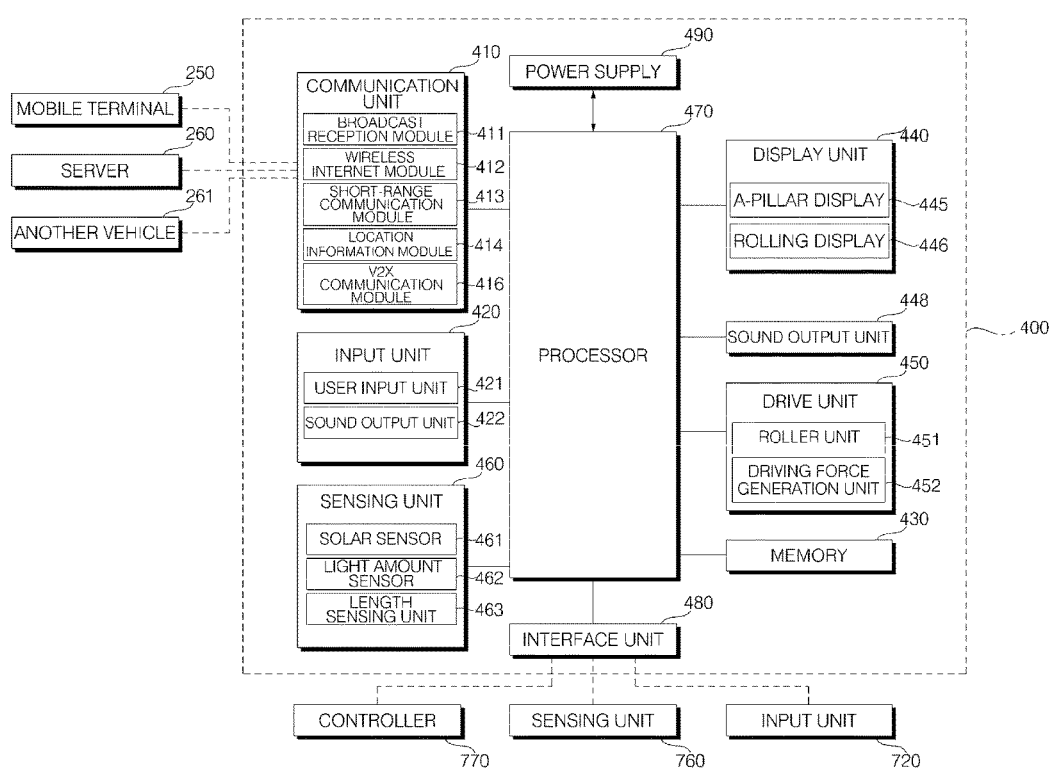
FIG. 37 is a block diagram illustrating a display device for a vehicle according to another embodiment of the present invention.

FIG. 37 is a block diagram illustrating a display device for a vehicle according to another embodiment of the present invention.

Figure 38:
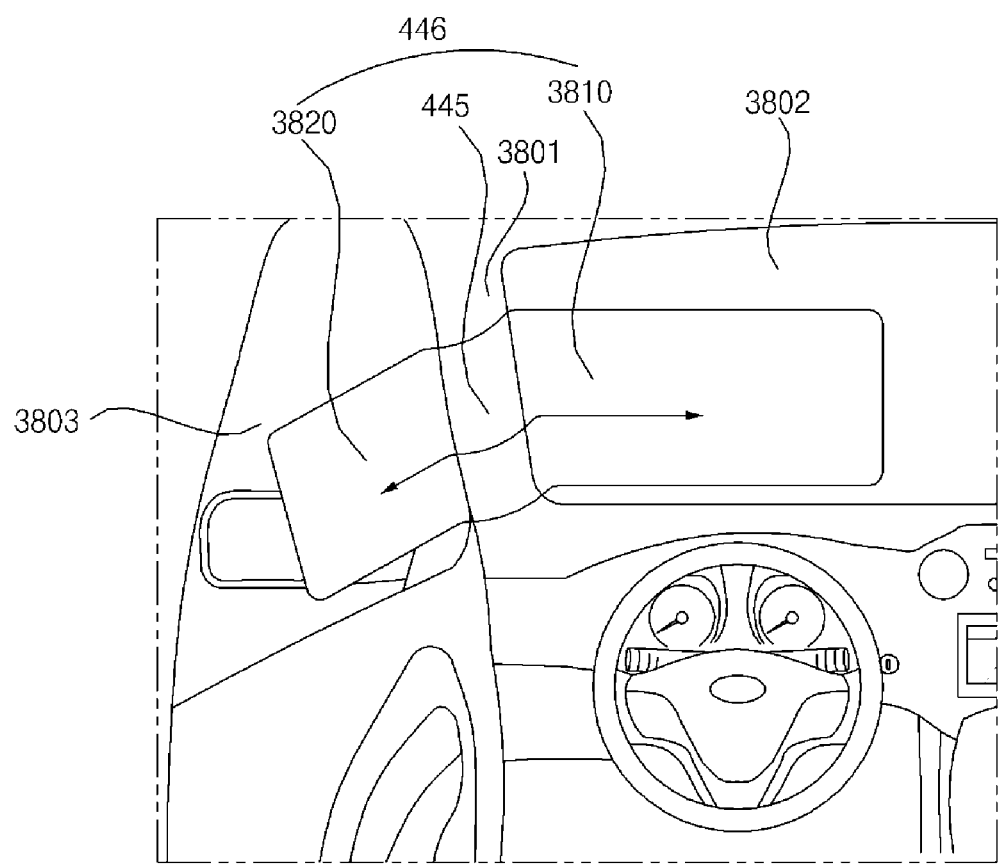
FIG. 38 illustrates a display unit according to an embodiment of the present invention.

FIG. 38 illustrates a display unit according to an embodiment of the present invention.

Referring to FIGS. 37 and 38, the vehicle display device 400 may include a communication unit 410, an input unit 420, a memory 430, a display unit 440, a sound output unit 448, a drive unit 450, a sensing unit 460, a processor 470, an interface unit 480, and a power supply 490.

The vehicle display device of FIG. 37 differs from the vehicle display device of FIG. 19 in configuration or operation of the processor 470 and the display unit 440. Hereinafter, a description will be given mainly of the main constituents. All the elements of the vehicle display device of FIG. 37 except the processor 470 and the display unit 440 are the same as those of the vehicle display device of FIG. 19.

The display unit 440 may include an A-pillar display 445 and a rolling display 446.

The A-pillar display 445 may be disposed in the A-pillar 3801 of the vehicle.

The rolling display 446 may be one embodiment of the transparent flexible display 441 described in FIG. 19.

The rolling display 446 may be rolled so as to be unrolled out of the A-pillar 3801 toward the front windshield 3802 or the side window glass 3803.

The rolling display 446 may be configured to be deformable by an external force. The deformation may be at least one of warping, bending, folding, twisting, and curling of the transparent flexible display 441.

When the rolling display 446 is in an undeformed state (for example, a state in which the display has an infinite radius of curvature, hereinafter referred to as a first state), the display area of the rolling display 446 forms a flat surface. When the display is switched from the first state to a deformed state (for example, a state having a finite radius of curvature, hereinafter referred to as a second state) d by an external force, the display area may form a curved surface. The information displayed in the second state may be visual information output on the curved surface. Such visual information is realized by independently controlling emission of light from unit pixels (sub-pixels) arranged in a matrix form. The unit pixel means a smallest unit for implementing one color.

The rolling display 446 may be changed from the first state or the flat state to a warped state (e.g., a laterally or longitudinally warped state). In this case, when an external force is applied to the rolling display 446, the rolling display 446 may be deformed to be flat (or less warped) or more warped.

Meanwhile, the rolling display 446 may be combined with a touch sensor to implement a flexible touchscreen. When the flexible touch screen is touched, the processor 470 may perform a control operation corresponding to the touch input. The flexible touchscreen may be configured to sense the touch input not only in the first state but also in the second state.

Meanwhile, the rolling display 446 may have a predetermined transparency. In order to have such a transparency, the rolling display 446 may include at least one of a transparent TFEL (Thin Film Elecroluminescent), a transparent OLED (Organic Light-Emitting Diode), a transparent LCD (Liquid Crystal Display), a transmissive transparent display, and a transparent LED (Light Emitting Diode). The transparency of the rolling display 446 may be adjusted under control of the processor 470.

The rolling display 446 may include a first rolling display 3810 and a second rolling display 3820. Here, the first rolling display 3810 may be rolled so as to be unrolled out of the A-pillar 3801 toward the front windshield 3802. The second rolling display 3820 may be rolled so as to be unrolled out of the A-pillar 3801 toward the side window glass 3803.

The second rolling display 3820 may include a third rolling display and a fourth rolling display. Here, the third rolling display may be rolled so as to be unrolled out of the left A-pillar toward the left side window glass 3803. The fourth rolling display may be rolled so as to be unrolled out of the right A-pillar toward the right side window glass 3803.

According to an embodiment, the A-pillar display 445 may be integrated the rolling display 446.

The drive unit 450 may adjust the length of an area of the transparent flexible display 441 that is exposed to the interior of the vehicle. For example, the drive unit 450 may adjust the unrolled area of the transparent flexible display 441.

The drive unit 450 may include a roller unit 451, a driving force generation unit 452, an elastic supports 2221a to 2221d (see FIG. 22), and an inclination adjustment part 2230 (see FIG. 22).

The roller unit 451 may rotate in contact with the rolling display 446, thereby adjusting the length of the area of the rolling display 446 exposed to the outside. For example, the roller unit 451 may rotate in contact with the rolling display 446 to adjust the unrolled area.

The roller unit 451 may include a main roller 2211 (see FIG. 22) and sub-rollers 2212a to 2211f (see FIG. 22).

The main roller 2211 (see FIG. 22) may be connected to the driving force generation unit 452. The main roller 2211 (see FIG. 22) may receive the rotational driving force generated by the driving force generation unit 452.

The sub-rollers 2212a to 2212f (see FIG. 22) may be disposed between the rolling display 446 and the housing. The sub-rollers 2212a to 2212f (see FIG. 22) may reduce friction with the housing 2235 (see FIG. 22) when the rolling display 446 is drawn in or out.

The driving force generation unit 452 may provide rotational driving force to the roller unit 451.

For example, the driving force generation unit 452 may include a motor. The driving force generation unit 452 may provide rotational driving force generated by the motor to the roller unit 451.

The elastic supports 2221a to 2221d (see FIG. 22) may elastically support the transparent flexible display 441 against the housing 2235.

The inclination adjustment part 2230 (see FIG. 22) may adjust inclination of the rolling display 446.

The processor 470 may control unrolling of the rolling display 446. Specifically, the processor 470 may control the drive unit 450 to control the rolling display 446 to be drawn in or out. For example, the processor 470 may control the length of the area of the rolling display 446 that is exposed to the interior of the vehicle.

The processor 470 may control the unrolling of the rolling display 446 according to an input signal received through an input unit. For example, the processor 470 may control unrolling of the rolling display 446 in response to a user's button input or touch input received through the user input 421. For example, the processor 470 may control unrolling of the rolling display 446 according to the user's voice input received through the sound input 422.

The processor 470 may control the screen image displayed on the rolling display 446 according to the degree of unrolling sensed by a length sensing unit 463. For example, the processor 470 may control the size of the screen image according to the degree of unrolling. For example, the processor 470 may control a display area in the screen image according to the degree of unrolling.

The processor 470 may control the screen image displayed on the A-pillar display 445 or the rolling display 446.

For example, when the unrolled state of the rolling display 446 is changed so as to widen the display area with first content displayed on the rolling display 446, the processor 470 may control second content to be further displayed on the rolling display 446 while the first content display is kept displayed.

Here, the display area is an area in which the content can be displayed. For example, the display area may be an area of the rolling display 446 that is exposed to the vehicle interior.

For example, if the rolling display 446 is switched such that the display area is narrowed with the first content displayed on the rolling display 446, the processor 460 may control a part of the first content not to be displayed according to the narrowed display area with the first content displayed.

The processor 470 may control the screen image displayed on the A-pillar display 445 according to the degree of unrolling of the rolling display 446.

The A-filler display 445 may include a touch sensor. The processor 470 may control unrolling of the rolling display 445 according to an input signal received through the touch sensor included in the A-pillar display 445. The processor 470 may control the screen image displayed on the A-pillar display 445 or the rolling display 446 according to an input signal received through the touch sensor included in the A-pillar display 445. Here, the input signal may include a tap, a touch and hold, a double tap, a drag, panning, flick, and a drag and drop. The "tap" represents an operation of the user quickly touching the screen with a finger or a touch tool (stylus). The "touch and hold" represents an operation of the user touching the screen with a finger or a touch tool (stylus) and holding the touch input for more than a threshold time. The "double tap" represents an operation of the user quickly touching the screen twice with a finger or a touch tool (stylus). The "drag" means an operation of touching the screen with a finger or a touch tool and then moving the finger or the touch tool to another position on the screen to another position in the screen while holding the touch. The "panning" represents an operation of the user performing a drag operation without selecting an object. The "flick" represents an operation of the user performing a very quick drag with a finger or a touch tool. The "drag and drop" means an operation of the user dragging an object to a predetermined position on the screen using a finger or a touch tool and then releasing the object.

The processor 470 may receive object sensing information through the interface unit 480. The sensing unit 125 or the camera 195 may generate object sensing information by sensing an object located in the vicinity of the vehicle.

The processor 470 may control an image corresponding to the object to be displayed on the A-pillar display 445 or the rolling display 446 according to the object sensing information.

The processor 470 may receive movement information about the object. The sensing unit 125 or the camera 195 may generate object movement information by tracking movement of the object.

The processor 470 may control the display area of the image corresponding to the object to change according to the movement information.

For example, the processor 470 may receive first movement information through the interface unit 480. The first movement information may be information indicating that the object moves from the A-pillar 3801 toward the front windshield 3802 or the side window glass 3803 with respect to the driver. The processor 470 may control an image corresponding to the object displayed on the A-pillar display 455 to move to the rolling display 446 in response to the first movement information.

For example, the processor 470 may receive second movement information through the interface unit 480. The second movement information may be information indicating that the object moves from a position close to the front windshield 3802 or the side window glass 3803 toward the A-pillar 3801 with respect to the driver. The processor 470 may perform a control operation to move an image corresponding to the object displayed on the rolling display 446 to the A-pillar display 445 in response to the second movement information.

On the other hand, the rolling display 446 may include a first rolling display 3810 that is rolled so as to be unrolled out of the A-pillar 3801 toward the front windshield 3802 and a second rolling display 3820 that is rolled so as to be unrolled out of the A-pillar 3801 toward the side window glass 3803.

The processor 470 may control different contents to be displayed on the A-pillar display 445, the first rolling display 3810 and the second rolling display 3820, respectively.

The processor 470 may receive user gaze information from the internal camera 195c through the interface unit 480. The processor 470 may display content on the second rolling display 3820 if the user's gaze is directed to the side window glass 3803. For example, the processor 470 may display a rear view image of the vehicle acquired from the rear camera on the second rolling display 3820, when the user's gaze is directed the side window glass 3803.

The processor 470 may receive turn signal information through the interface unit 480. The processor 470 may display content on the second rolling display 3820 corresponding to the turn signal direction. For example, when a left turn signal is received, the processor 470 may display the content on the third rolling display 3820 corresponding to the left window glass. For example, when a right turn signal input is received, the processor 470 may display the content on the fourth rolling display corresponding to the right window glass.

The processor 470 may display the content on the second rolling display 3820 according to the user's gaze and turn signal information.

The processor 470 may receive window open or closed state information through the interface unit 480.

The processor 470 may control the second rolling display 3820 to be rolled when the window is opened. This is to prevent damage to the second rolling display when the window is opened.

The processor 470 may control the second rolling display 3820 to be unrolled when the window is closed again.

When the window is opened, the processor 470 may control the first rolling display 3810 to be unrolled by a degree corresponding to the degree of rolling of the second rolling display 3820.

The processor 470 may receive, through the interface unit 480, weather information from the sensing unit 125 for sensing the weather condition. The illuminance sensor or the humidity sensor included in the sensing unit 125 of the vehicle 100 may sense the weather information.

The processor 470 may receive weather information from the external server 260 through the communication unit 410.

The processor 470 may receive image data from the camera 195 through the interface unit 480. For example, the processor 470 may receive the vehicle rear view image data from the rear camera through the interface unit 480.

The processor 470 may display an image corresponding to the vehicle rear view image data on the second rolling display 446 when it rains or snows. When it is difficult to secure a clear view due to rain or snow, the vehicle rear view image may be displayed on the second rolling display 446, thereby assisting the driver in safe driving.

When the user's gaze is directed to the side window glass 3803 in the rainy or snowy weather, the processor 470 may display an image corresponding to the vehicle rear view image data on the second rolling display 3820.

When a turn signal input is received in the rainy or snowy weather, the processor 470 may display an image corresponding to the vehicle rear view image data on the second rolling display 3820 corresponding to the turn signal direction.

When a message is received from an external device through the communication unit 410, the processor 470 may control message reception information to be displayed on the A-pillar display 445. When a user input is received or the vehicle stops, the processor 470 may control detailed content of the message to be displayed on the first rolling display 446. Here, the user input may be received through the input unit 420, or may be received through a touch sensor included in the A-pillar display 445.

The second rolling display 446 may include a third rolling display that is rolled so as to be unrolled out of the left A-pillar toward the left side window glass and a fourth rolling display that is rolled so as to be unrolled out of the right A-pillar toward the right side window glass.

The processor 470 may display, on the first rolling display 3810, an image corresponding to image data acquired through a camera disposed in front of the first rolling display 3810. The processor 470 may display, on the third rolling display, an image corresponding to the image data acquired through a camera arranged on the back or left side. The processor 470 may display, the fourth rolling display, an image corresponding to image data acquired through the camera disposed on the rear or right side.

Figure 39A:
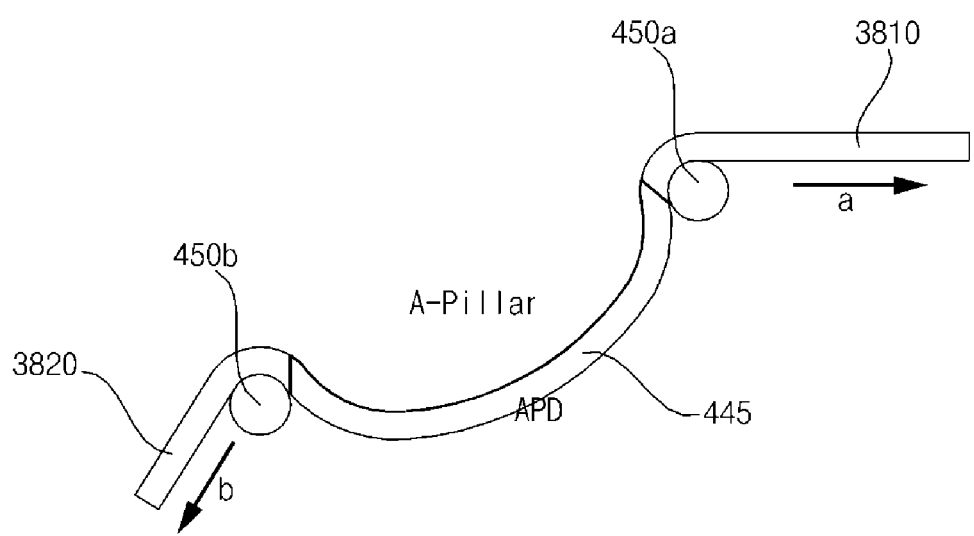
FIGS. 39A and 39B illustrate a display unit according to an embodiment of the present invention.
Figure 39B:
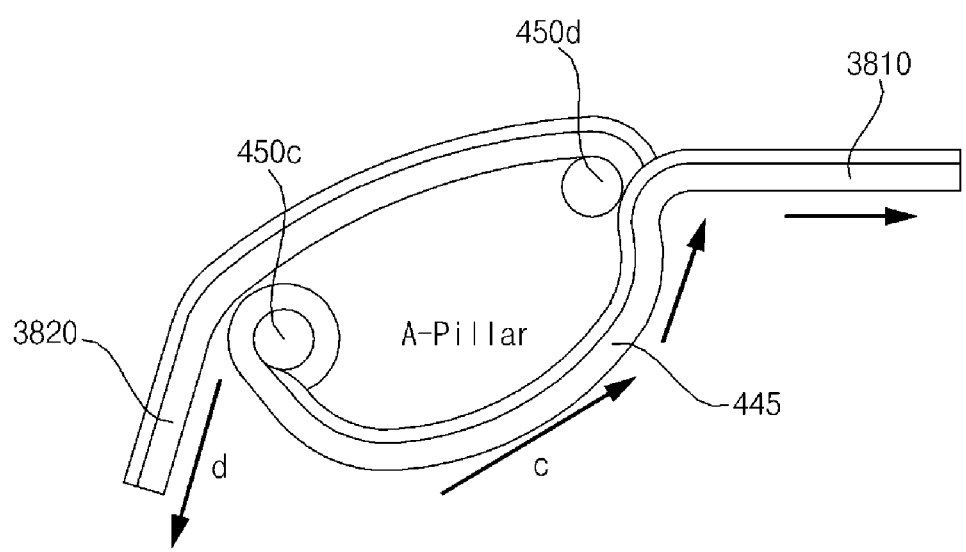

FIGS. 39A and 39B illustrate a display unit according to an embodiment of the present invention. FIGS. 39A to 39B show top view images around an A-pillar.

Referring to FIG. 39A, the A-pillar display 445 may be disposed on the A-pillar.

Meanwhile, the drive unit 450 may include a first drive unit 450a and a second drive unit 450b.

The first rolling display 3810 may be connected to the first drive unit 450a. The processor 470 may control the first drive unit 450a to control unrolling of the first rolling display 3810. The first rolling display 3810 can be unrolled out of the A-pillar in the direction a facing the front windshield.

The second rolling display 3810 may be connected to the second drive unit 450b. The processor 470 may control the second drive portion 450b to control unrolling of the second rolling display 3820. The second rolling display 3820 can be unrolled out of the A-pillar in the direction b facing in the side window glass.

Meanwhile, the first drive unit 450a may be disposed at a position where the A-pillar and the front windshield are connected. In this case, the first drive unit 450a may be formed of a transparent material.

The second drive unit 450b may be disposed at a position where the A-pillar and the side window glass are connected. In this case, the second drive unit 450b may be formed of a transparent material.

Referring to FIG. 39B, the drive unit 450 may include a third drive unit 450c and a fourth drive unit 450d.

The first rolling display 3810 may be connected to the third drive unit 450c. The processor 470 may control the third drive unit 450c to control unrolling of the first rolling display 3810.

The A-filler display 445 may be integrated with the first rolling display 3810. In this case, the first rolling display 3810 is unrolled in the direction c facing the front windshield direction c, while covering the A-pillar. Here, an area of the first rolling display 3810 that covers the A-pillar may be referred to as an A-pillar display 445.

The second rolling display 3810 may be connected to the fourth drive unit 450d. The processor 470 may control the fourth drive unit 450d to control unrolling of the second rolling display 3820. The second rolling display 3820 may be unrolled out of the A-pillar in the direction d facing the side window glass.

Meanwhile, the A-pillar display 445 may be integrated with the second rolling display 3820. In this case, the second rolling display 3810 may be unrolled toward the side window glass while covering the A-pillar. Here, an area of the second rolling display 3820 that covers the A-pillar may be referred to as an A-pillar display 445.

The first rolling display 3810 may be unrolled out of the A-pillar toward the side window glass.

Figure 40A:
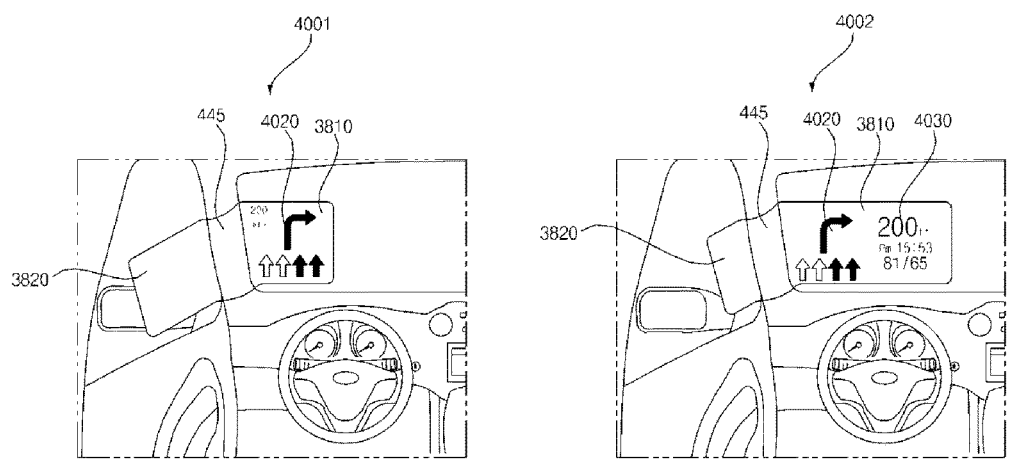
FIGS. 40A and 40B illustrate the operation of unrolling a rolling display according to an embodiment of the present invention.
Figure 40B:
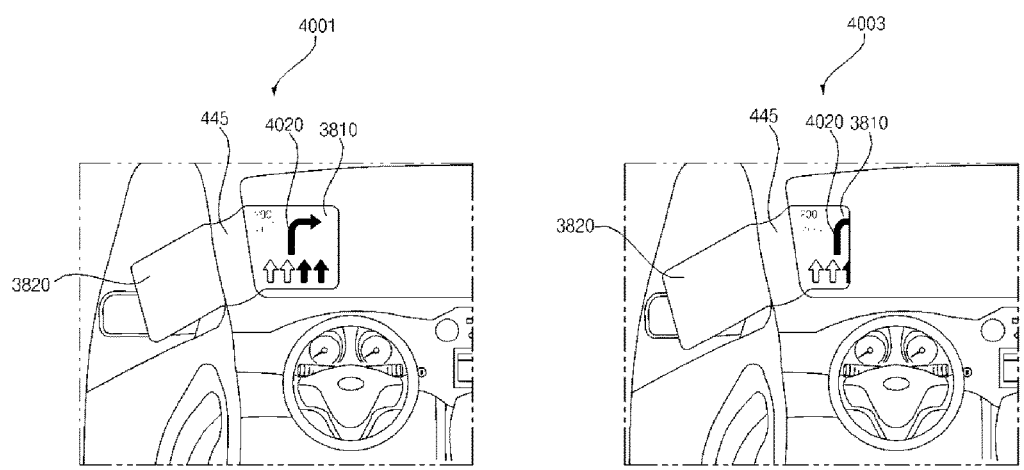

FIGS. 40A and 40B illustrate the operation of unrolling a rolling display according to an embodiment of the present invention.

Referring to FIG. 40A, as show in illustration 4001, the display unit 440 may include an A-pillar display 445 and a rolling display 446. Here, the rolling display 446 may include a first rolling display 3810 and a second rolling display 3820.

As shown in illustration 4002, the processor 470 may control unrolling of the rolling display 446 when a user input is received.

In addition, the processor 470 may control the screen image displayed on the rolling display 446 when a user input is received.

Here, the user input may be an input received through the input unit 420. Alternatively, the user input may be an input received through a touch sensor included in the A-pillar display 445.

The length sensing unit 463 may sense the degree of unrolling of the rolling display. The processor 470 may control the screen image displayed on the rolling display 446 according to the degree of unrolling.

When the unrolled state of the rolling display 446 is switched so as to widen the display area with first content 4020 displayed on the rolling display 446 (4002), the processor 470 may maintain the first content 4020 in the displayed state and further display second content 4030 on the rolling display 446.

Referring to FIG. 40B, as shown in illustration 4003, when the unrolled state of the rolling display 446 is switched so as to narrow the display area with the first content 4020 displayed on the rolling display 446, the processor 470 may maintain the first content 4020 in the displayed state and control a part of the first content 4020 corresponding to the narrowed area not to be displayed.

Figure 41:
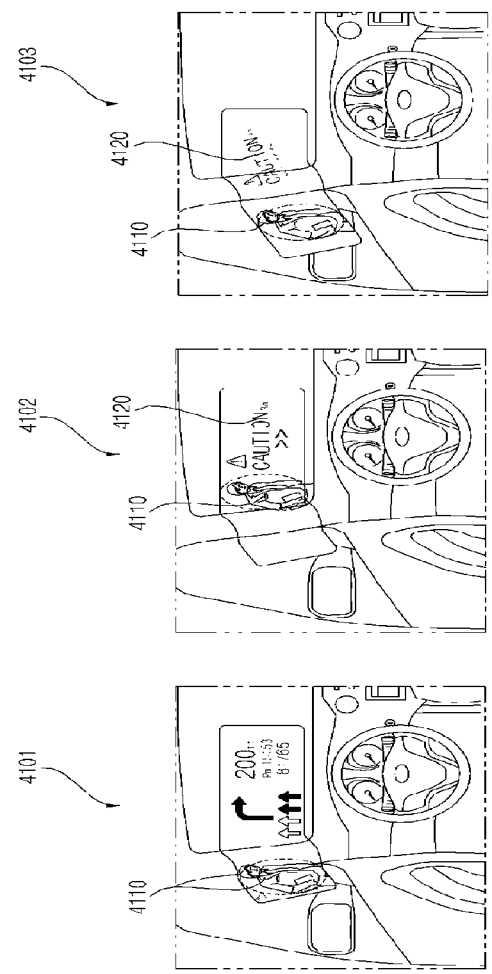
FIG. 41 illustrates the operation of displaying an image corresponding to a detected object, according to an embodiment of the present invention.

FIG. 41 illustrates the operation of displaying an image corresponding to a detected object, according to an embodiment of the present invention.

Referring to FIG. 41, the processor 470 may receive, through the interface unit 480, object sensing information from the sensing unit 125 for sensing objects. The processor 470 may control an image 4010 corresponding to the object to be displayed on the A-pillar display 445 or the rolling display 446 in response to the object sensing information.

The processor 470 may receive movement information about the object. The processor 470 may control the display area for the image 4010 to change according to the movement information.

The processor 470 may receive first movement information through the interface unit 480. The first movement information may be information indicating that the object moves from the A-pillar 3801 toward the front windshield 3802 (from image 4101 to image 4102) with respect to the driver. The processor 470 may control an image 4110 corresponding to the object displayed on the A-pillar display 455 to move to the rolling display 446 (from image 4101 to image 4102) in response to the first movement information. In this case, the processor 470 may output an alarm 4120 when collision with the object is sensed.

The processor 470 may receive second movement information through the interface unit 480. The second movement information may be information indicating that the object moves from a position close to the side window glass 3803 toward the A-pillar 3801 (image 4103 to image 4101) with respect to the driver. The processor 470 may perform a control operation to move an image 4110 corresponding to the object displayed on the rolling display 446 to the A-pillar display 445 in response to the second movement information. In this case, the processor 470 may output an alarm 4120 when collision with the object is sensed.

Figure 42:
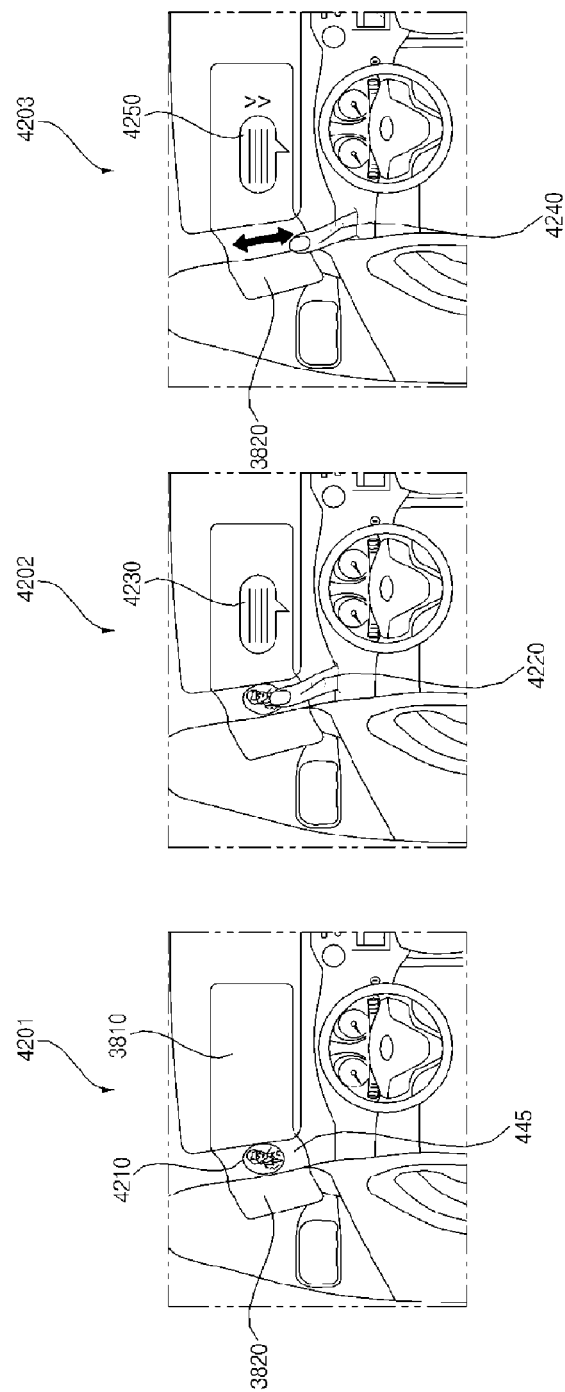
FIG. 42 illustrates a screen control operation according to user input, according to an embodiment of the present invention.

FIG. 42 illustrates a screen control operation according to user input, according to an embodiment of the present invention.

Referring to FIG. 42, when user a input 4210, 4240 is received through a touch sensor included in the A-pillar display 445, as shown in illustration 4202 and 4203, the processor 470 may control unrolling of the rolling display 446. The processor 470 may control a screen image 4230, 4250 displayed on the rolling display 446 when the user input 4210, 4240 is received through the touch sensor included in the A-pillar display 445.

For example, when a message is received from the external device 250, 260, 261, the processor 470 may control the message reception information 4210 to be displayed on the A-pillar display 445. FIG. 42 illustrates a case where a text message is received from the counterpart mobile terminal 250. As shown in illustration 4201, the processor 470 may display a photo 4210 of the counterpart on the A-pillar display 445.

When a first user input 4220 is received through the touch sensor included in the A-pillar display 445, the processor 470 may display the content 4230 of the received message on the rolling display 446. As shown in illustration 4202, the processor 470 displays the content of the text message received from the counterpart mobile terminal 250 on the rolling display 445.

Thereafter, when a second user input 4240 is received through the touch sensor included in the A-pillar display 445, the processor 470 may perform an operation corresponding to the second user input. As shown in illustration 4203, the processor 470 displays the content of the text message in response to the second user input.

Figure 43:
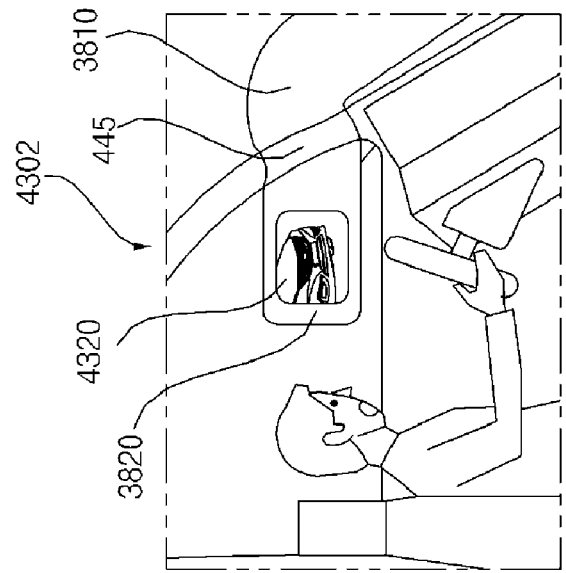
FIG. 43 illustrates the operation of displaying a camera acquired image on a rolling display according to an embodiment of the present invention.
Figure 43:
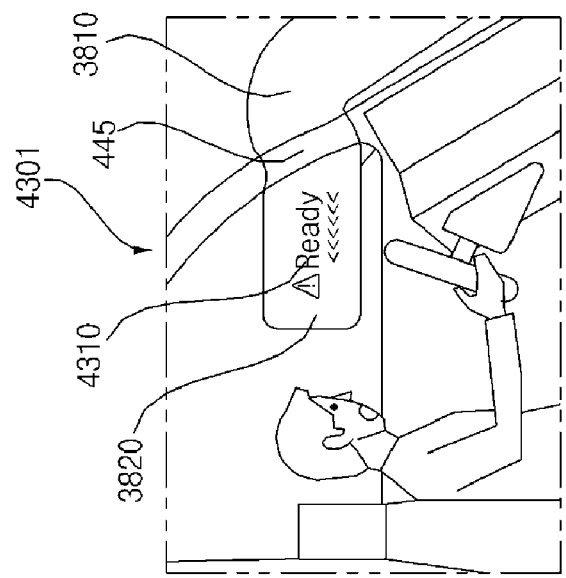

FIG. 43 illustrates the operation of displaying a camera acquired image on a rolling display according to an embodiment of the present invention.

Referring to FIG. 43, the processor 470 may display an alarm 4310 on the A-pillar display 445 or the rolling display 446, as shown in illustration 4301.

For example, if an object (e.g., another vehicle) is detected on the rear left side with a turn signal for lane change to a lane on the left side being received, the processor 470 may display the alarm 4310 on the second rolling display 3820.

For example, if an object (e.g., another vehicle or a pedestrian) is detected in front of the vehicle with the eyes of the user facing the side window glass, the processor 470 may display the alarm 4310 on the second rolling display 3820.

The processor 470 may display the image acquired through the camera 195 on the A-pillar display 445 or the rolling display 446, as shown in illustration 4302.

For example, when the user's gaze is directed to the side window glass 3803 in the rainy or snowy weather, the processor 470 may display an image corresponding to the vehicle rear view image data on the second rolling display 3820.

For example, when a turn signal input is received in the rainy or snowy weather, the processor 470 may display an image corresponding to the vehicle rear view image data on the second rolling display 3820 corresponding to the turn signal direction.

Figure 44:
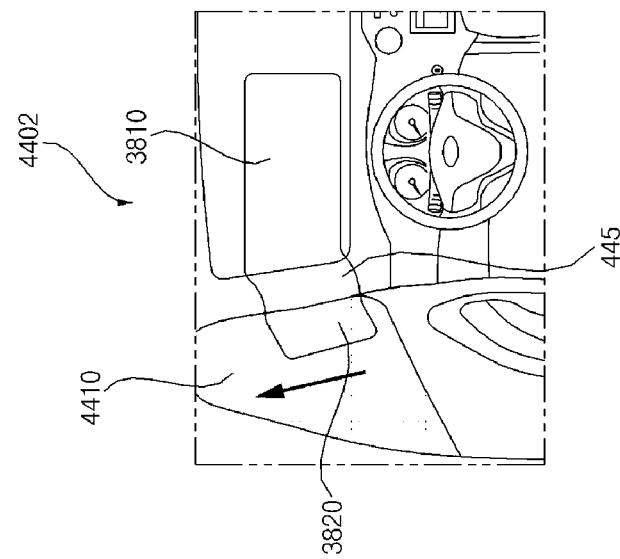
FIG. 44 illustrates the operation of unrolling a rolling display corresponding to window opening, according to an embodiment of the present invention.
Figure 44:
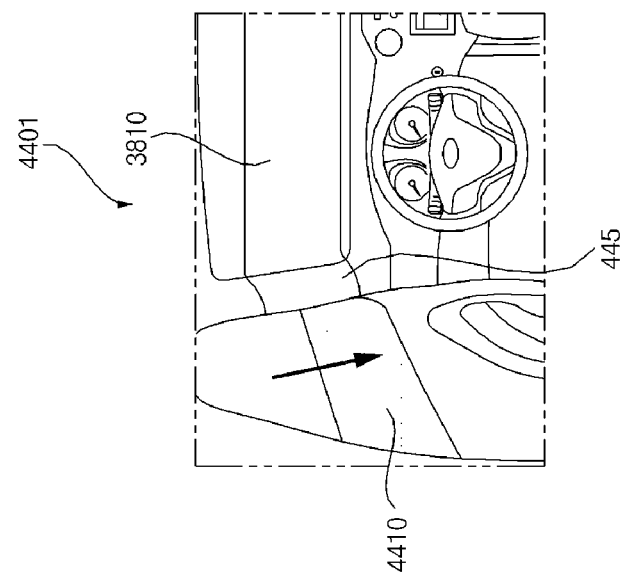

FIG. 44 illustrates the operation of unrolling a rolling display corresponding to window opening, according to an embodiment of the present invention.

Referring to FIG. 44, the processor 470 may receive window open or closed state information through the interface unit 480.

The processor 470 may control the second rolling display 3820 to be rolled when the window is opened, as shown in illustration 4401. This is to prevent damage to the second rolling display when the window is opened.

At this time, the processor 470 may control the first rolling display 3810 to be unrolled by a degree corresponding to the degree of rolling of the second rolling display 3820.

The processor 470 may control the second rolling display 3820 to be unrolled when the window is closed again, as shown in illustration 4402.

Figure 45:
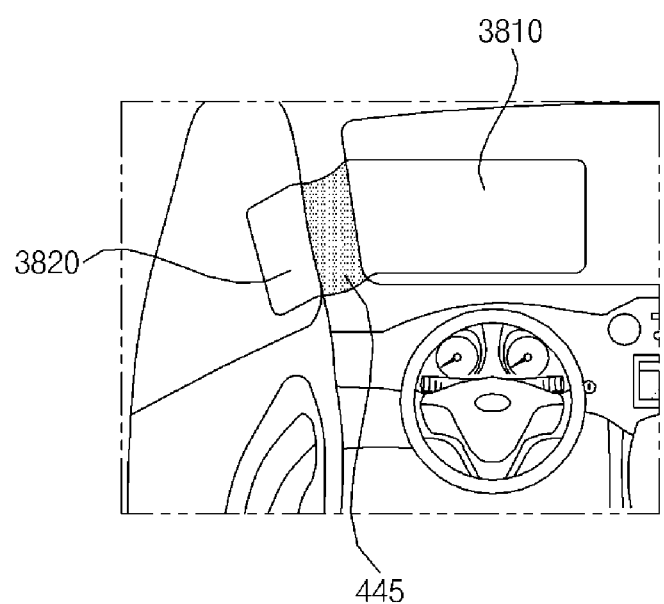
FIG. 45 illustrates the operation of displaying an alarm on an A-pillar display or a rolling display according to an embodiment of the present invention.
Figure 46A:
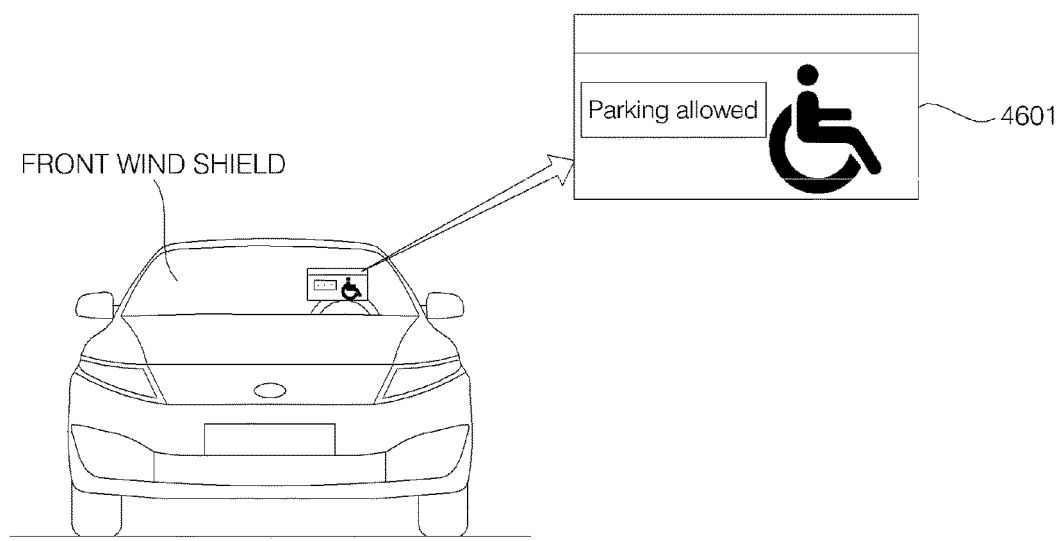
FIG. 46A to 46E illustrate the operation of displaying externally checkable information on a transparent flexible display or a rolling display, according to an embodiment of the present invention.
Figure 46B:
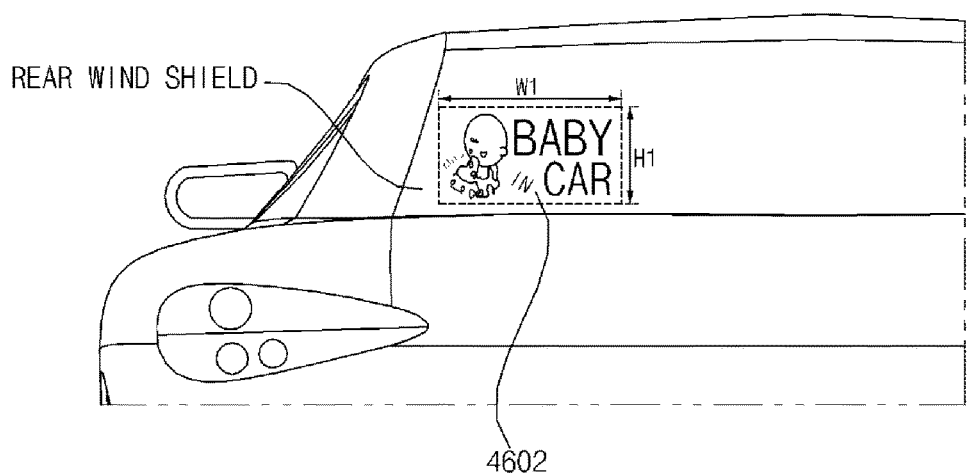
Figure 46C:
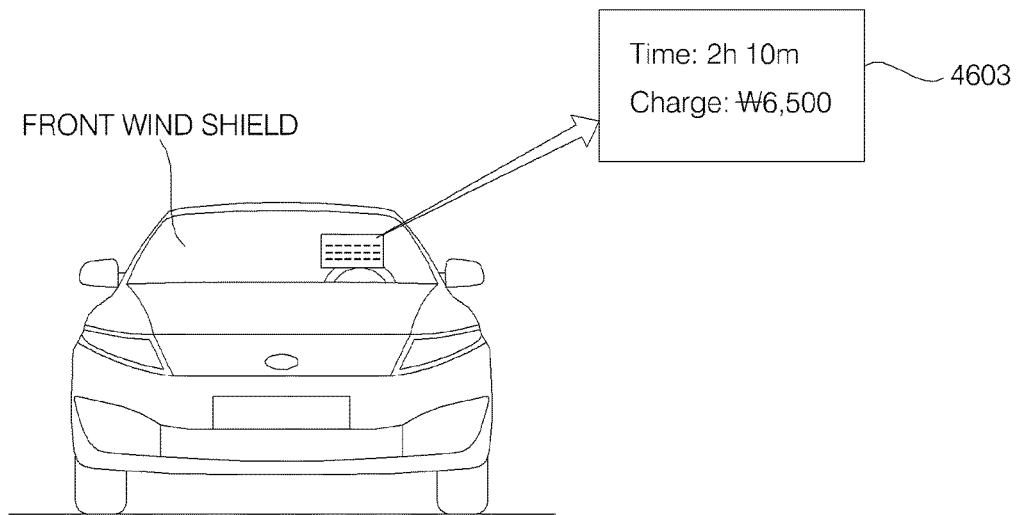
Figure 46D:
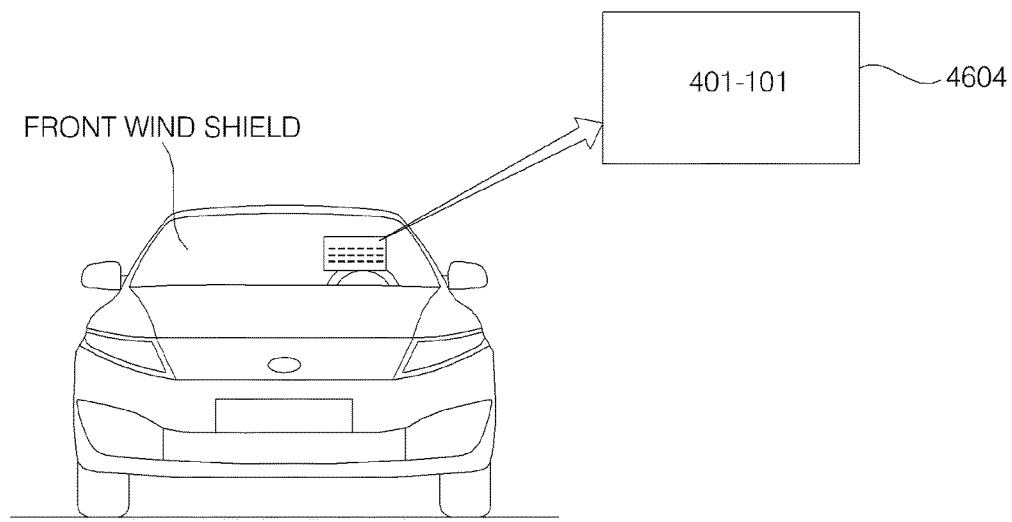
Figure 46E:
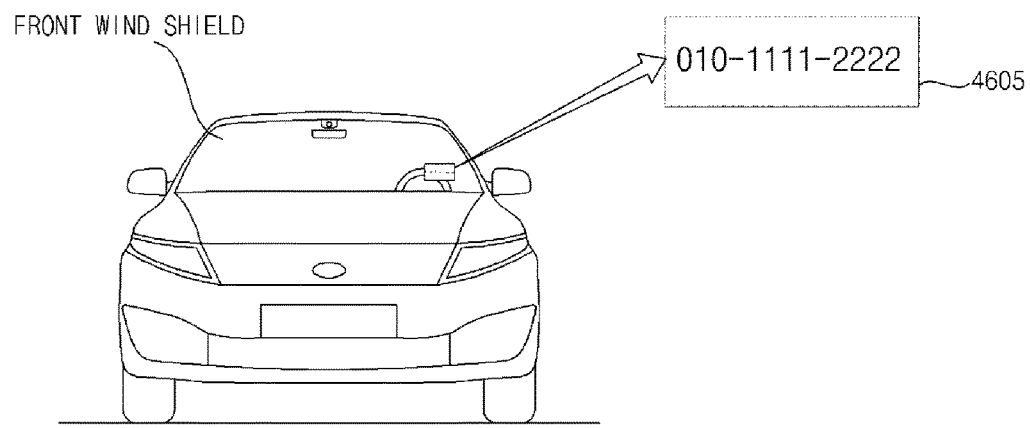

FIG. 45 illustrates the operation of displaying an alarm on an A-pillar display or a rolling display according to an embodiment of the present invention.

Referring to FIG. 45, the processor 470 may output an alarm by displaying a color on the A-pillar display 445 or the rolling display 446.

For example, the processor 470 may display a predetermined color on the A-pillar display 445 according to the time of collision with an object. For example, when the predicted time of collision with the object is within a first range, the processor 470 may display a first color on the A-pillar display 445. In addition, when the predicted time of collision with the object is within a second range, the processor 470 may display a second color on the A-pillar display 445.

The processor 470 may display information while a predetermined color is displayed on the A-pillar display 445.

FIG. 46A to 46E illustrate the operation of displaying externally checkable information on a transparent flexible display or a rolling display, according to an embodiment of the present invention.

Referring to FIGS. 46A to 46E, the processor 470 may display information on a transparent flexible display 441 or a rolling display 446. The processor 470 may display information with the transparent flexible display 441 or the rolling display 446 unrolled. Here, the information may be displayed so as to be checkable outside the vehicle. The information may be information that an outsider other than the occupant in the vehicle needs.

For example, the processor 470 may display information based on the direction from an outside to the vehicle 100. In this case, when viewed from the inside of the vehicle, the information may be displayed with the left and right switched.

As illustrated in FIGS. 46A to 46E, the processor 470 may display handicap parking vehicle information 4601, baby boarding information 4602, parking time information 4603, predetermined area accessibility information 4604, or user contact information 4605 such that the information can be checked outside the vehicle.

The present invention described above may be implemented as computer-readable code on a medium on which a program is recorded. The computer-readable medium includes all kinds of recording devices in which data readable by a computer system can be stored. Examples of the computer-readable medium include a hard disk drive (HDD), solid state disk (SSD), silicon disk drive (SDD), ROM, RAM, CD-ROM, magnetic tape, floppy disk, and optical data storage. Alternatively, the invention may be implemented in the form of a carrier wave (e.g., transmission over the Internet). In addition, the computer may include the processor 180, 470 or the controller 770. Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A vehicle display device comprising:
   a display unit comprising a transparent flexible display configured to roll around a shaft;
   a drive unit configured to adjust a length of an exposed area of the transparent flexible display, wherein the exposed area is visible from an interior of a vehicle;
   a support module configured to provide mechanical support to the exposed area of the transparent flexible display, the support module comprising:
      a fixing part configured to hold the exposed area of the transparent flexible display; and
      a guide part configured to be positioned inside an A-pillar of the vehicle and comprising a groove configured to guide a movement of the fixing part along a linear path;
   a processor; and
   a computer-readable medium coupled to the processor having stored thereon instructions which, when executed by the processor, causes the processor to perform operations comprising:
      instructing the drive unit to adjust the length of the exposed area of the transparent flexible display; and
      instructing the display unit to display a screen image on the transparent flexible display.

2. The vehicle display device of claim 1, wherein the transparent flexible display is positioned to at least one of a front windshield, a rear windshield, a side window glass, or a front seat of the vehicle.

3. The vehicle display device of claim 2, wherein the transparent flexible display is positioned to the front windshield of the vehicle,
   wherein the front windshield comprises an internal glass and an external glass, and
   wherein the exposed area is positioned in a space formed between the internal glass and the external glass.

4. The vehicle display device of claim 2, wherein the transparent flexible display is positioned proximate to the front windshield, and
   wherein the linear path is oriented along a width or a height of the front windshield.

5. The vehicle display device of claim 1, wherein the drive unit comprises:
   a roller unit in contact with the transparent flexible display, the roller unit configured to adjust the length of the exposed area by rotating; and
   a driving force generation unit configured to provide rotational driving force to the roller unit.

6. The vehicle display device of claim 5, wherein the roller unit comprises:
   a main roller configured to receive the rotational driving force from the driving force generation unit; and
   one or more sub-rollers,
   wherein, during operation, the one or more sub-rollers rotate to reduce friction between the transparent flexible display and a housing.

7. The vehicle display device of claim 6, wherein the drive unit further comprises
   one or more elastic supports configured to support the transparent flexible display within the housing by applying a restoring force.

8. The vehicle display device of claim 6, wherein the drive unit further comprises
   an inclination adjustment part configured to adjusting an inclination of the transparent flexible display.

9. The vehicle display device of claim 1, wherein the fixing part is transparent.

10. The vehicle display device of claim 1, wherein the transparent flexible display comprises a plurality of transparent flexible displays, and
    wherein the operations comprise instructing the display unit to display different screen images on the respective transparent flexible displays.

11. The vehicle display device of claim 1, wherein the transparent flexible display comprises a first display and a second display, and
    wherein operations comprise:
       determining that a passenger has entered the vehicle; and
       instructing the drive unit to adjust the length of an exposed area of the second display so that the exposed area of the second display is visible to the passenger.

12. The vehicle display device of claim 1, further comprising
    an interface unit configured to obtain image data from a camera, and
    wherein the screen image displayed by the display unit is based on the obtained image data.

13. The vehicle display device of claim 12, wherein the transparent flexible display is positioned proximate to a side window glass of the vehicle,
    wherein the camera is a rearview camera configured to obtain a rearview image of the vehicle, and
    wherein the screen image displayed by the display unit comprises the rearview image of the vehicle.

14. The vehicle display device of claim 1, further comprising a light amount sensor configured to obtain a brightness level of the interior of the vehicle, and
   wherein the operations comprise instructing the display unit to adjust a transparency of the transparent flexible display based on the brightness level.

15. The vehicle display device of claim 1, further comprising:
   an interface unit configured to obtain collision information, and
   wherein operations comprise:
      determining a presence of the collision information; and
      instructing, based on the presence of the collision information, the drive unit to retract the transparent flexible display so that the transparent flexible display is not exposed to the interior of the vehicle.

16. A vehicle comprising:
   a plurality of wheels;
   a power source configured to drive the plurality of wheels; and
   the vehicle display device of claim 1.

* * * * *